(12) United States Patent
Kray et al.

(10) Patent No.: US 12,503,947 B2
(45) Date of Patent: Dec. 23, 2025

(54) TURBINE ENGINE WITH COMPOSITE AIRFOILS

(71) Applicant: GENERAL ELECTRIC COMPANY, Evendale, OH (US)

(72) Inventors: Nicholas Joseph Kray, Mason, OH (US); Arthur William Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/227,642

(22) Filed: Jun. 4, 2025

(65) Prior Publication Data

US 2025/0297552 A1 Sep. 25, 2025

Related U.S. Application Data

(63) Continuation of application No. 18/807,374, filed on Aug. 16, 2024, now Pat. No. 12,338,747, which is a continuation-in-part of application No. 18/741,419, filed on Jun. 12, 2024, now Pat. No. 12,326,154, which is a continuation-in-part of application No. 18/171,533, filed on Feb. 20, 2023, now Pat. No. 12,158,082.

(51) Int. Cl.
| | |
|---|---|
| *F01D 5/28* | (2006.01) |
| *F01D 5/14* | (2006.01) |
| *F01D 9/02* | (2006.01) |
| *F01D 25/00* | (2006.01) |

(52) U.S. Cl.
CPC ............ *F01D 5/282* (2013.01); *F01D 5/147* (2013.01); *F01D 9/02* (2013.01); *F01D 25/005* (2013.01); *F05D 2220/323* (2013.01); *F05D 2240/121* (2013.01); *F05D 2240/303* (2013.01); *F05D 2300/603* (2013.01)

(58) Field of Classification Search
CPC ...................................... F01D 5/147
See application file for complete search history.

(56) References Cited

U.S. PATENT DOCUMENTS

| | | | |
|---|---|---|---|
| 3,861,139 | A | 1/1975 | Jones |
| 4,815,940 | A | 3/1989 | LeShane et al. |
| 5,135,993 | A | 8/1992 | Decker et al. |
| 5,725,355 | A | 3/1998 | Crall et al. |
| 6,139,259 | A | 10/2000 | Ho et al. |
| 6,814,541 | B2 | 11/2004 | Evans |

(Continued)

FOREIGN PATENT DOCUMENTS

| | | |
|---|---|---|
| CN | 113123834 B | 9/2021 |
| CN | 216009013 U | 3/2022 |

(Continued)

*Primary Examiner* — Michael L Sehn
(74) *Attorney, Agent, or Firm* — McGarry Bair PC

(57) ABSTRACT

A turbine engine includes a fan and a turbomachine defining an engine centerline. The turbomachine includes a compressor section, a combustion section, and a turbine section in serial flow order. The turbine engine also includes a set of composite airfoils circumferentially arranged about the engine centerline. An airfoil in the set of composite airfoils including a composite portion extending chordwise between a composite leading edge and a trailing edge and a leading edge protector coupled to the composite portion.

12 Claims, 33 Drawing Sheets

(56) References Cited

U.S. PATENT DOCUMENTS

| | | |
|---|---|---|
| 7,090,463 B2 | 8/2006 | Milburn et al. |
| 7,390,161 B2 | 6/2008 | Xie et al. |
| 7,594,325 B2 | 9/2009 | Read |
| 7,713,021 B2 | 5/2010 | Finn et al. |
| 8,105,042 B2 | 1/2012 | Parkin et al. |
| 8,419,374 B2 | 4/2013 | Huth et al. |
| 8,475,895 B2 * | 7/2013 | Xie ............... F01D 25/005 428/176 |
| 8,573,947 B2 | 11/2013 | Klinetob et al. |
| 8,696,319 B2 | 4/2014 | Naik |
| 8,814,527 B2 | 8/2014 | Huth et al. |
| 9,045,991 B2 | 6/2015 | Read et al. |
| 9,617,860 B2 | 4/2017 | Lattanzio |
| 10,087,766 B2 | 10/2018 | Pope et al. |
| 10,399,664 B2 | 9/2019 | Bowden et al. |
| 10,408,072 B2 | 9/2019 | Bielek et al. |
| 10,760,428 B2 | 9/2020 | Kray et al. |
| 10,815,886 B2 | 10/2020 | Kroger et al. |
| 10,844,725 B2 | 11/2020 | Pouzadoux et al. |
| 10,913,133 B2 | 2/2021 | Bales et al. |
| 11,131,314 B2 | 9/2021 | Welch |
| 11,655,768 B2 | 5/2023 | Sibbach et al. |
| 11,725,526 B1 | 8/2023 | Sibbach et al. |
| 11,739,689 B2 | 8/2023 | Sibbach et al. |
| 12,158,082 B2 | 12/2024 | Kray |
| 12,326,154 B2 | 6/2025 | Kray |
| 12,345,174 B1 | 7/2025 | Twahir |
| 12,345,177 B2 | 7/2025 | Kray |
| 2004/0041128 A1 | 3/2004 | Carter et al. |
| 2004/0146393 A1 | 7/2004 | Evans et al. |
| 2006/0134251 A1 | 6/2006 | Blanton et al. |
| 2008/0305340 A1 | 12/2008 | Fang et al. |
| 2010/0148396 A1 | 6/2010 | Xie |
| 2010/0150706 A1 | 6/2010 | Xie et al. |
| 2014/0112796 A1 | 4/2014 | Kray et al. |
| 2015/0151485 A1 | 6/2015 | Godon et al. |
| 2016/0010468 A1 | 1/2016 | Kray et al. |
| 2018/0200967 A1 | 7/2018 | Sutter et al. |
| 2021/0108572 A1 | 4/2021 | Khalid et al. |
| 2021/0324751 A1 | 10/2021 | Theertham et al. |
| 2021/0388726 A1 | 12/2021 | Churcher et al. |
| 2022/0362856 A1 | 11/2022 | Suchel et al. |
| 2023/0003133 A1 | 1/2023 | Gondre et al. |
| 2023/0060010 A1 | 2/2023 | Sibbach et al. |
| 2023/0258134 A1 | 8/2023 | Sibbach et al. |
| 2023/0407754 A1 | 12/2023 | De Carne-Carnavalet et al. |
| 2025/0198294 A1 | 6/2025 | Love |
| 2025/0207513 A1 | 6/2025 | Hoshi |

FOREIGN PATENT DOCUMENTS

| | | |
|---|---|---|
| EP | 4417789 A1 | 8/2024 |
| FR | 3102378 A1 | 4/2021 |
| FR | 3116560 A1 | 5/2022 |
| FR | 3153280 A1 | 3/2025 |

* cited by examiner

TURBINE ENGINE WITH COMPOSITE AIRFOILS

CROSS-REFERENCE TO RELATED APPLICATIONS

This application is a continuation of U.S. application Ser. No. 18/807,374, filed Aug. 16, 2024, now allowed, which is a continuation-in-part of U.S. application Ser. No. 18/741,419, filed Jun. 12, 2024, now allowed, which is a continuation-in-part of U.S. application Ser. No. 18/171,533, filed Feb. 20, 2023, now U.S. Pat. No. 12,158,082, which issued on Dec. 3, 2024, all of which are incorporated herein by reference in their entirety.

TECHNICAL FIELD

The disclosure generally relates to a component for a turbine engine, more specifically, to a composite airfoil.

BACKGROUND

Composite materials typically include a fiber-reinforced matrix and exhibit a high strength-to-weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
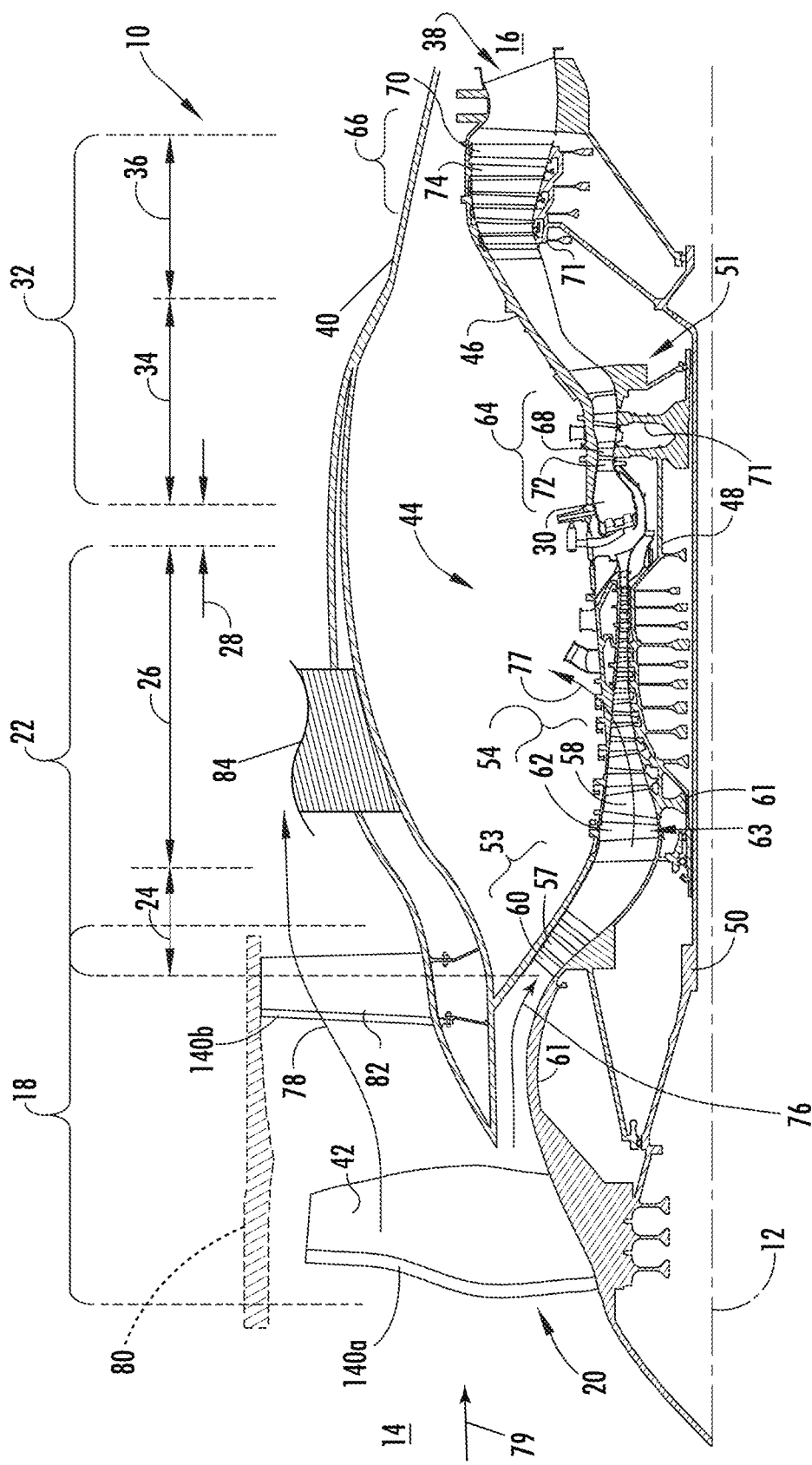
FIG. 1 is a schematic cross-sectional view of a turbine engine in accordance with an exemplary embodiment of the present disclosure.

Aspects of the disclosure herein are directed to a plurality of composite airfoil stages. For purposes of illustration, the present disclosure will be described with respect to the plurality of composite airfoil stages within an engine being a first stage of airfoils in the form of fan blades and a second stage of airfoils immediately downstream the first stage of airfoils as an outlet guide vane (OGV). While fan blades and OGVs are illustrated, it should be understood that any consecutive sets of stages are contemplated. Further, it will be understood, that aspects of the disclosure herein are not so limited and may have general applicability within an engine, including compressors, as well as in non-aircraft applications, such as other mobile applications and non-mobile industrial, commercial, and residential applications.

Reference will now be made in detail to composite fan blades and composite OGVs, one or more examples of which are illustrated in the accompanying drawings. The detailed description uses numerical and letter designations to refer to features in the drawings.

The term "composite," as used herein is, is indicative of a material that does not include metal material. A composite can be a combination of at least two or more non-metallic elements or materials. Examples of a composite material can be, but not limited to, a polymer matrix composite (PMC), a ceramic matrix composite (CMC), carbon fibers, a polymeric resin, a thermoplastic, bismaleimide (BMI), a polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al2O_3 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, with regard to a turbine engine, forward refers to a position closer to an engine inlet and aft refers to a position closer to an engine nozzle or exhaust.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Leading length or "LL" as used herein refers to a length between a leading edge of the airfoil and a seam between a leading edge protector and a portion of the airfoil.

First leading length or "FLL" as used herein refers to the leading length of a first stage of airfoils.

Second leading length or "SLL" as used herein refers to the leading length of a second stage of airfoils immediately downstream from the first stage of airfoils.

Chord length or "CL" as used herein refers to a length between a leading edge of the airfoil and a trailing edge of the airfoil.

First chord length or "FCL" as used herein refers to the chord length of the first stage of airfoils.

Second chord length or "SCL" as used herein refers to the chord length of the second stage of airfoils.

Airfoil protection factor or "APF" as used herein refers to a relationship in the form of a ratio of the leading length to the chord length of the airfoil. As more protection is provided for any given airfoil, the leading length increases and in turn so does the APF.

Stage performance factor or "SPF" as used herein refers to a relationship in the form of a ratio of the airfoil protection factor for the first stage of airfoils, or "APF1" to the airfoil protection factor for the second stage of airfoils, or "APF2".

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain exemplary embodiments of the present disclosure, a turbine engine defining a centerline and a circumferential direction is provided. The turbine engine may generally include a turbomachine and a rotor assembly. The rotor assembly may be driven by the turbomachine. The turbomachine, the rotor assembly, or both may define a substantially annular flow path relative to the centerline of the turbine engine. In certain aspects of the present disclosure, an unducted or open rotor turbine engine includes a set of circumferentially spaced fan blades, which extend, exteriorly, beyond a nacelle encasing or engine core.

The turbine engine includes airfoils in the form of blades and vanes. The airfoils described herein can be a plurality of airfoils provided circumferentially about the centerline or be partially provided about a portion of the centerline. At least one airfoil in the plurality of airfoils includes a protective covering on a leading edge of the airfoil. The protective covering can be a metal covering. The protective covering is referred to herein as leading edge protector.

The leading edge protector can be designed for various flight conditions, including take off, descent, and idle. The objective, when designing an airfoil, specifically a composite fan blade and a composite outlet guide vane can be generally stated as balancing an added weight component from the protective covering, or sheath, on the leading edge with an acceptable amount of protection of the leading edge. The balancing of efficient weight designs can be particularly important in large turbofan applications of traditional direct drive, gear-reduction designs, and open-rotor designs. Key factors to consider include that the ratio of the leading edge chord to the blade chord is a balance between the leading edge dominating the response to a bird ingestion or similar event, and the PMC airfoil dominating the characteristics of the blade aerodynamics in normal operation.

There is a tradeoff between the percent of the airfoil chord that is covered by the leading edge protector, and the performance of the airfoil. The protective covering provides a stiffness to the airfoil for bird ingestion, but the remainder of the blade is desirable to be flexible for aerodynamic purposes. Because the fan blade rotates and the OGV is stationary the dynamics of a bird ingestion event differs for the two airfoils.

The inventors have determined that the leading edge protector must overlap with enough of the composite airfoil in order to provide a strong enough bond, but it is desirable to minimize the overlap in order for the composite blade to flex. The leading edge protector also provides erosion protection to a composite airfoil and is required for both static and rotating airfoils. The leading edge protector characteristics have been developed from multiple tests and simulation analyses covering the ingestion of birds of varying sizes at varying span positions, and analysis of blades that have been returned for repair following bird strikes in revenue service. Furthermore, the OGV is not rotating, and experiences a different stress when impacted by a bird after it has passed through the fan. Multiple simulations and analyses depending on how the bird strikes the fan, whether it hits directly centered on a leading edge protector or hits between two adjacent blades where it is more likely to pass through without being sliced into smaller pieces. The relationship between the percent chord of a rotating and non-rotating blade that is covered by the leading edge protector is not obvious due to the difference in the forces acting upon the airfoils when struck by a bird or similar object.

The inventors' practice has proceeded in the manner of designing airfoil stages, modifying the airfoil stages with the addition of the leading edge protector, and redesigning the airfoil stages with the leading edge protector meeting protection requirements associated with the airfoil stages. After calculating and checking an amount of protection provided and an amount of weight increase or decreases associated with the leading edge protector, the process is repeated for other stages of during the design of several different types of turbomachines, such as those shown in FIG. 1. In other words, an airfoil design can meet performance requirements for one location in the engine, but not necessarily for another location.

FIG. 1 is a schematic cross-sectional diagram of a turbine engine 10 for an aircraft. By way of non-limiting example, the turbine engine 10 is illustrated as an open rotor turbine engine. The turbine engine 10 has a generally longitudinally extending axis or engine centerline 12 extending from a forward end 14 to an aft end 16. The turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a nacelle 40, of the turbine engine 10 extends from the forward end 14 of the turbine engine 10 toward the aft end 16 of the turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the turbine engine 10, specifically, the fan section 18 extends radially outward from the nacelle 40. The fan section 18 includes a set of fan blades 42, and a set of outlet guide vanes (OGV) 82 downstream the set of fan blades 42, both disposed radially about the engine centerline 12. The turbine engine 10 includes any number of one or more sets of rotating blades or propellers (e.g., the set of fan blades 42) disposed upstream of a set of stationary fan vanes (e.g., the set of OGVs 82). As a non-limiting example, the turbine engine 10 can include multiple sets of rotating blades and stationary vanes. The set of fan blades 42 can include a first leading edge protector 140a and the set of OGVs 82 can include a second leading edge protector 140b. As such, the turbine engine 10 is further defined as an unducted single-fan turbine engine. The turbine engine 10 is further defined by the location of the fan section 18 with respect to the combustion section 28. The fan section 18 can be upstream, downstream, or in-line with the axial positioning of the combustion section 28. In some aspects of the disclosure herein, the turbine engine can include a fan casing 80 (shown in dotted line) surrounding the fan 20 to define a ducted turbine engine.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the turbine engine 10.

A HP shaft or spool 48 disposed coaxially about the engine centerline 12 of the turbine engine 10 drivingly connects the HP turbine 34 to the HP compressor 26. A LP shaft or spool 50, which is disposed coaxially about the engine centerline 12 of the turbine engine 10 within the larger diameter annular HP spool 48, drivingly connects the LP turbine 36 to the LP compressor 24 and fan 20. The HP spools 48 and the LP spool 50 are rotatable about the engine centerline 12 and couple to a set of rotatable elements, which collectively define a rotor 51.

It will be appreciated that the turbine engine 10 is either a direct drive or an integral drive engine utilizing a reduction gearbox coupling the LP shaft or spool 50 to the fan 20.

The LP compressor 24 and the HP compressor 26, respectively, include a set of compressor stages 53, 54, in which a set of compressor blades 57, 58 rotate relative to a corresponding set of static compressor vanes 60, 62 (also called a nozzle) to compress or pressurize the stream of fluid passing through the stage. In a single compressor stage 53, 54, multiple compressor blades 57, 58 are provided in a ring and extend radially outward relative to the engine centerline 12, from a blade platform to a blade tip, while the corresponding static compressor vanes 60, 62 are positioned upstream of and adjacent to the compressor blades 57, 58. It is noted that the number of blades, vanes, and compressor stages shown in FIG. 1 were selected for illustrative purposes only, and that other numbers are possible.

The compressor blades 57, 58 for a stage of the compressor are mounted to a disk 61, which is mounted to the corresponding one of the HP and LP spools 48, 50, with each stage having its own disk 61. The static compressor vanes 60, 62 for a stage of the compressor are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outward relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine are mounted to a disk 71, which is mounted to the corresponding one of the HP and LP spools 48, 50, with each stage having a dedicated disk 71. The static turbine vanes 72, 74 for a stage of the compressor are mounted to the engine casing 46 in a circumferential arrangement. The compressor blades 57, 58 and the turbine blades 68, 70 described herein can be part of a blisk, rather than being mounted to a disk.

Complementary to the rotor portion, the stationary portions of the turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the turbine engine 10.

The nacelle 40 is operatively coupled to the turbine engine 10 and covers at least a portion of the engine core 44, the engine casing 46, or the exhaust section 38. At least a portion of the nacelle 40 extends axially forward or upstream the illustrated portion. For example, the nacelle 40 extends axially forward such that a portion of the nacelle 40 overlays or covers a portion of the fan section 18 or a booster section (not illustrated) of the turbine engine 10. A pylon 84 mounts the turbine engine 10 to an exterior structure (e.g., a fuselage of an aircraft, a wing, a tail wing, etc.).

During operation of the turbine engine 10, a freestream airflow 79 flows against a forward portion of the turbine engine 10. A portion of the freestream airflow 79 becomes an inlet airflow 78. The inlet airflow 78 flows through the set of fan blades 42 and over the nacelle 40 of the turbine engine 10. Subsequently, the inlet airflow 78 flows over at least a portion of the set of OGVs 82, which directs the inlet airflow 78 such that it is transverse toward the engine centerline 12. The inlet airflow 78 then flows past the set of OGVs 82, following the curvature of the nacelle 40 and toward the exhaust section 38.

A portion of the freestream airflow 79 enters the engine core 44 after flowing through the set of fan blades 42 and is described as a working airflow 76, which is used for combustion within the engine core 44. More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the turbine engine 10.

The working airflow 76 and at least some of the inlet airflow 78 merge downstream of the exhaust section 38 of the turbine engine 10. The working airflow 76 and the inlet airflow 78, together, form an overall thrust of the turbine engine 10.

It is contemplated that a portion of the working airflow 76 is drawn as bleed air 77 air (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in the heightened temperature environments or a hot portion of the turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
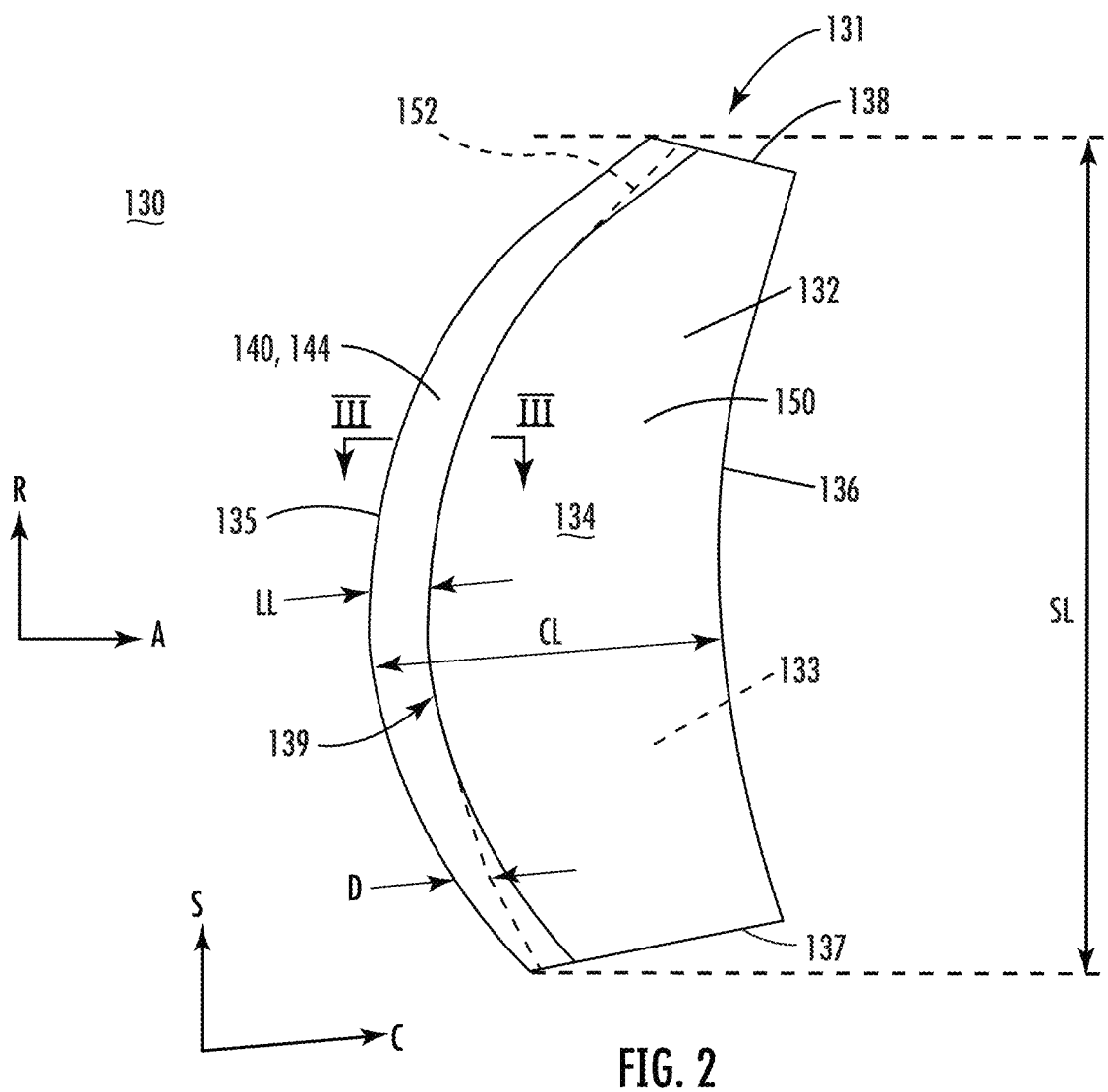
FIG. 2 is a schematic illustration of a composite airfoil in the form of a fan blade for the turbine engine of FIG. 1 according to an exemplary embodiment of the present disclosure.

FIG. 2 is schematic illustration of a composite airfoil 130 in the form of, by way of non-limiting example, a fan blade 131. The fan blade 131 can be, by way of non-limiting example, a blade of the set of fan blades 42 or a blade from the compressor blades 57, 58 or the turbine blades 68, 70. Further, the composite airfoil 130 can be a vane of the set of OGVs 82 or a vane of the static vanes 60, 62, 72, 74. It is contemplated that the composite airfoil 130 can be a blade, vane, airfoil, or other component of any turbine engine, such as, but not limited to, a gas turbine engine, a turboprop engine, a turboshaft engine, or a turbofan engine.

The composite airfoil 130 can include a wall 132 bounding an interior 133. The wall 132 can define an exterior surface 134 extending radially between a leading edge 135 and a trailing edge 136 to define a chordwise direction (denoted "C"). The composite airfoil 130 has a chord length (denoted "CL") measured along the chordwise direction C between the leading edge 135 and the trailing edge 136. The exterior surface 134 can further extend between a root 137 and a tip 138 to define a spanwise direction (denoted "S"). The composite airfoil 130 has a span length (denoted "SL") measured along the spanwise direction S between the root 137 and the tip 138 where the root is considered 0% of the span length SL and the tip 138 is considered 100% of the span length SL. The span length SL is the maximum distance between the root 137 and the tip 138 of the composite airfoil 130. It will be understood that the composite airfoil 130 can take any suitable shape, profile, or form including that the leading edge 135 need not be curved.

An axial direction (denoted "A") extends generally across the page from right to left. The axial direction A is parallel to the engine centerline 12 (FIG. 1). A radial direction (denoted "R") extends perpendicularly away from the axial direction A. It should be understood that the spanwise direction S is parallel to the radial direction R. The chordwise direction C can extend generally along the axial direction A, however with more bend in the composite airfoil 130, it should be understood that the chordwise direction C can extend both into and out of the page and across the page from left to right.

The exterior surface 134 is defined by a leading edge protector 140 and a composite portion 150. A seam 139, separates the leading edge protector 140 from the composite portion 150 along the exterior surface 134. The leading edge protector 140 extends along the chordwise direction C between the leading edge 135 and the seam 139 to define a leading length (denoted "LL").

The leading edge protector 140 is typically a metallic leading edge protector and can be made of, but is not limited to, steel, aluminum, refractory metals such as titanium, or superalloys based on nickel, cobalt, or iron. It should be understood that the leading edge protector 140 for the fan blade 131 can be a metallic leading edge protector while a set of stationary vanes downstream from the fan blade 131, by way of non-limiting example the set of OGVs 82 (FIG. 1), have the second leading edge protector 140b (FIG. 1) made of a polyurethane material. Further, the leading edge protectors 140, 140a, 140b described herein can be any suitable material such as metal, thermoplastic, or polyurethane, where both are the same, or different.

The composite portion 150 can include a composite leading edge 152 spaced a distance (denoted "D") from the leading edge 135. The composite leading edge 152 can define at least a portion of, or all of the seam 139. It is further contemplated that at least a part of the leading edge protector 140 overlaps the composite portion 150 such that at least a portion of, illustrated in dashed line, or all of the composite leading edge 152 is located upstream from the seam 139. In other words, the leading edge protector 140 can define a sheath 144 on the composite leading edge 152.

The composite portion 150 can be made of one or more layers of material. The one or more layers of material can be applied during the same stage or different stages of the manufacturing of the composite airfoil 130. By way of non-limiting example, composite portion 150 can include at least a polymer matrix composite (PMC) portion or a polymeric portion. The polymer matrix composite can include, but is not limited to, a matrix of thermoset (epoxies, phenolics) or thermoplastic (polycarbonate, polyvinylchloride, nylon, acrylics) and embedded glass, carbon, steel, or Kevlar fibers.

The leading edge protector 140 and the composite portion 150 can be formed by a variety of methods, including additive manufacturing, casting, electroforming, or direct metal laser melting, in non-limiting examples. As used herein, an "additively manufactured" component refers to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

It will be shown herein that a relationship between the leading length LL and the chord length CL can be referred to herein as an airfoil protection factor or simply as "APF". In other words, for any given composite airfoil 130 having a predetermined chord length CL, an amount of coverage provided by the leading edge protector 140 increases, so does the leading length LL and in turn the APF.

Figure 3:
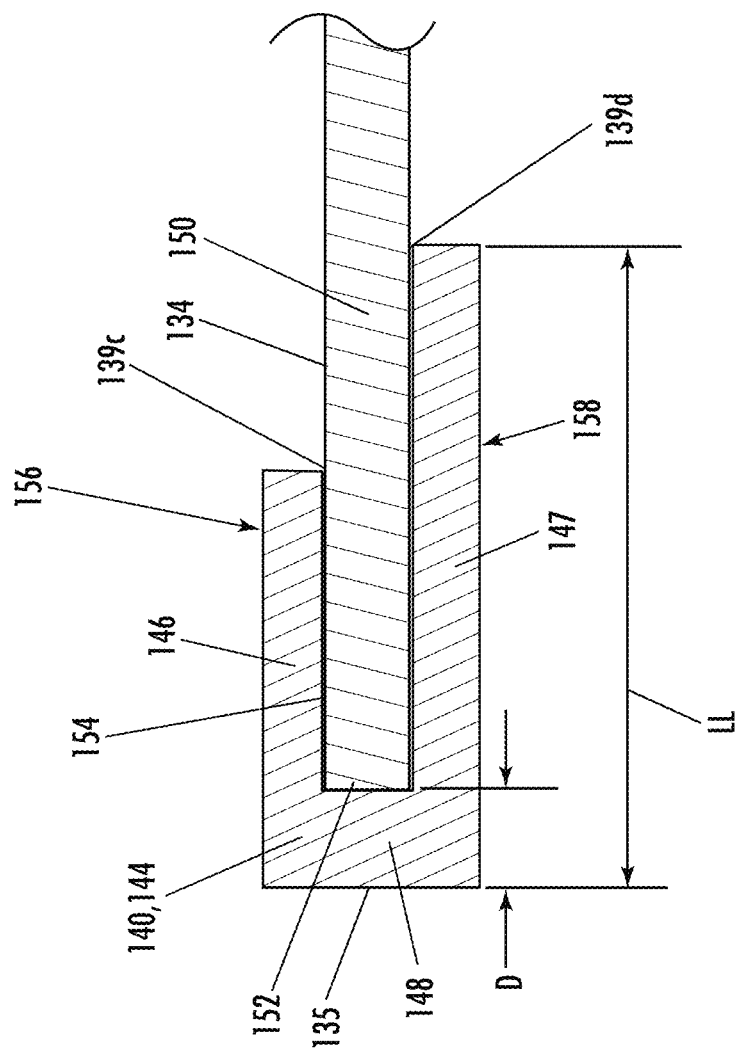
FIG. 3 is a schematic cross-section taken along line III-III of FIG. 2.

FIG. 3 is a schematic cross-section taken along line III-III of FIG. 2. The leading edge protector 140 is the sheath 144 with a first wall 146, a second wall 147, and a third wall 148 interconnecting the first wall 146 and the second wall 147. The first wall 146, second wall 147, and third wall 148 of the leading edge protector 140 are oriented and shaped such that they define a generally U-shaped (or C-shaped) channel 154 therebetween. As shown in FIG. 3 and as will be discussed below, the channel 154 is sized and shaped to receive the composite leading edge 152 of the composite portion 150. Notably, the shape of the channel 154 is shown by way of example only and the channel 154 is not limited to this specific shape and is not drawn to scale.

The composite airfoil 130 can extend between a first side 156 and a second side 158. The seam 139 can be two seams 139c, 139d at corresponding ends of the channel 154. The leading length LL is measured from the leading edge 135 to the seam 139d furthest from the leading edge 135. While illustrated at two different locations, it should be understood that the seams 139c, 139d can be located at the same leading length LL. While illustrated as rectangular blunt ends at the seam 139, the leading edge protector 140 can taper such that the leading edge protector 140 and the composite portion 150 are flush to define the exterior surface 134.

Figure 4:
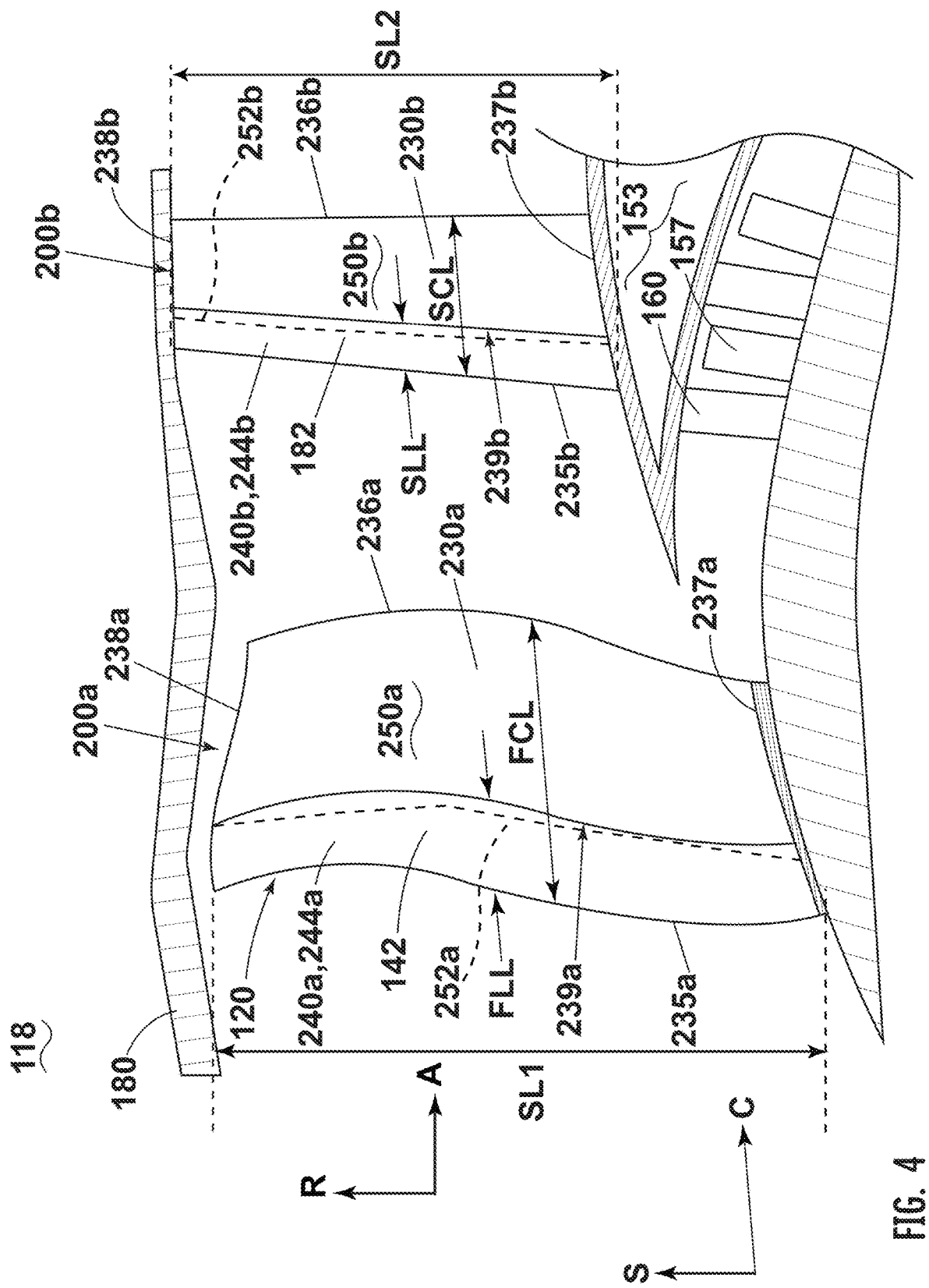
FIG. 4 is a schematic enlarged view of an exemplary fan section for the turbine engine of FIG. 1 according to an exemplary embodiment of the present disclosure.

FIG. 4 is schematic enlarged view of a fan section 118 similar to fan section 18 therefore, like parts of the fan section 118 (FIG. 1) will be identified with like numerals increased by 100, with it being understood that the description of the like parts of the fan section 18 applies to the fan section 118, except where noted.

A set of compressor stages 153 include a set of compressor blades 157 rotating relative to a corresponding set of static compressor vanes 160. A set of fan blades 142 define a fan section 118 including a fan 120. The turbine engine can include a fan casing 180 surrounding the fan 120.

The set of fan blades 142 defines a first stage of airfoils 200a within the fan section 118 (FIG. 1). A first airfoil 230a in the first stage of airfoils 200a is similar to the previously described airfoil 130, therefore like parts of the first airfoil 230a will be identified with like numerals increased by 100 and having a notation "a" with it being understood that the description of the like parts of the airfoil 130 applies to the first airfoil 230a, except where noted. While only a single fan blade is shown in the cross-section it will be understood that that the set of fan blades 142 are included and spaced about the fan section 118.

The first airfoil 230a has a first span length (denoted "SL1") measured along the spanwise direction S between a first root 237a and a first tip 238a where the first root 237a is considered 0% of the first span length SL1 and the first tip 238a is considered 100% of the first span length SL1. The first span length SL1 is the maximum distance between the first root 237a and the first tip 238a of the first airfoil 230a.

A first leading edge protector 240a extends along the chordwise direction C between a first leading edge 235a and a first seam 239a to define a first leading length (denoted "FLL"). The first airfoil 230a has a first chord length (denoted "FCL") measured along the chordwise direction C between the first leading edge 235a and the first trailing edge 236a.

A relationship between the first leading length (FLL) and the first chord length (FCL) is denoted herein with a first expression of the APF:

$$APF1 = \frac{FLL}{FCL} \quad (1)$$

OGVs 182 define a second stage of airfoils 200b downstream from the first stage of airfoils 200a. A second airfoil 230b in the second stage of airfoils 200b is similar to the previously described airfoil 130, therefore like parts of the second airfoil 230b will be identified with like numerals increased by 100 and having a notation "b" with it being understood that the description of the like parts of the airfoil 130 applies to the second airfoil 230b, except where noted. The second airfoil 230b is located downstream from the first airfoil 230a. While only a single outlet guide vane 182 is shown in the cross-section it will be understood that the OGVs 182 are multiple OGVs spaced about the fan section 118.

A second leading edge protector 240b extends along the chordwise direction C between a second leading edge 235b and a second seam 239b to define a second leading length (denoted "SLL"). The second airfoil 230b has a second chord length (denoted "SCL") measured along the chordwise direction C between the second leading edge 235b and second trailing edge 236b.

The second airfoil 230b has a second span length (denoted "SL2") measured along the spanwise direction S between a second root 237b and a second tip 238b where the second root 237b is considered 0% of the second span length SL2 and the second tip 238b is considered 100% of the second span length SL2. The second span length SL2 is the maximum distance between the second root 237b and the second tip 238b of the second airfoil 230b.

The first and second leading edge protectors 240a, 240b can each define first and second sheaths 244a, 244b. An exterior surface of each airfoil 230a, 230b is defined by the corresponding leading edge protectors 240a, 240b and a corresponding composite portion 250a, 250b. The composite portions 250a, 250b can each include a corresponding composite leading edge 252a, 252b which can define at least a portion of, or all of the corresponding seams 239a, 239b.

A relationship between the second leading length (SLL) and the second chord length (SCL) is denoted herein with a second expression of the APF:

$$APF2 = \frac{SLL}{SCL} \quad (2)$$

As will be further discussed herein, the APF describes an amount of protection coverage by the leading edge protector of any of the airfoils 130, 230a, 230b described herein. A balance trade-off between the amount of protection and the weight gain/loss associated with any of the protector portions described herein can be expressed by an APF value of from 0.1 to 0.3, inclusive of endpoints. In other words, to satisfy protection requirements the leading edge protector described herein should protect at least 10% and up to and including 30% of the composite airfoil before becoming too heavy.

The first stage of airfoils 200a has a first number of airfoils and the second stage of composite airfoils 200b has a second number of airfoils different than the second number. In other words, the consecutive stages of airfoils can vary in size and number of airfoils. Further, the first stage of composite airfoils 200a and the second stage of composite airfoils 200b can both be configured to rotate.

It will be appreciated that the number, size, and configuration of the composite airfoils described herein are provided by way of example only and that in other exemplary embodiments, the composite airfoils may have any other suitable configuration including that the plurality of airfoils may be in multiple rotor stages, etc.

As described earlier, finding a workable solution that balances the amount of protective covering for the composite airfoil as described herein whilst maintaining a weight requirement is a labor-intensive and time-intensive process, because the process is iterative and involves the selection of multiple composite airfoils with various protector edge lengths and chord lengths. Design procedures require placing said composite airfoil 130 (FIG. 2) into a turbine engine designed for a first flight operating condition and embodying a protection effectiveness with acceptable weight gain/losses for that first flight operating condition. Evaluating whether in a second, third, or other flight operating condition, the same selected composite airfoil 130 maintains a heat effectiveness with acceptable protection effectiveness for the other operating conditions is time-intensive and necessitates re-design of the composite airfoil and even the turbine engine in the event the conditions are not met. It is desirable to have an ability to arrive at an optimal composite airfoil, like the composite airfoil(s) described herein, rather than relying on chance. It would be desirable to have a limited or narrowed range of possible composite airfoil configurations for satisfying mission requirements, such requirements including protection, weight restrictions, heat transfer, pressure ratio, and noise transmission level requirements, as well as the ability to survive bird strikes at the time a composite airfoil 130 is selected and located within an engine.

The inventor(s) sought to find the trade-off balance between leading edge protection and weight gain/loss while satisfying all design requirements, because this would yield a more desired composite airfoil suited for specific needs of the engine, as described above. Knowing these trade-offs is also a desirable time saver.

TABLE 1 below illustrates some composite airfoil configurations that yielded workable solutions to the trade-off balance problem.

TABLE 1

| Example: | 1 | 2 | 3 | 4 | 5 | 6 |
|---|---|---|---|---|---|---|
| CL (cm) | 47 | 11 | 29 | 60 | 9.7 | 13 |
| LL (cm) | 11 | 1.7 | 3.2 | 16 | 1.5 | 2.3 |
| SL (%) | 20 | 20 | 38 | 50 | 50 | 80 |

It was discovered, unexpectedly, during the course of engine design and the time-consuming iterative process previously described, that a relationship exists between the ratio of the leading length LL to the chord length CL. It has been found that the optimal amount of protective covering of the composite airfoil lies within a specific range based on the leading length LL of the protective covering and the chord length CL of the composite airfoil.

TABLE 2 below illustrates some consecutive composite airfoil stages with workable solutions to the trade-off balance problem. Different span percentages are shown in TABLE 2. It was found that the CL and LL should be taken for any position between 20% and 80%, inclusive of end points of the span length SL. The specific range of the span length was chosen because the airfoil may have different properties, profiles, etc. at its distal ends. In the non-limiting examples, the fan blade dimensions determine APF1 while the outlet guide vane dimensions determine APF2.

TABLE 2

| Fan Blade | | | Outlet Guide Vane | | |
|---|---|---|---|---|---|
| Span (%) | CL (cm) | LL (cm) | Span (%) | CL (cm) | LL (cm) |
| 20 | 46.9 | 11.2 | 20 | 31.4 | 3.18 |
| 24 | 48.3 | 11.6 | 26 | 30.6 | 3.18 |
| 28 | 50.5 | 13.6 | 32 | 30.0 | 3.18 |
| 32 | 52.4 | 14.2 | 38 | 29.3 | 3.18 |
| 36 | 54.5 | 14.6 | 44 | 28.7 | 3.18 |
| 40 | 56.5 | 15.0 | 50 | 28.1 | 3.18 |
| 44 | 58.2 | 15.3 | 56 | 27.5 | 3.18 |
| 48 | 59.4 | 15.5 | 62 | 26.9 | 3.18 |
| 52 | 60.1 | 15.7 | 68 | 26.6 | 3.18 |
| 56 | 60.6 | 15.6 | 74 | 26.7 | 3.18 |
| 60 | 61.0 | 15.7 | 80 | 27.4 | 3.18 |
| 64 | 61.5 | 15.5 | | | |
| 68 | 61.9 | 15.4 | | | |
| 72 | 65.0 | 15.4 | | | |
| 76 | 63.2 | 15.5 | | | |
| 80 | 64.4 | 15.7 | | | |

Moreover, utilizing this relationship, the inventor found that the number of suitable or feasible composite airfoil possibilities for placement in a turbine engine that are capable of meeting the design requirements could be greatly reduced, thereby facilitating a more rapid down-selection of composite airfoils to consider as an engine is being developed. Such benefit provides more insight to the requirements for a given engine, and to the requirements for particular composite airfoil locations within the engine, long before specific technologies, integration, or system requirements are developed fully. The discovered relationship also avoids or prevents late-stage redesign while also providing the composite airfoil with a required protection effectiveness within given weight parameters.

More specifically, the inventors found that a relationship between the first expression of the APF, APF1, and the second expression of the APF, APF2, optimizes the protection amount for successive stages of airfoils. This relationship was an unexpected discovery during the course of engine design—i.e., designing multistage airfoil sections such as by way of non-limiting examples fan sections, fan blades, and outlet guide vanes and evaluating the impact that an amount of protection on the fan blade has on a needed amount of protection on the outlet guide vane, or vice versa. Narrowing the options down based on surrounding stages of airfoils can significantly decrease both material and time costs.

In other words, an amount of protection provided by the first leading edge protector 240a on the first airfoil 230a can affect an amount of protection necessary for the second airfoil 230b downstream of the first airfoil 230a. This relationship between the multistage airfoils or successive airfoils, such as 230a and 230b, can be described by a stage performance factor (denoted "SPF") determined from a relationship between the APF1 and the APF2. The stage performance factor can generally be represented by a ratio of the first airfoil protection factor APF1 to the second airfoil protection factor APF2 represented by:

$$SPF = \frac{APF1}{APF2} \quad (3)$$

More specifically, it was found that for any position between 20% and 80%, inclusive of end points of the span length SL, a desired SPF value is greater than or equal to 0.70 and less than or equal to 4 (0.7≤SPF≤4). The specific range of the span length was chosen because the airfoil may have different properties, profiles, etc. at its distal ends. Conversely, at any position between 20% and 80%, inclusive of end points the airfoil is more uniform and therefore the determined ratios are applicable. It will be understood that because of its position and movement, the rotating fan blade will likely require more coverage from the leading edge protector as compared to a static airfoil or OGV, which is driving the relationship ratio to the 0.7 to 4.0 range. This is due to the fact that the rotating blade has a higher kinetic energy from impact and is driven by the rotating velocity of the airfoil.

Utilizing this relationship, the inventors were able to arrive at a better performing airfoil in terms of protection amount with acceptable weight increase. The inventors found that the SPF for a set first set of airfoils and a second set of airfoils downstream from the first set of airfoils could be narrowed to an SPF range of greater than or equal to 0.95 and less than or equal to 2.5 (0.95≤SPF≤2.5). Narrowing the SPF range provides more insight to the requirements for a given engine well before specific technologies, integration and system requirements are developed fully. For example, as the fan speed is reduced, coverage on the first leading edge 235a by the first leading edge protector can decrease such that the APF1 also decreases. Further, knowing a range for the SPF can prevent or minimize late-stage redesign, decrease material cost, and save time.

The SPF value represents how an amount of protection on a first stage of airfoils, like the first stage of airfoils 200a, impacts an amount of protection necessary for any downstream airfoil stages with respect to the first set of airfoil stages.

In one example, the set of fan blades 142 illustrated in FIG. 4 can have dimensions of the Fan Blade at 20% from TABLE 2 and the set of outlet guide vanes 182 can have dimensions of the Outlet Guide Vane at 20% from TABLE 2. This results in an APF1 value of (11.2/46.9) or 0.24 and an APF2 value of (3.18/31.4) or 0.10. Using the SPF ratio, an SPF value of (0.24/0.10) or 2.40 is found.

In another example, the set of fan blades 142 illustrated in FIG. 4 can have dimensions of the Fan Blade at 68% from TABLE 2 and the set of outlet guide vanes 182 can have dimensions of the Outlet Guide Vane at 68% from TABLE 2. This results in an APF1 value of (15.4/61.9) or 0.25 and an APF2 value of (3.18/26.6) or 0.12. Using the SPF ratio, an SPF value of (0.25/0.12) or 2.1 is found.

Some lower and upper bound values for each design parameter for determining Expression (3) are provided below in TABLE 3:

TABLE 3

| Parameter | Lower Bound | | Upper Bound | |
|---|---|---|---|---|
| SL (%) | 20 | 80 | 20 | 80 |
| | | First Airfoil | | |
| FCL (cm) | 24 | 32 | 56 | 77 |
| FLL (cm) | 6 | 8 | 13 | 19 |
| | | Second Airfoil | | |
| SCL (cm) | 9.9 | 9.3 | 31 | 27 |
| SLL (cm) | 1.6 | 1.5 | 4 | 3.5 |

It was found that first and second airfoil pairs with dimensions fitting in the ranges set out in TABLE 4 below fit into the composite airfoil dimensions previously described herein. These ranges enable a minimum weight gain for a compact and proficiently protected composite airfoils in succession.

TABLE 4

| Ratio | Narrow Range | Broad Range |
|---|---|---|
| SPF | 0.95-2.5 | 0.70-4.0 |
| APF1 | 0.22-0.25 | 0.20-0.30 |
| APF2 | 0.10-0.12 | 0.08-0.17 |

Pairs of first and second airfoils, with the second airfoils downstream of the first airfoils within the ranges provided can be assembled to conform with any fan section, or other downstream stage relationship for blades/vanes and blades/blades. This can include any number of engine designs including ducted and unducted engines as well as a direct-drive configuration and an indirect-drive configuration such as a speed reduction device or a geared-drive configuration.

Figure 5:
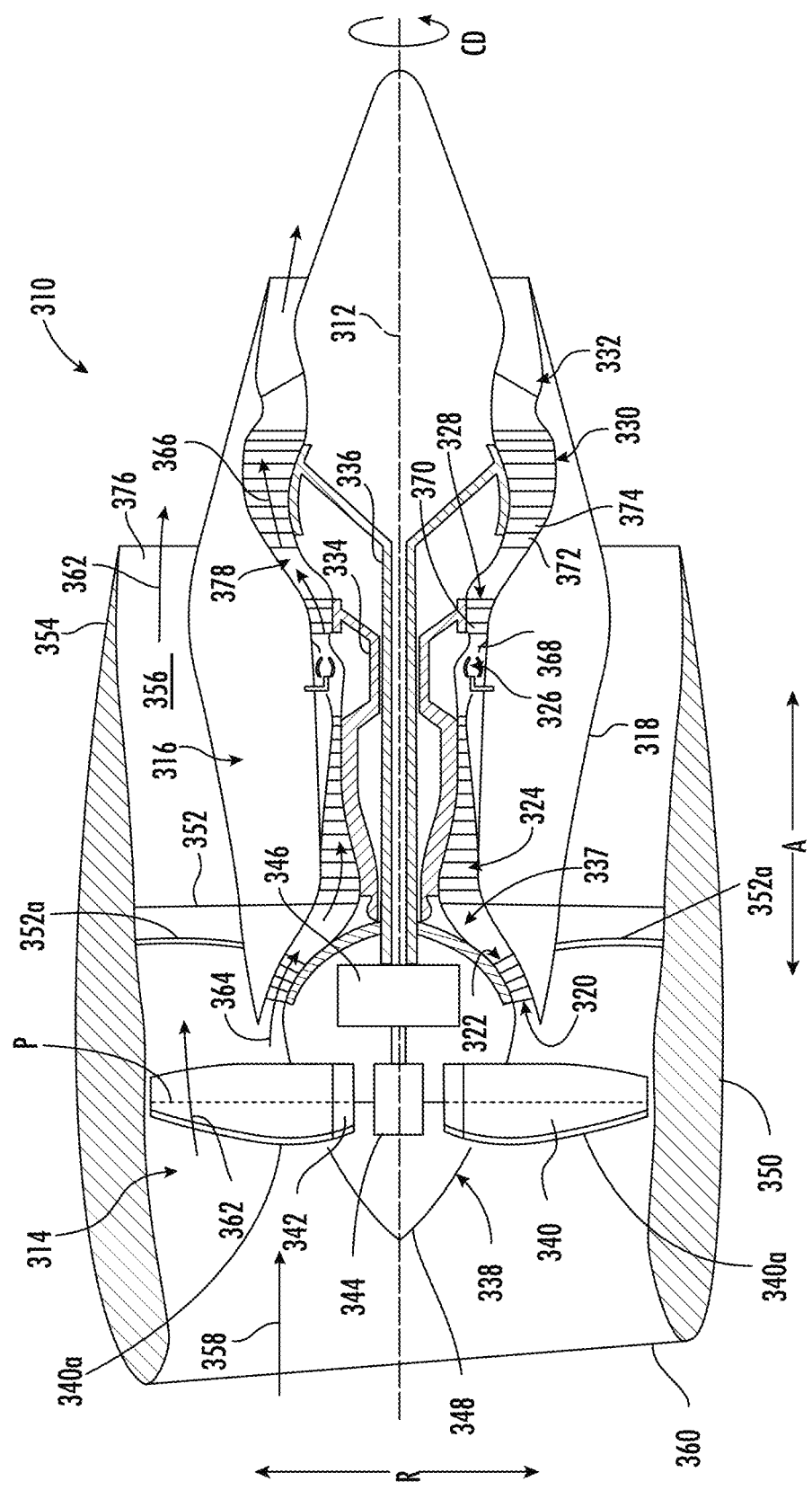
FIG. 5 is a schematic cross-sectional view of a gas turbine engine in accordance with another exemplary embodiment of the present disclosure.

For example, FIG. 5 illustrates a gas turbine engine 310 as a high-bypass turbofan jet engine, sometimes also referred to as a turbofan engine, which can include the set of composite airfoils as described or first and second stages of composite airfoils as described herein. The gas turbine engine 310 defines an axial direction A (extending parallel to a longitudinal centerline 312 provided for reference), a radial direction R, and a circumferential direction CD extending about the longitudinal centerline 312. In general, the gas turbine engine 310 includes a fan section 314 and a turbomachine 316 disposed downstream from the fan section 314.

The exemplary turbomachine 316 depicted generally includes a substantially tubular outer casing 318 that defines an annular inlet 320. The outer casing 318 encases, in serial flow relationship, a compressor section including a booster or low pressure (LP) compressor 322 and a high pressure (HP) compressor 324, a combustion section 326, a turbine section including a high pressure (HP) turbine 328 and a low pressure (LP) turbine 330, and a jet exhaust nozzle section 332. A high pressure (HP) shaft 334, which may additionally or alternatively be a spool, drivingly connects the HP turbine 328 to the HP compressor 324. A low pressure (LP) shaft 336, which may additionally or alternatively be a spool, drivingly connects the LP turbine 330 to the LP compressor 322. The compressor section, combustion section 326, turbine section, and jet exhaust nozzle section 332 together define a working gas flow path 337.

In the illustrated example, and by way of non-limiting example, the fan section 314 includes a fan 338 having a plurality of fan blades 340 coupled to a disk 342 in a spaced apart manner. As depicted, the fan blades 340 extend outwardly from disk 342 generally along the radial direction R. Each fan blade 340 is rotatable relative to the disk 342 about a pitch axis P by virtue of the fan blades 340 being operatively coupled to a suitable pitch change mechanism 344 configured to collectively vary the pitch of the fan blades 340, e.g., in unison. The gas turbine engine 310 further includes a speed reduction device in the form of a power gearbox 346, and the fan blades 340, disk 342, and pitch change mechanism 344 are together rotatable about the longitudinal centerline 312 by LP shaft 336 across the power gearbox 346. The power gearbox 346 includes a plurality of gears for adjusting a rotational speed of the fan 338 relative to a rotational speed of the LP shaft 336, such that the fan 338 may rotate at a more efficient fan speed. It will be understood that any suitable speed reduction device configured to adjust the rotation of the fan 338 relative to the LP shaft 336 can be utilized and that a power gearbox is merely one example thereof.

The disk 342 is covered by rotatable front hub 348 of the fan section 314. The front hub 348 is also sometimes referred to as a spinner. The front hub 348 is aerodynamically contoured to promote an airflow through the plurality of fan blades 340.

Additionally, the exemplary fan section 314 includes an annular fan casing or outer nacelle 350 that circumferentially surrounds the fan 338, circumferentially surrounds at least a portion of the turbomachine 316, or a combination thereof. It should be appreciated that the nacelle 350 is supported relative to the turbomachine 316 by a plurality of outlet guide vanes 352, which can be a second stage of airfoils in the non-limiting example. Moreover, a downstream section 354 of the nacelle 350 extends over an outer portion of the turbomachine 316 so as to define a bypass airflow passage 356 therebetween.

It will be understood that each fan blade of the plurality of fan blades 340 may form a composite airfoil and that the plurality of fan blades 340 can form a first stage of airfoils as described above. More specifically, each of the plurality of fan blades 340 can include a first leading edge protector 340a. It will be understood that the plurality of fan blades 340 forming the first stage of airfoils are similar to the previously described airfoils 130 and 230a with it being understood that the description of like parts applies to the plurality of fan blades unless otherwise noted.

Further still, it will be understood that each outlet guide vane of the plurality of outlet guide vanes 352 may form a composite airfoil. Further still, in the illustrated example, the plurality of outlet guide vanes 352 can form a second stage of airfoils as described above. More specifically, each of the plurality of outlet guide vanes 352 can include a second leading edge protector 352a. It will be understood that an outlet guide vane of the plurality of outlet guide vanes 352 forming the second stage of airfoils is similar to the previously described airfoils 130 and 230b with it being understood that the description of like parts applies to the outlet guide vane of the plurality of outlet guide vanes 352 unless otherwise noted.

It will be understood that the plurality of fan blades 340 and the plurality of outlet guide vanes 352 are similar to the previously described first and second airfoil pairs with dimensions fitting in the ranges set out in TABLE 4 above.

During operation of the gas turbine engine 310, a volume of air 358 enters the gas turbine engine 310 through an associated inlet 360 of the nacelle 350 and fan section 314. As the volume of air 358 passes across the fan blades 340, a first portion of air 362 is directed or routed into the bypass airflow passage 356 and a second portion of air 364 as indicated by arrow 364 is directed or routed into the working gas flow path 337, or more specifically into the LP compressor 322. The ratio between the first portion of air 362 and the second portion of air 364 is commonly known as a bypass ratio. A pressure of the second portion of air 364 is then increased as it is routed through the HP compressor 324 and into the combustion section 326, where it is mixed with fuel and burned to provide combustion gases 366.

The combustion gases 366 are routed through the HP turbine 328 where a portion of thermal and/or kinetic energy from the combustion gases 366 is extracted via sequential stages of HP turbine stator vanes 368 that are coupled to the outer casing 318 and HP turbine rotor blades 370 that are coupled to the HP shaft 334, thus causing the HP shaft 334 to rotate, which supports operation of the HP compressor 324. The combustion gases 366 are then routed through the LP turbine 330 where a second portion of thermal and kinetic energy is extracted from the combustion gases 366 via sequential stages of LP turbine stator vanes 372 that are coupled to the outer casing 318 and LP turbine rotor blades 374 that are coupled to the LP shaft 336, thus causing the LP shaft 336 to rotate, which supports operation of the LP compressor 322, rotation of the fan 338, or a combination thereof.

The combustion gases 366 are subsequently routed through the jet exhaust nozzle section 332 of the turbomachine 316 to provide propulsive thrust. Simultaneously, the pressure of the first portion of air 362 is substantially increased as the first portion of air 362 is routed through the bypass airflow passage 356 before it is exhausted from a fan nozzle exhaust section 376 of the gas turbine engine 310, also providing propulsive thrust. The HP turbine 328, the LP turbine 330, and the jet exhaust nozzle section 332 at least partially define a hot gas path 378 for routing the combustion gases 366 through the turbomachine 316.

As previously described, the stages of airfoils of the exemplary gas turbine engine 310 depicted in FIG. 5 is by way of example only, and that in other exemplary embodiments, the gas turbine engine 310 may have other configurations. For example, although the gas turbine engine 310 depicted is configured as a ducted gas turbine engine (i.e., including the outer nacelle 350, also referred to herein as a turbofan engine), in other embodiments, the gas turbine engine 310 may be an unducted gas turbine engine (such that the fan 338 is an unducted fan, and the outlet guide vanes 352 are cantilevered from the outer casing 318; see, e.g., FIG. 6; also referred to herein as an open rotor engine). Additionally, or alternatively, although the gas turbine engine 310 depicted is configured as a variable pitch gas turbine engine (i.e., including a fan 338 configured as a variable pitch fan), in other embodiments, the gas turbine engine 310 may alternatively be configured as a fixed pitch gas turbine engine (such that the fan 338 includes fan blades 340 that are not rotatable about a pitch axis P).

Figure 6:
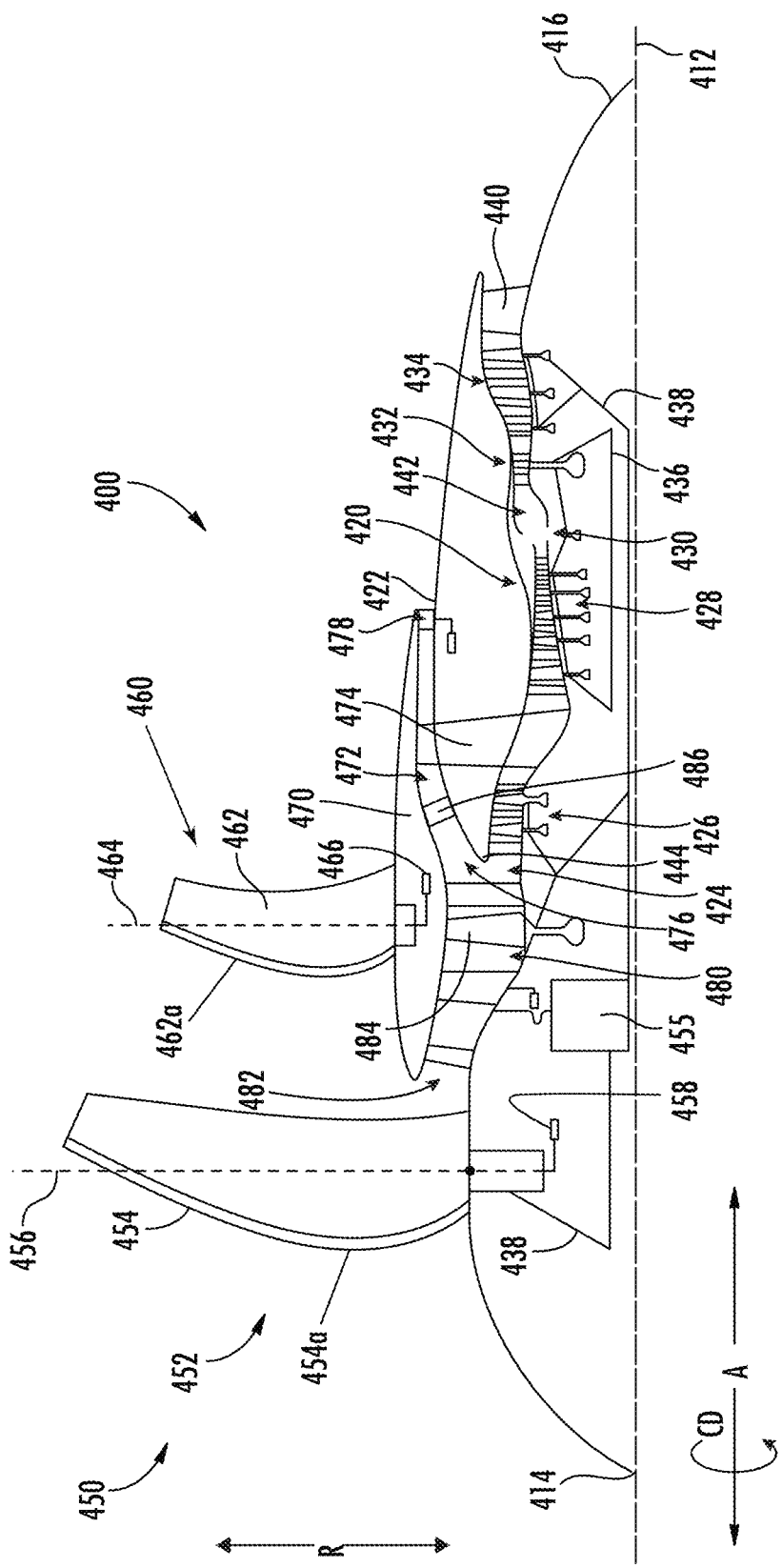
FIG. 6 is a schematic cross-sectional view of a gas turbine engine in accordance with another exemplary embodiment of the present disclosure.

FIG. 6, illustrates another non-limiting example of a gas turbine engine 400, which can include the set of composite airfoils or first and second stages of composite airfoils as described herein. The exemplary gas turbine engine 400 of FIG. 4 may be configured in substantially the same manner as the exemplary gas turbine engine 310 described above with reference to FIG. 5.

For example, the exemplary gas turbine engine 400 defines an axial direction A, a radial direction R, and a circumferential direction CD. Moreover, the engine 400 defines an axial centerline, longitudinal axis or engine centerline 412 that extends along the axial direction A. In general, the axial direction A extends parallel to the engine centerline 412, the radial direction R extends outward from and inward to the engine centerline 412 in a direction orthogonal to the axial direction A, and the circumferential direction CD extends three hundred sixty degrees (360°) around the engine centerline 412. The engine 400 extends between a forward end 414 and an aft end 416, e.g., along the axial direction A.

Further, the exemplary gas turbine engine 400 generally includes a fan section 450 and a turbomachine 420. Generally, the turbomachine 420 includes, in serial flow order, a compressor section, a combustion section, a turbine section, and an exhaust section. In a non-limiting example, the turbomachine 420 includes a core cowl 422 that defines a core inlet 424 that is annular. The core cowl 422 further encloses at least in part a low pressure system and a high pressure system. For example, the core cowl 422 depicted encloses and supports at least in part a booster or low pressure ("LP") compressor 426, a high pressure ("HP") compressor 428, a combustor 430, a high pressure turbine 432, and a low pressure turbine 434. The high pressure turbine 432 drives the high pressure compressor 428 through a high pressure shaft 436. The low pressure turbine 434 drives the low pressure compressor 426 and components of the fan section 450 through a low pressure shaft 438. After driving each of the high pressure turbine 432 and the low pressure turbine 434, combustion products exit the turbomachine 420 through a turbomachine exhaust nozzle 440.

In this manner, the turbomachine 420 defines a working gas flow path or core duct 442 that extends between the core inlet 424 and the turbomachine exhaust nozzle 440. The core duct 442 is an annular duct positioned generally inward of the core cowl 422 along the radial direction R. The core duct 442 may be referred to as a second stream.

The fan section 450 includes a fan 452, which is the primary fan in non-limiting example. One difference is that the fan 452 is an open rotor or unducted fan. In such a manner, the gas turbine engine 400 may be referred to as an open rotor engine. The fan 452 includes fan blades 454, while only a single flan blade is illustrated in FIG. 6 it will be understood that an array of fan blades are included. Moreover, the fan blades 454 can be arranged in equal spacing around the engine centerline 412. Each fan blade 454 has a root and a tip and a span defined therebetween. Each fan blade 454 defines a central blade axis 456. For this embodiment, each fan blade 454 of the fan 452 is rotatable about its central blade axis 456, e.g., in unison with one another. One or more actuators 458 are provided to facilitate such rotation and therefore may be used to change a pitch of the fan blades 454.

The fan blades 454 are rotatable about the engine centerline 412. As noted above, the fan 452 is drivingly coupled with the low pressure turbine 434 via the LP shaft 438. In a non-limiting example, the fan 452 is coupled with the LP shaft 438 via a speed reduction device, which can include by way of non-limiting examples a power gearbox or a speed reduction gearbox 455, e.g., in an indirect-drive or geared-drive configuration.

The fan section 450 further includes a fan guide vane array 460 that includes fan guide vanes 462, again while only one fan guide vane is shown in FIG. 6 it will be understood that the fan guide vanes 462 are disposed around the engine centerline 412. The fan guide vanes 462 are mounted to the fan cowl 470. In a non-limiting example, the fan guide vanes 462 are not rotatable about the engine centerline 412. Each of the fan guide vanes 462 has a root and a tip and a span defined therebetween. The fan guide vanes 462 may be unshrouded as shown in FIG. 6 or, alternatively, may be shrouded, e.g., by an annular shroud spaced outward from the tips of the fan guide vanes 462 along the radial direction R or attached to the fan guide vanes 462.

Each fan guide vane 462 defines a central blade axis 464. By way of non-limiting example, each of the fan guide vanes 462 of the fan guide vane array 460 is rotatable about its respective central blade axis 464, e.g., in unison with one another. One or more actuators 466 are provided to facilitate such rotation and therefore may be used to change a pitch of the fan guide vane 462 about its respective central blade axis 464. However, in other embodiments, each of the fan guide vanes 462 may be fixed or unable to be pitched about its central blade axis 464.

It will be understood that each of the fan blades 454 may form a composite airfoil and that the fan blades 454 can form a first stage of airfoils as described above. More specifically, each of the fan blades 454 can include a first leading edge protector 454a. It will be understood that the fan blades 454 forming the first stage of airfoils are similar to the previously described airfoils 130, 230a, and 340 with it being understood that the description of like parts applies to the fan blades unless otherwise noted.

Further still, it will be understood that each of the fan guide vanes 462 may form a composite airfoil. Further still, in the illustrated example, the fan guide vanes 462 can form a second stage of airfoils as described above. More specifically, each of the fan guide vanes 462 can include a second leading edge protector 462a. It will be understood that the fan guide vanes 462 forming the second stage of airfoils is similar to the previously described airfoils 130, 230b, and 352 with it being understood that the description of like parts applies to the fan guide vanes 462 unless otherwise noted.

It will be understood that the fan blades 454 and the fan guide vanes 462 are similar to the previously described first and second airfoil pairs with dimensions fitting in the ranges set out in TABLE 4 above.

Another difference is that the illustrated example in FIG. 6, in addition to the unducted fan 452, shows a ducted fan 484 included aft of the fan 452. In this manner, the engine 400 includes both a ducted fan 484 and an unducted fan 452, which both serve to generate thrust through the movement of air without passage through at least a portion of the turbomachine 420 (e.g., without passage through the HP compressor 428 and combustion section for the embodiment depicted). The ducted fan 484 is rotatable about the engine centerline 412. The ducted fan 484 is, by way of non-limiting example, driven by the low pressure turbine 434 (e.g. coupled to the LP shaft 438). The fan 452 may be referred to as the primary fan, and the ducted fan 484 may be referred to as a secondary fan. It will be appreciated that these terms "primary" and "secondary" are terms of convenience, and do not imply any particular importance, power, or the like.

The ducted fan 484 includes a plurality of fan blades (not separately labeled in FIG. 6) arranged in a single stage, such that the ducted fan 484 may be referred to as a single stage fan. The fan blades of the ducted fan 484 can be arranged in equal spacing around the engine centerline 412. Each blade of the ducted fan 484 has a root and a tip and a span defined therebetween.

The fan cowl 470 annularly encases at least a portion of the core cowl 422 and is generally positioned outward of at least a portion of the core cowl 422 along the radial direction R. Particularly, a downstream section of the fan cowl 470 extends over a forward portion of the core cowl 422 to define a fan duct flow path, or simply a fan duct 472. The fan flow path or fan duct 472 may be understood as forming at least a portion of the third stream of the engine 400.

Incoming air may enter through the fan duct 472 through a fan duct inlet 476 and may exit through a fan exhaust nozzle 478 to produce propulsive thrust. The fan duct 472 is an annular duct positioned generally outward of the core duct 442 along the radial direction R. The fan cowl 470 and the core cowl 422 are connected together and supported by a plurality of substantially radially extending, circumferentially-spaced stationary struts 474 (only one of which is shown in FIG. 6). The stationary struts 474 may each be aerodynamically contoured to direct air flowing thereby. Other struts in addition to the stationary struts 474 may be used to connect and support the fan cowl 470, the core cowl 422, or a combination thereof. In many embodiments, the fan duct 472 and the core duct 442 may at least partially co-extend axially on opposite radial sides of the core cowl 422. For example, the fan duct 472 and the core duct 442 may each extend directly from a leading edge 444 of the core cowl 422 and may partially co-extend generally axially on opposite radial sides of the core cowl 422.

The engine 400 also defines or includes an inlet duct 480. The inlet duct 480 extends between the engine inlet 482 and the core inlet 424, the fan duct inlet 476, or a combination thereof. The engine inlet 482 is defined generally at the forward end of the fan cowl 470 and is positioned between the fan 452 and the fan guide vane array 460 along the axial direction A. The inlet duct 480 is an annular duct that is positioned inward of the fan cowl 470 along the radial direction R. Air flowing downstream along the inlet duct 480 is split, not necessarily evenly, into the core duct 442 and the fan duct 472 by a fan duct splitter or leading edge 444 of the core cowl 422. In the embodiment depicted, the inlet duct 480 is wider than the core duct 442 along the radial direction R. The inlet duct 480 is also wider than the fan duct 472 along the radial direction R.

Air passing through the fan duct 472 may be relatively cooler than one or more fluids utilized in the turbomachine 420. In this way, one or more heat exchangers 486 may be positioned in thermal communication with the fan duct 472. For example, one or more heat exchangers 486 may be disposed within the fan duct 472 and utilized to cool one or more fluids from the core engine with the air passing through the fan duct 472, as a resource for removing heat from a fluid, e.g., compressor bleed air, oil or fuel. The heat exchanger 486 may be an annular heat exchanger.

In various embodiments, it will be appreciated that the engine includes a ratio of a quantity of vanes to a quantity of blades that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of vanes to a quantity of blades between 1:2 and 5:2. The ratio may be tuned based on a variety of factors including a size of the vanes to ensure a desired amount of swirl is removed for an airflow from the primary fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 650 to 900 fps, or 700 to 800 fps.

It will be understood that a speed reduction device including, but not limited to, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than or equal to 2. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan can be configured to rotate at a rotational speed of 700 to 1500 revolutions per minute (rpm) at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

The SPF is useful for making trade-offs when determining an amount of protection on a first airfoil in relationship to an amount on an airfoil downstream of the first airfoil. For example, when there is a limited space available for a fan blade in a fan section, knowledge of those dimensions and the downstream airfoil dimensions enables determination of an acceptable cover with a leading edge protector length allowing for sufficient leading edge protection.

Benefits associated with the SPF described herein include a quick assessment of design parameters in terms of composite airfoils in downstream relationship. Further, the SPF described herein enables a quick visualization of tradeoffs in terms of geometry that are bounded by the constraints imposed by the materials used, the available space in which the composite airfoils are located, the type of turbine engine or system enclosures and the configuration of surrounding components, or any other design constraint. The SPF enables the manufacturing of a high performing composite airfoil with peak performance with the factors available. While narrowing these multiple factors to a region of possibilities saves time, money, and resources, the largest benefit is at the system level, where the composite airfoils described herein enable improved system performance. Previously developed composite airfoils may peak in one area of performance by design, but lose efficiency or lifetime benefits in another area of performance. In other words, the stage performance factor enables the development and production of higher performing composite airfoils across multiple performance metrics within a given set of constraints.

As will be appreciated from the description above, an airfoil protection factor (APF) may be used to select an amount of coverage provided by a leading edge protector based on the leading edge length LL and the chord length CL of the airfoil. The APF is particularly important when considering weight requirements of a gas turbine engine. For example, the additional weight added by including some leading edge protectors can be offset by weight savings from airfoils formed of composite materials. Additionally, such composite materials may improve airfoil stiffness and strength, which can also improve durability of the airfoils, particularly in the event of a foreign object encounter, such as bird strikes.

In addition to forming airfoils with composite materials, such composite materials may also form primary structures and secondary, integral structures of gas turbine engines. For example, the primary structure may include the fan casing of the gas turbine engine and the secondary structure may include an integral mounting flange extending circumferentially about the fan casing. Both the fan casing and the integral mounting flange may be formed of a composite material including a plurality of fibers for increasing a strength of the integral mounting flange in the circumferential direction. Moreover, the fibers forming the integral mounting flange may allow for delamination under excessive stresses, such as stresses caused by a fan blade out event, to reduce stresses on the fan casing and prevent failure of the fan casing.

It has been further found that the primary composite structure can be fabricated to have the integral secondary structure defined at least in part by continuous fibers or fiber bundles of continuous reinforcement material that originates from within the body of the primary composite structure. The continuous fibers providing a higher load-carrying capability than a construction containing discontinuous fibers. Moreover, the secondary composite structure can include fibers extending in various fiber orientations and various degrees of interleaving, which provides greater design flexibility and reduces manufacturing costs.

As alluded to above, primary composite structures, such as a fan case or fan duct of the fan section of the gas turbine engine, may be formed from composite materials. More specifically, the fan duct can include a reinforced matrix composite having high strength flanges and pre-stressed reinforcing fibers. The reinforced matrix composite may also have a uniform distribution of matrix material and have a reduced porosity. Such a composite fan casing provides improved containment properties. For example, the composite fan casing can provide increased strength, including strong flanges, and reduced weight. Moreover, the composite fan casing can withstand blade-out events, such as contain blades inside the containment duct if such a blade out event occurs. Accordingly, the composite fan casing may prevent consequential damage resulting from a blade fragment or an entire fan blade being dislodged, such as by impact with foreign objects or during a blade release event, which may damage the surrounding fan casing and cause circumferential cracking based on the resulting load on the fan.

Furthermore, fan casings may include fabricated segments that are coupled together at axial flanges extending from ends of the segments. Moreover, the segments of the fan casing may be coupled using fasteners. During operation of the gas turbine engine, external forces and vibrational forces can cause stresses and loads on the flanges. Such stresses and loads on the flanges can not only lead to premature failing of the flanges, but also cause the fasteners to loosen and pull out. Load spreaders may be coupled to the flanges and the fasteners and extend parallel to the flanges to provide structural support and distribute load to prevent such premature flange failing and fastener loosening.

Such configurations of a fan casing for housing the airfoils formed of composite materials was found to be particularly useful when utilized with the leading edge protector contemplated by the APF and SPF relationships above, given an amount of stress absorbed by the leading edge protector contemplated by the APF and SPF relationships above. In particular, forming the fan casings, including secondary structures of the fan casing, such as flanges extending from surfaces and axial ends of the fan casing, with composite materials increases load-carrying and improves durability of the fan casing. Load spreaders may additionally be included to further distribute loads. Not only can the airfoils including the leading edge protector distribute loads from foreign object impact, e.g., bird strikes, but the composite fan casing provides additional load bearing capabilities and improved durability, particularly in cases of foreign object impact and fan blade out events.

Accordingly, the present disclosure provides a composite fan casing in combination with a leading edge protector contemplated by the APF and SPF relationships disclosed herein, resulting in a gas turbine engine having improved durability, improved system performance, and weight savings.

Figure 7:
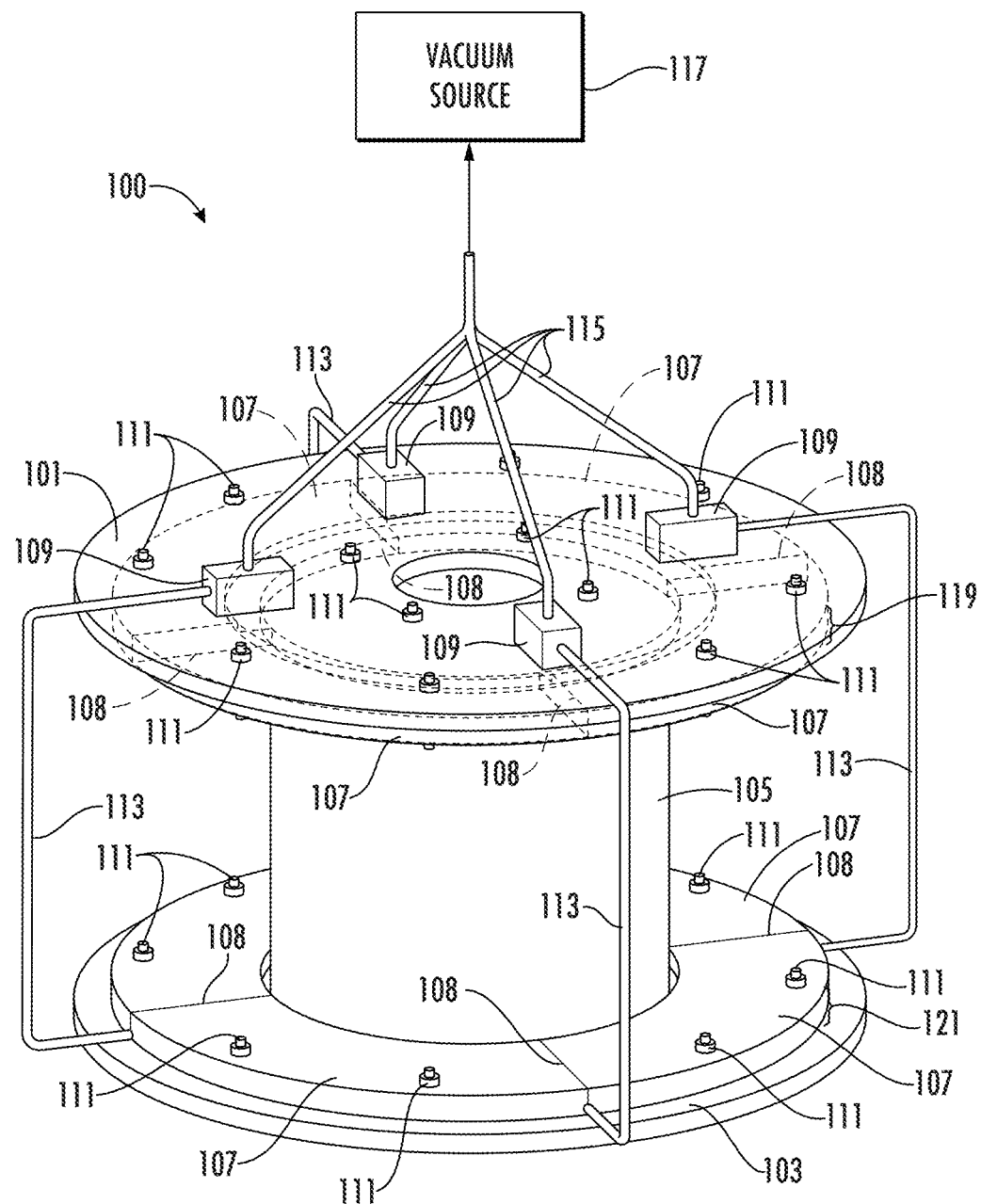
FIG. 7 is a perspective view of a tool according to the present disclosure.

FIG. 7 shows a composite duct-forming tool 100 according to an example embodiment of the present disclosure. The tool 100 includes a substantially cylindrical body 105. A first endplate 101 and a second endplate 103 are positioned adjacent to the opposed planar ends of the body 105. The body 105, the first endplate 101, and the second endplate 103 are fabricated from a material having a greater thermal coefficient of expansion than the workpiece held by the tool 100. Material for the body 105, the first endplate 101, and the second endplate 103 include, but are not limited to, metals or alloys. Suitable materials for the body 105 include aluminum and steel. The first endplate 101 is fastened to the body 105 with stress relief fasteners 111. The second endplate 103 adjacent to the body 105 is attached to the body 105. The body 105 has a substantially cylindrical geometry. The substantially cylindrical body 105 preferably tapers from a smaller diameter adjacent to the first endplate 101 to a larger diameter at the second endplate 103. Although FIG. 7 illustrates a cylindrical body 105, the body is not limited to a cylindrical shape. Alternate geometry for the body include, but are not limited to, rectangular, ovular, and triangular geometries. In an alternate embodiment, the body 105 has a substantially cylindrical geometry with a smaller diameter at the midpoint between the first and second endplates 101 and 103 and a larger diameter at each of the ends of the body 105. The body 105 may be fabricated in multiple detachable pieces to facilitate removal of finished reinforced matrix composite parts.

FIG. 7 shows a first set of flange shoes 119 positioned adjacent to the first endplate 101 circumferentially around the body 105 on the surface of the first endplate 101 nearest to the second endplate 103. A second set of flange shoes 107 are positioned adjacent to the second endplate 103 circumferentially around the body 105 on the surface of the second endplate 103 nearest to the first endplate 101. The flange shoes 107 of each of the first and second set of flange shoes 119, 121 contact each other at a flange shoe junction 108. Flange shoes 107 are plates fabricated from a material having a greater thermal coefficient of expansion than the workpiece held by the tool. Material for the flange shoes 107 include, but are not limited to, metals or alloys. Suitable materials for the flange shoes 107 include aluminum and steel. The flange shoes 107 are fastened to the first and second endplates 101 and 103 by stress relief fasteners 111. In addition to fastening the first and second endplates 101 and 103, the stress relief fasteners 111 also fasten the first endplate 101 to the body 105. As shown in FIG. 7, the stress relief fasteners 111 fastening the flange shoes 107 extend through the first and second endplates 101 and 103 and through the flange shoes 107. The stress relief fasteners 111 fastening the first endplate 101 to the body 105 extend through the first endplate 101 and into the body 105. The stress relief fasteners 111 may be any fasteners capable of positioning the first endplate 101 and the flange shoes 107 of the first and second flange shoe sets 119 and 121 during the loading of the workpiece, but yield to pressure due to thermal expansion or other forces. Stress relief comes when the fasteners holding the flange shoes 107 yield under appropriate radial stress, and the fasteners holding the end flange plate yields to relieve the axial stress. Suitable materials for stress relief fasteners 111 include, but are not limited to, nylon. One or more reservoirs 109 are located on the surface of the first endplate 101. The reservoirs 109 fluidly communicate with a vacuum source via vacuum lines 115. The reservoirs 109 are shown as separate components, but they may be manufactured integral to the first endplate 101.

Figure 8:
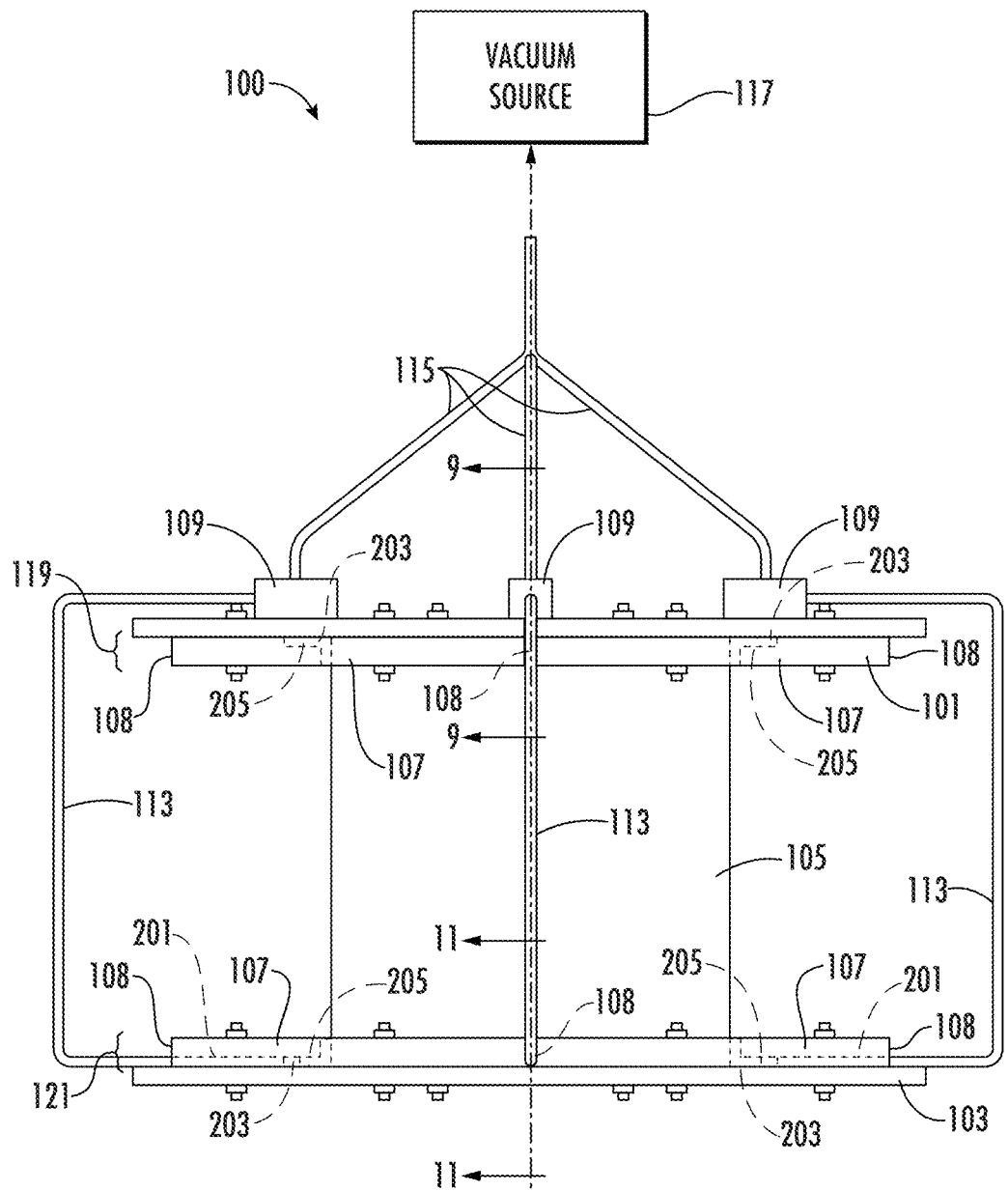
FIG. 8 is a side view of a tool according to the present disclosure

FIG. 8 illustrates one embodiment of the tool 100 oriented with the first and second endplates 101 and 103 oriented horizontally on the drawing. The orientation shown in FIG. 8 illustrates an embodiment wherein the tool 100 is loaded into an autoclave with the first endplate 101 oriented substantially horizontally above the second endplate 103 and with the center axis of the body 105 being oriented substantially in the vertical direction. Although this embodiment refers to an autoclave, any chamber having the ability to heat and provide pressure to the tool is suitable for use with the present disclosure. FIG. 8 shows the flange shoes 107 arranged circumferentially around the body 105. A first set of flange shoes 119 are fastened to the first endplate 101 on the surface nearest to the second endplate 103. A second set of flange shoes 121 are fastened to the second endplate 103 on the surface nearest to the first endplate 101.

A channel 201 is machined in flange shoe junction 108 between individual flange shoes 107 along the surface adjacent to the second endplate 103 to form a fluid connection from the inner surface 205 adjacent to the body 105 to the outer periphery of the flange shoe junctions 108. At the outer periphery of the flange shoe junction 108, a siphon tube 113 is attached and placed in fluid connection with the channel 201 adjacent to the second endplate 103. The siphon tube 113 is in fluid connection with a reservoir 109 adjacent to the first endplate 101. Each reservoir 109 is a hollow chamber that is capable of containing matrix material under vacuum. Each reservoir 109 is in fluid connection with a cavity 203 defined by the flange shoes 107, the lower surface of the first endplate 101 and the inner surface 205 of body 105. The cavity 203 is of sufficient volume to permit insertion of a portion of a workpiece (shown as fiber fabric 301 in FIGS. 9-11). The workpiece is preferably a portion of a reinforcing fiber fabric. The reservoirs 109 are also in fluid connection with a vacuum source 117 through vacuum lines 115. The vacuum source 117 provides vacuum to the reservoirs 109 to draw vacuum on the material in reservoirs 109.

Figure 9:
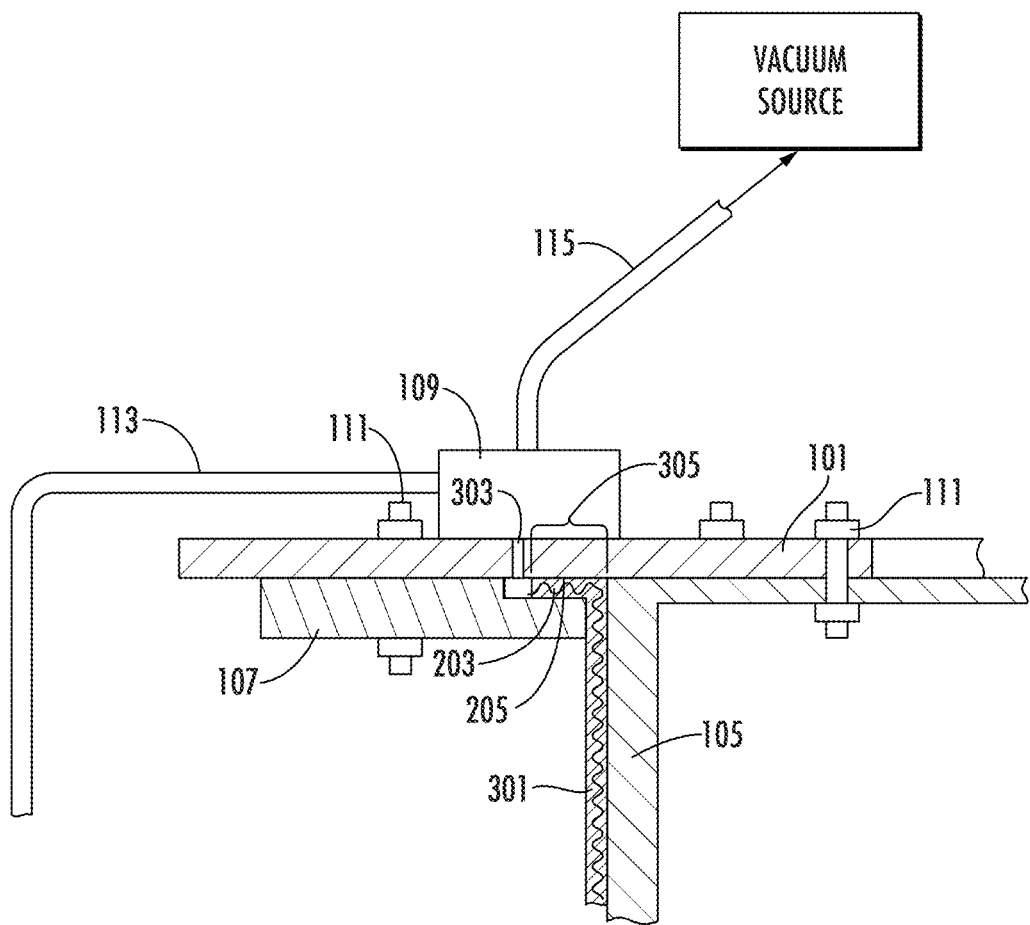
FIGS. 9 and 10 are cross sectional views alternate embodiments of a first portion of a tool according to the present disclosure.

FIG. 9 shows a cross sectional view along line 3-3 in FIG. 8. The cross section shown in FIG. 9 provides an enlarged view of a portion of the first endplate 101 wherein the first endplate 101 oriented vertically in the drawing. The first endplate 101 and body 105 are loaded with a fiber fabric preform 301. The fiber fabric preform 301 includes a flange portion 305 that extends from the body 105 along the first endplate 101. Flange shoes 107 are fastened to the first endplate 101 with a stress relief fastener 111. Likewise, the first endplate 101 is fastened to the body 105 with a stress relief fastener 111.

FIG. 9 shows the fiber fabric preform 301 positioned along the body 105 and angled at an angle of about 900 to form a flange shape in the cavity 203 defined by the flange shoes 107, the first endplate 101 and the inner surface 205 of the body 105. Cavity 203 defined by flange shoes 107, first endplate 101 and body 105 is in fluid communication with the reservoirs 109 through a matrix material distribution channel 303. The reservoirs 109 are in fluid communication with at least one vacuum line 115 and at least one siphon tube 113.

Figure 10:
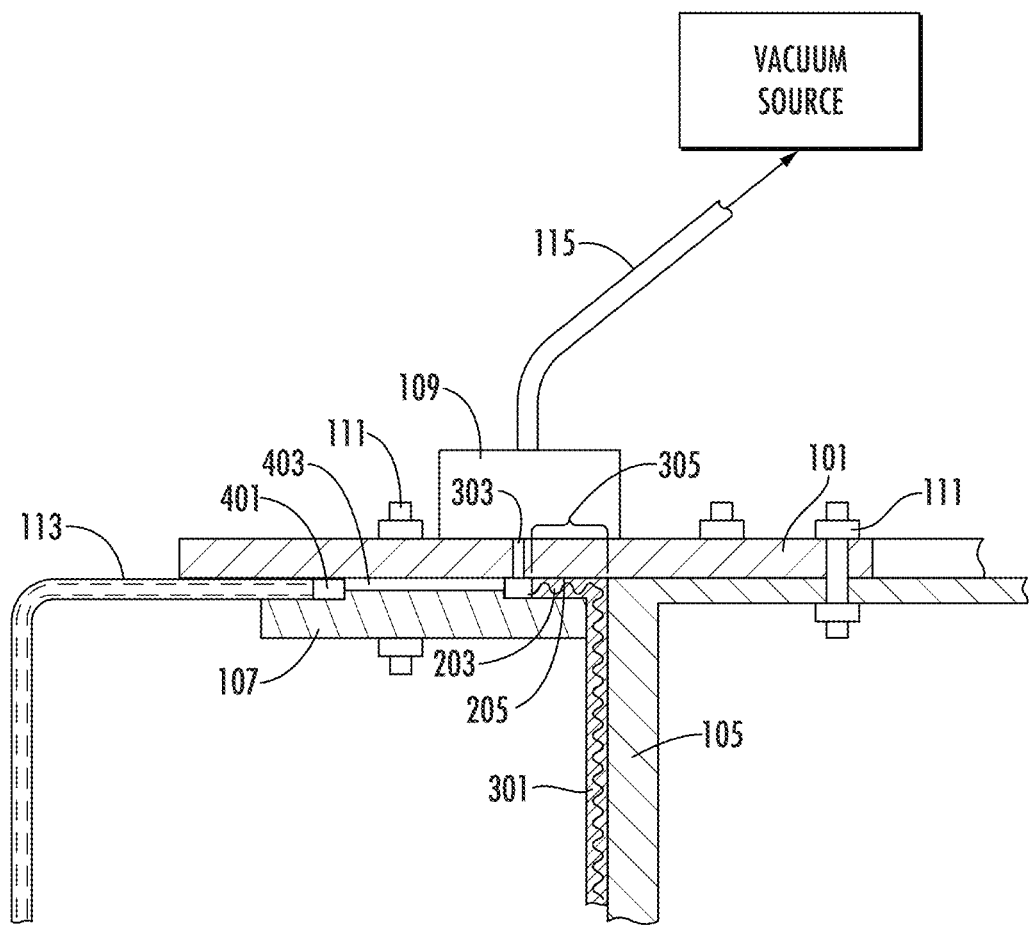

FIG. 10 shows a cross sectional view representing a view along line 3-3 in FIG. 8. The sectional view shows a portion of the composite duct-forming tool 100 having the same arrangement of body 105, flange shoes 107, fiber fabric preform 301, and first endplate 101 as FIG. 9. However, the embodiment illustrated in FIG. 10 has the siphon tube 113 inserted into a siphon tube recess 401 in the flange shoes 107. The siphon tube 113 is in fluid communication with a matrix material distribution channel 403. The matrix material distribution channel 403 extends from the siphon tube 113 to the cavity 203 defined by the flange shoes 107, the first endplate 101 and the inner surface 205 of the body 105. Cavity 203 defined by flange shoes 107, first endplate 101 and inner surface 205 of body 105 is in fluid communication with reservoirs 109 through reservoir channel 405. The reservoirs 109 are in fluid communication with a vacuum source 117 via vacuum line 115.

Figure 11:
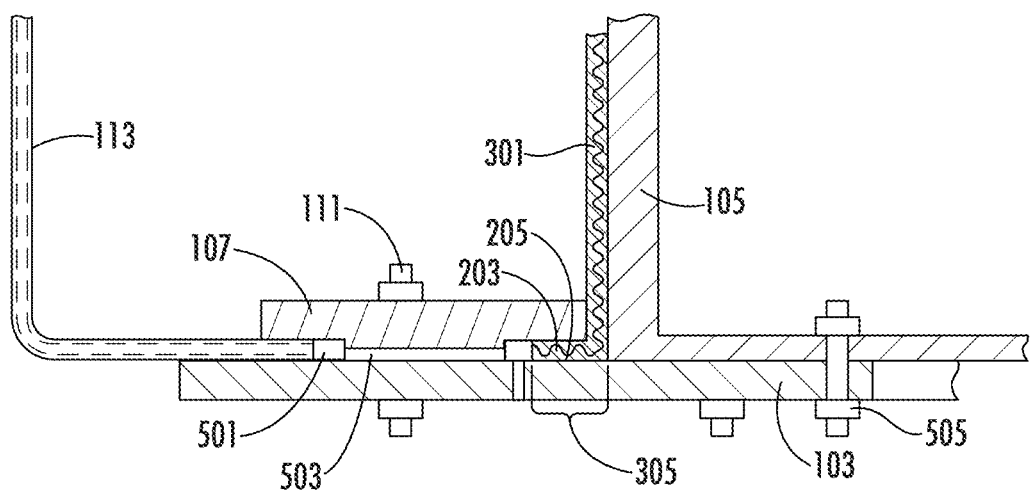
FIG. 11 is a cross sectional view of a second portion of a tool according to the present disclosure.

FIG. 11 shows a cross sectional view along line 5-5 in FIG. 8. The cross section shown in FIG. 11 provides an enlarged view of a portion of the second endplate 103 oriented vertically in the drawing, loaded with a workpiece of fiber fabric preform 301. FIG. 11 also shows flange shoes 107 fastened to the second endplate 103 with a stress relief fastener 111. The second endplate 103 is fastened to the body 105 by a second endplate fastener 505. The second endplate fastener 505 is a fastener that does not yield under pressure, like the stress relief fastener 111. The second endplate fastener 505 may be any fastener that does not yield under the stresses generated by the tool 100. In an alternative embodiment, the second endplate 103 and the body 105 may be permanently attached or a machined single piece. In such an embodiment, the second endplate 103 is integral to the body 105 and may be machined or cast as a single piece having the body 105 extend from the second endplate 103. Alternatively, the body 105 and the second endplate 103 may be welded together.

The example embodiment illustrated in FIG. 11 includes the siphon tube 113 inserted into a siphon tube recess 501 in the flange shoes 107. The siphon tube 113 is in fluid communication with a matrix material discharge channel 503. The matrix material distribution channel 503 extends from the siphon tube to cavity 203 defined by flange shoes 107, second endplate 103 and inner surface 205 of body 105.

Figure 12:
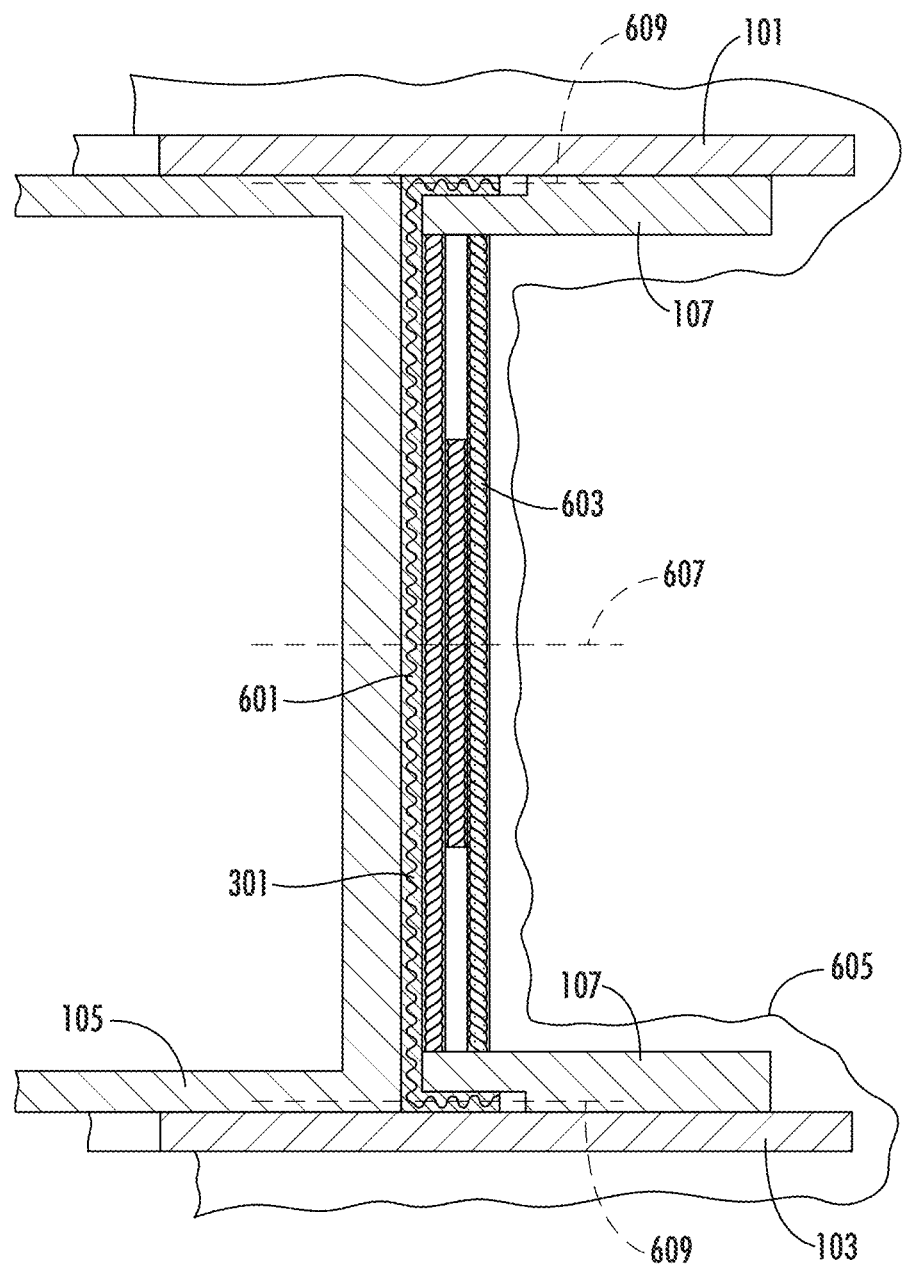
FIGS. 12 to 15 illustrate stages of the composite forming method using a tool according to the present disclosure.
Figure 13:
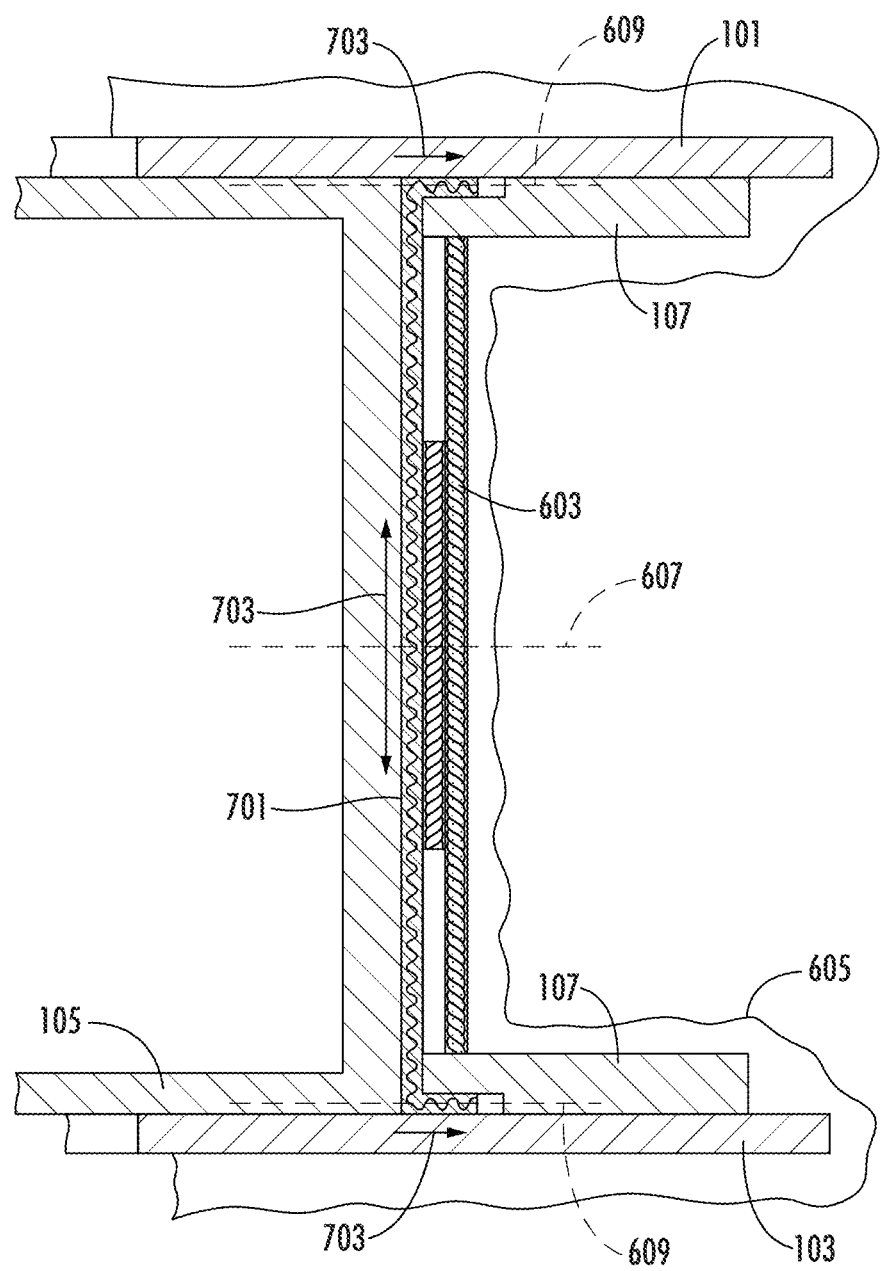
Figure 14:
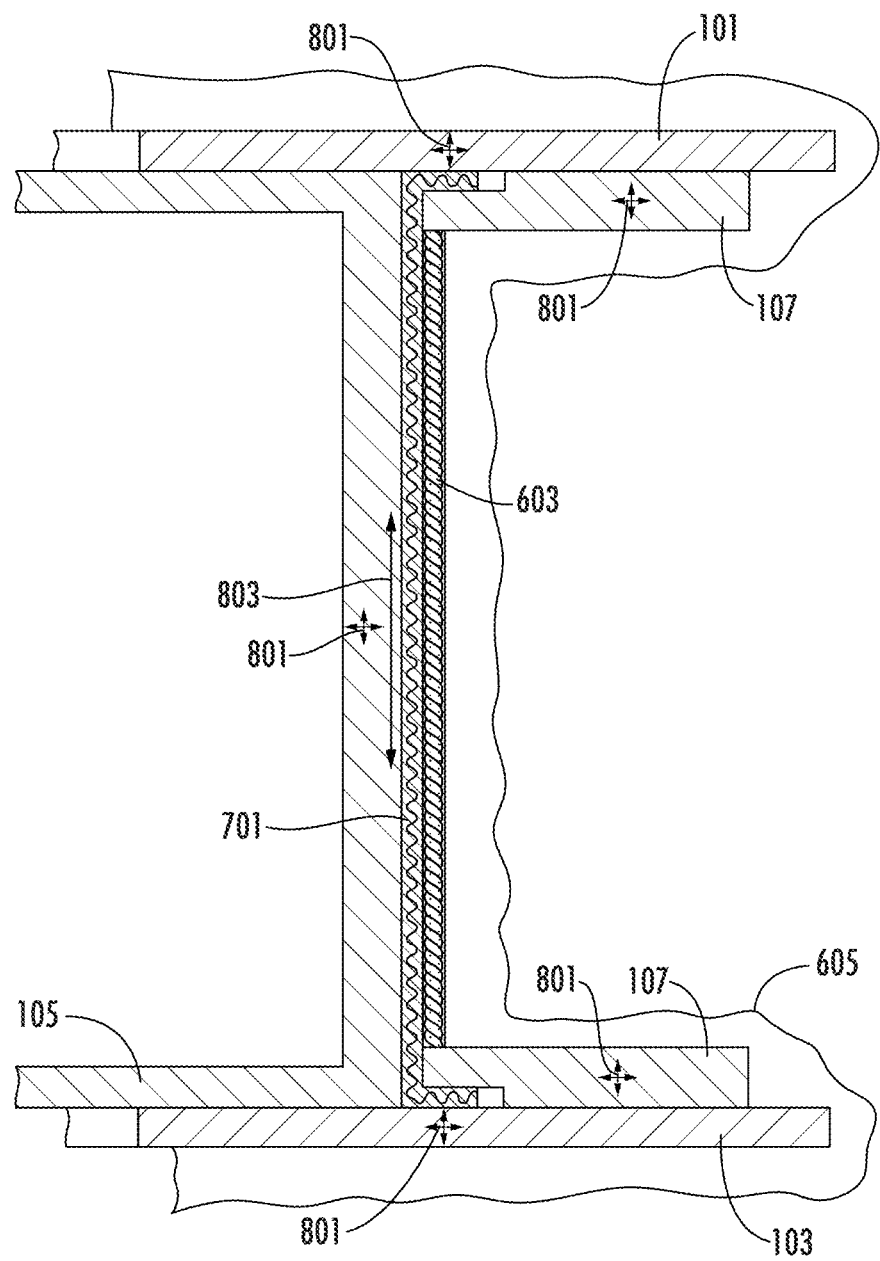
Figure 15:
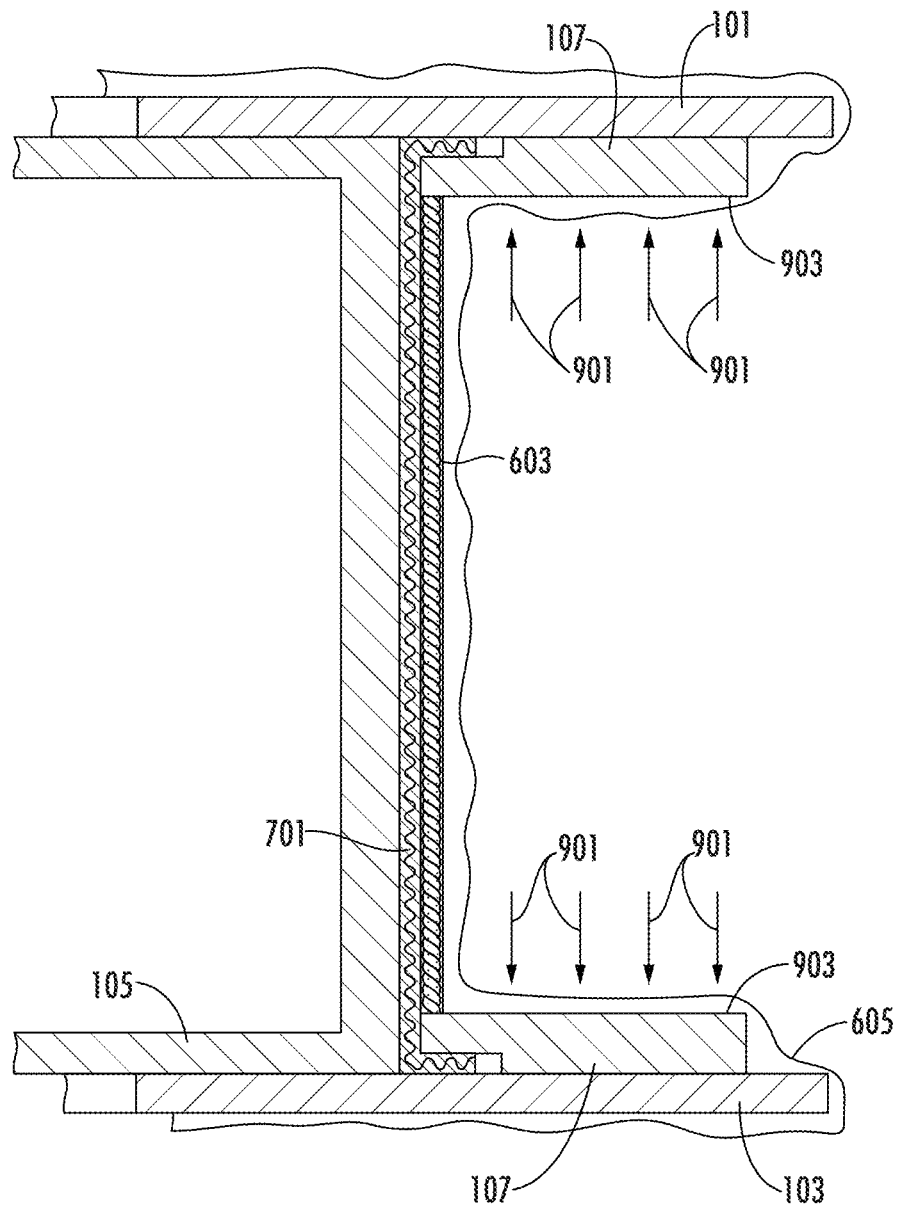

FIGS. 12-15 illustrate the composite duct-forming tool 100 loaded with the workpiece of fiber fabric preform 301 and matrix material 601 to be formed into a composite. FIGS. 12-15 illustrate various stages in the matrix material infiltration and curing process. FIG. 12 illustrates the tool 100 before loading into the autoclave (not shown). FIGS. 13 and 14 illustrate the tool 100 during heating. FIG. 15 illustrates the tool 100 under autoclave pressure. FIGS. 12-15 show a cross section taken radially from the center axis of the cylinder portion of the body 105 of the tool 100 shown in FIGS. 7 and 8. FIGS. 12-15 illustrate the tool 100 having a body 105, a first endplate 101, a second endplate 103, and flange shoes 107, arranged as shown in FIGS. 7 and 8. For illustration purposes, FIGS. 12-15 do not show the stress relief fasteners 111 and 505, the siphon tubes 113, the reservoirs 109, the vacuum lines 115, the matrix material discharge channels 503 or the matrix material distribution and vacuum channels 303, 403 and 405. It is noted that each of the above element are present in the tool 100 loaded into the autoclave, as well as a vacuum membrane or bag 605 surrounding the tool 100.

FIG. 12 shows the tool 100 before loading into the autoclave. The tool 100 is first loaded with a fiber fabric preform 301. On the fiber fabric preform 301, a layer of matrix material 601 is coated on the surface. The matrix material 601 is preferably bulk resin weighed out into discrete portions. Bulk resin is uncured resin that has not been processed into a final form (e.g., sheets or plies) and is capable of being separated into discrete portions. At room temperature, the bulk resin is preferably a pliable solid. The bulk resin is separated into substantially rectangular portions, which are placed on the surface of the fiber fabric preform 301. It is noted that any shape portion that provides resin to the surface of the fiber fabric preform 301 is suitable for use with the disclosure. After placing the portions onto the surface of the fiber fabric preform 301, the rectangular portions are conformed to the surface shape. The rectangular portions are preferably pliable at room temperature. The rectangular sections of bulk resin may optionally be preheated to increase the pliability of the resin to assist in conforming the rectangular portions to the surface shape. A suitable resin may include, but is not limited to, epoxy or polyamide resin. The matrix material 601 is coated onto the surface of the fiber fabric preform 301 so that a greater amount of matrix material 601 (i.e., a greater amount of matrix material per unit of surface area) is coated onto the center 607 of the fiber fabric preform 301 (i.e., the midpoint between the first and second endplates 101 and 103) and a lesser amount (i.e., a lesser amount of matrix material per unit of surface area) is coated on the edges 609 of the fiber fabric preform 301 (i.e., the area adjacent the first and second endplates 101 and 103). Although this embodiment refers to bulk resin, any matrix material capable of forming a reinforced matrix composite may be used with the present disclosure.

After the tool 100 is loaded with the matrix material 601, an elastomer caul 603 is placed onto the matrix material 601 coated fiber fabric preform 301. The caul 603 is formed from a material that is a barrier to the passage of matrix material 601. Suitable material for the caul 603, includes, but is not limited to, silicone. Any material which will not bond with the matrix material and which can withstand the heat and pressure and is flexible may be used as the material for the caul 603. The caul 603 is positioned so that the matrix material 601 may only travel along the fiber fabric preform 301, into the area adjacent to the first and second endplates 101 and 103 where the matrix material 601 may enter the matrix material discharge channels 503 or the matrix material distribution and vacuum channels 303, 403 and 405, the siphon tubes 113 or the reservoirs 109, as illustrated in FIGS. 7-11. Once the tool 100 is loaded, the loaded tool 100 is placed inside a vacuum bag 605. Tool 100 provides a method for manufacturing fiber reinforced matrix composites wherein the process only requires a single vacuum bag 605.

FIG. 13 illustrates the tool 100 and the movement of matrix material 601 when exposed to heat, during heating and holdings steps of a curing cycle. The matrix material 601 upon heating becomes liquid or fluid and begins to infiltrate the fiber fabric preform 301 to create a partially impregnated fiber fabric preform 701. As the matrix material 601 becomes liquid or fluid, the material flows from the center 607 of the fiber fabric preform 301 (i.e., the midpoint between the first and second endplates 101 and 103) in the direction of arrows 703. As the matrix material 601, now a liquid resin, moves from the center 607 of the fiber fabric preform 301 to the outer edges 609, air, volatile gases devolve from the matrix material 601, and other materials, such as impurities or gases trapped in the fiber fabric preform 301, that potentially could cause void space are pushed by the flow of bulk matrix material 601 toward the outer edges 609 of the fabric adjacent to the first and second endplates 101 and 103. Excess matrix material 601, air, volatile gases from the bulk matrix material 601 and other materials that potentially could cause void space flow into the siphon tube 113 and are drawn into either the reservoirs 109 or into cavity 203 defined by flange shoes 107, second endplate 101 and inner surface 205 of the body 105 through the matrix material distribution channel 403, as illustrated in FIGS. 7-11.

FIG. 14 illustrates the tool 100 and partially impregnated fiber fabric preform 701 when exposed to heat, during the heat up and hold steps of the curing cycle. The first endplate 101, second endplate 103, the body 105, and the flange shoes 107 are fabricated from a material that has a greater thermal coefficient of expansion than the partially impregnated fiber fabric preform 701. As a result, during heat-up, as shown in FIG. 14, each of the first endplate 101, second endplate 103, the body 105, and the flange shoes 107 expand in all directions as shown by arrows 801. The partially impregnated fiber fabric preform 701 expands very little in comparison to the body 105. The difference in the amount of thermal expansion of the tool 100 against the partially impregnated fiber fabric preform 701 results in a tensional force shown by arrows 803 that acts to pull the partially impregnated fiber fabric preform 701 taut. Fiber fabric preforms 701 that are pulled taut before matrix material curing provide uniform materials with high strength substantially free of waves and wrinkles.

FIG. 15 illustrates the tool 100 when exposed to pressure, during the heat up and hold steps of the curing cycle. Flange shoes 107 are fabricated with a large surface area 903 in the plane parallel to the first and second endplates 101 and 103. As the pressure in the autoclave is increased during the curing cycle, the force of the pressure of the autoclave atmosphere, shown by arrows 901, on the vacuum bag 605 and flange shoes 107 surface is multiplied by the surface area 903 of flange shoes 107. Flange shoes 107 surface is greater in surface area 903 than the fiber fabric preform 701 forming the flange-like shape so as to add substantial position holding force from autoclave pressure. The pressure holds the fiber fabric preform 701 in place while the body 105 expands and pulls the fiber fabric preform 301 taut.

Figure 16:
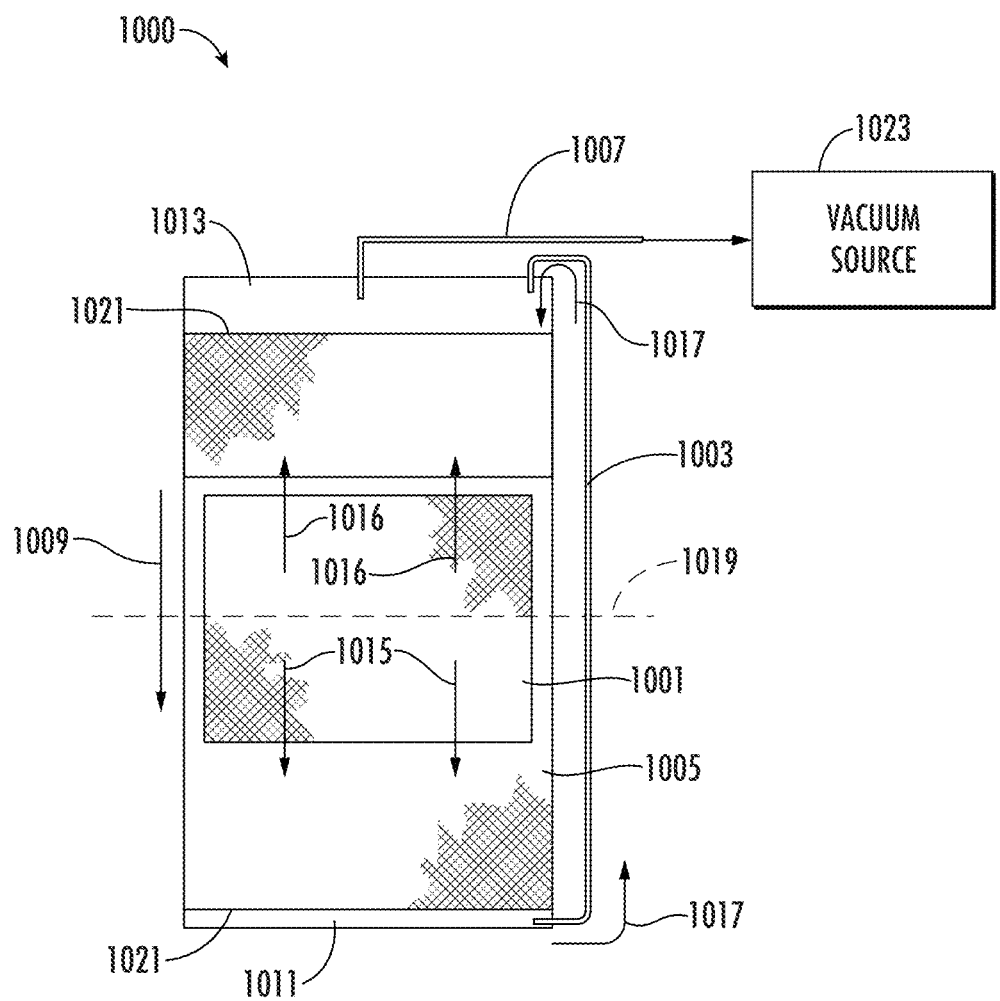
FIG. 16 is a schematic view of a matrix material distribution system according to the present disclosure.

FIG. 16 illustrates a matrix material distribution system 1000 for fabricating a fiber-reinforced matrix composite (not shown). A fiber fabric preform 1005 is loaded with matrix material 1001, wherein a greater amount of matrix material 1001 is positioned in the center 1019 of the fiber fabric preform 1005 than at the edges 1021.

In order to form the fiber reinforced matrix composite (not shown), the fiber fabric preform 1005 coated with the matrix material 1001 is mounted vertically and the system 1000 is exposed to vacuum through vacuum line 1007 and sufficient heat to make the matrix material 1001 viscous. The movement of the matrix material 1001 within the fiber fabric preform 1005 is illustrated as arrows 1015 and 1016 in FIG. 16. Initially, the viscous matrix material 1001 travels in two directions shown by arrows 1015 and 1016. A larger portion of the matrix material 1001 (shown as arrow 1015) travels in the direction of gravity (arrow 1009) and a smaller portion (shown as arrow 1016) is drawn in a direction toward the vacuum line 1007. The vacuum line 1007 is fluidly connected to vacuum source 1023.

The matrix material 1001 traveling in the direction of gravity (shown by arrow 1009) gathers in a collection well 1011. The collection well 1011 fluidly communicates with a distribution well 1013 through a siphon tube 1003. The distribution well 1013 is a chamber adjacent to the vacuum line 1007 and the upper edge of the fiber fabric preform 1005. Matrix material 1001 is drawn from the collection well 1011 to the distribution well 1013 by suction from the vacuum line 1007, as shown by arrows 1017. The system is self-regulating and continues until the matrix material 1001 throughout the fiber fabric preform 1005 material is substantially uniformly distributed throughout the fiber fabric preform 1005. The system is self-regulating in that siphon tube 1003 continues to draw matrix material 1001 from the collection well 1011 to the distribution well 1013 as long as the pressure differential across the matrix material 1001 impregnated fiber fabric preform 1005 is greater than the pressure differential across the siphon tube 1003. Once the pressure across the siphon tube 1003 is equal to the pressure across the impregnated fiber fabric preform 1005, the matrix material 1001 is no longer drawn from the collection well 1011 to the distribution well 1013. The resultant matrix impregnated fiber fabric preform 1005 contains substantially uniform distribution of matrix material 1001. The impregnated fiber fabric preform 1005 is further heated to complete the curing cycle and to produce a fiber reinforced matrix composite.

Figure 17:
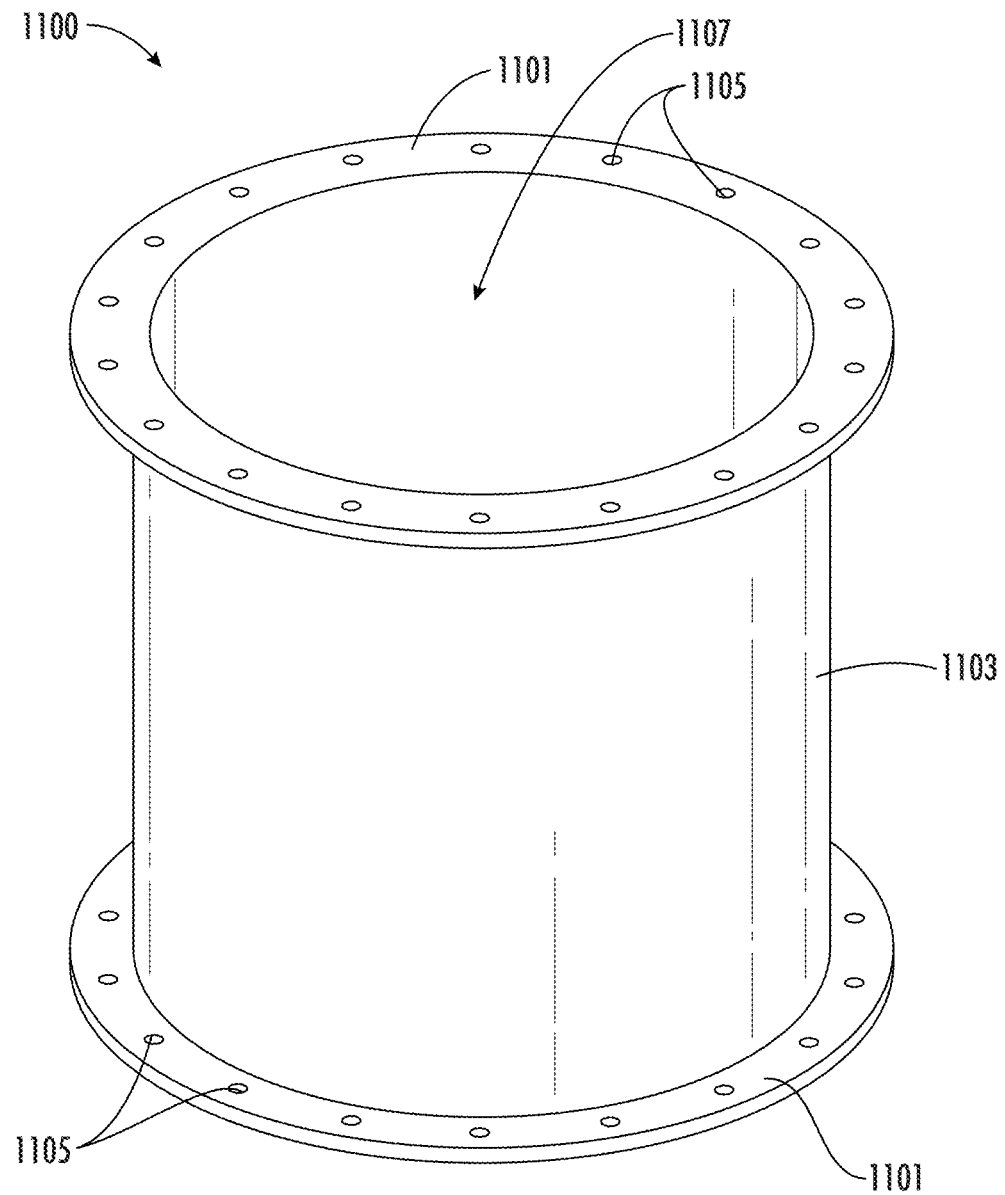
FIG. 17 is a perspective view of a composite containment duct according to the present disclosure.

FIG. 17 illustrates a composite containment duct 1100 according to the present disclosure. Composite containment duct 1100 is the product made by tool 100 (see FIGS. 7-8). Composite containment duct 1100 is a single piece having a duct body 1103 and integral high strength flanges 1101. Additionally, holes 1105 are machined into the flange 1101 to allow fasteners to attach the composite containment duct 1100 to other bodies. Flanges 1101 provide a surface to which composite containment duct 1100 may be attached to another body. Another body may include a second composite containment duct 1100. The attachment of two containment ducts has the advantage of additional length and the ability to create ducts that have converging and diverging duct areas. In this embodiment, a composite containment duct 1100 has a tapered duct body 1103, wherein the diameter of the duct at one flange is larger than the diameter of the duct at the other flange. In some containment duct applications, a containment duct having both a converging portion and a diverging portion is desirable. To form a containment duct 1100 that converges in one portion and diverges in another portion, a tapered containment duct 1100 is attached by the flanges at the end of the containment duct having the smaller duct diameter to a second substantially identical tapered containment duct 1100. Attachment of the flanges at the smaller duct diameter permits a duct that diverges from one end of the combined containment duct to the center and diverges from the center of the combined containment duct to a second end of the combined containment duct. The flanges may also be fastened to a portion of a gas turbine engine (not shown). In one embodiment, the flanges may be fastened to the gas turbine engine so that the fan blades (not shown) of the gas turbine engine are positioned in the interior portion 1107 of the duct body 1103 substantially along the outer periphery of the path of the fan blade tips to provide containment of the fan blades.

At least one example embodiment includes providing a tool 100 having a surface having the shape of the desired composite. In an example embodiment, the body 105 is substantially the shape of a cylindrical containment duct. In such an embodiment, the cylindrical duct preferably tapers inward toward the center axis of the body 105. The shape of the finished reinforced matrix composite is not limited to substantially cylindrical shapes. Any shape having flanged outer edges may be fabricated by the method of the present disclosure. Suitable shapes, in addition to the substantially cylindrical ducts, include, but are not limited to, ducts having complex cross-sectional geometry (e.g., rectangular ducts, triangular ducts or oval ducts), flat panels, and other complex shapes having wall-structures. Additionally, wall-structures having features may be formed using the tool 100 and method of the present disclosure. The tool 100, likewise, has body 105 of substantially the same shape as the finished composite.

The tool 100 is fabricated from a material having a coefficient of thermal expansion greater than the coefficient of thermal expansion of the fiber fabric preform 301. One criteria for selection of the tool material is the amount of tension desired in the fiber fabric preform 301. The greater the tension desired, the greater the coefficient of thermal expansion should be for the tool material. The less tension desired, the less the coefficient of thermal expansion should be for the tool material. Preferably, the tool 100 is fabricated from a metallic material. Fibers that make up the fiber fabric preform 301 have a relatively low coefficient of thermal expansion when compared to metallic materials. Therefore, when the tool 100 is exposed to heat, the tool material expands at a rate much faster than the rate of expansion of the fiber fabric preform 301. The tension created by the expansion of the tool 100 in relation to the expansion of the fiber fabric preform 301 acts to pull the fiber fabric preform 301 taut and substantially aligns the fibers to produce a high strength, uniform composite substantially devoid of waves and wrinkles. The greater the thermal expansion of the tool 100 in relation to the fibers, the greater the tension created. Suitable materials for fabrication of the tool 100 include, but are not limited to, aluminum and steel.

The reinforcing material for the composite matrix is preferably woven fiber fabric. The fiber fabric is a preform capable of forming a reinforced matrix composite. A variety of fibers is suitable for use in composite matrix materials. The fibers may be woven or plied upon each other to form a composite preform. In an example embodiment, the fiber fabric preform 301 is a triaxial woven fabric of strand bundles. The triaxial woven fabric has one strand bundle running axially, with another stand bundle oriented at about +60° from the bundle in the axial direction and a third strand bundle oriented at −60° from the bundle in the axial direction. Suitable fibers for forming the fiber fabric preform 301 include, but are not limited to, carbon, graphite, glass and polyamide fibers. The fiber fabric preform 301 is preferably dry. By dry, it means that there is no matrix material impregnated into the fiber fabric prior to loading the fiber fabric preform 301 onto the tool 100.

The matrix material 601 for use in the reinforced matrix composite may be a curable material that forms a high strength matrix composite when reinforced with reinforcing fibers. Suitable matrix materials 601 may include, but are not limited to, epoxy and polyimide.

The process of the present disclosure includes loading the tool 100 with the material for forming the reinforced matrix composite. The tool 100 is first loaded with the material for reinforcement of the matrix in the finished composite material. The reinforcing material is preferably a fiber fabric preform 301. The fabric of fibers is preferably a fabric having a woven structure. Preferably the woven structure has three independent bundles of fibers woven so as to have orientations of 600 angles to each other. The fibers are preferably graphite fibers. The fabric may include, but is not limited to triaxial graphite fiber. A preferred fiber fabric preform 301 includes the triaxial graphite fiber with a 24 k (i.e., 24,000 strand) bundle tow in the axial direction and two 12 k (i.e., 12,000 strand) bundles in the +60° direction from the tow in the axial direction and two 12 k bundles in the −60° direction from the tow in the axial direction.

In at least one example embodiment, the tool 100 preferably has a preselected geometry of a spool. The spool shape includes a substantially cylindrical body 105 affixed to two endplates 101 and 103. At least one of the two endplates 101 and 103 is fastened to the body and is detachable. In such an embodiment, the tool 100 is oriented with the endplates 101 and 103 positioned having their planar surfaces oriented vertically in order to load the tool 100 with the reinforcing fiber material. The graphite fiber fabric preform 301 is positioned around the body 105 of the spool. A flange portion 305 of the preform is positioned along the length of each of endplates 101 and 103. The flange portion 305 of the fabric extending along the first and second endplates 101 and 103 forms a flange-like shape.

Once the fiber fabric preform 301 is loaded onto the tool, a plurality of plates (i.e., flange shoes 107) are arranged abutting one another along the periphery of the tool 100 along the endplates 101 and 103. A first set of plates is adjacent to the first endplate 101. A second set of plates is adjacent to the second endplate 103. The plates are preferably metallic and have at least one surface having a surface area 903 greater than the surface area of the length of material extending along the length of the endplates 101 and 103. The plates are positioned to provide support for the fabric material extending along the endplates 101 and 103 and forming the flange portion 305 and are fastened to the endplates with stress release fasteners 111. Each stress release fastener 111 is a fastener that positions the shoe at room temperature prior to the curing cycle and releases the flange shoes 107 from the first and second endplates 101 and 103 during the heat up portion of a curing cycle. As the tool expands axially, the stress release fasteners are designed to yield rather than prevent movement of the tool. So, the fastener maintains the flange shoes 107 in position, against the flange, but yields to allow the tool to expand axially.

In an example embodiment, one or more of the plates are provided with channels 201, 303, 403, 405, 503 to facilitate circulation of excess resin. The channels 201, 303, 403, 405, 503 permit passage of matrix material 601 from the area of the tool carrying the matrix coated fibers to outside the area of the tool carrying the matrix coated fibers. The channels 201, 303, 403, 405, 503 allow excess matrix material 601 to pass into or out of the area of the tool 100 holding the fiber fabric preform 301. When the tool 100 is positioned to have the first and second endplates 101 and 103 aligned horizontally with respect to the autoclave during loading, the second endplate 103 at the bottom includes one or more openings that are fluidly communicate to the area of the tool providing the vacuum, preferably at or near the top first endplate 101 of the tool. The tool 100 includes reservoirs 109 positioned on the top of the first endplate 101 when the first and second endplates 101 and 103 are aligned horizontally. In this embodiment, the vacuum fluidly communicate with reservoirs 109, as well as fluid communication with openings in the flange shoes 107. The fluid communications act as a siphon allowing excess matrix material 601 that pools because of gravity to travel to the area of the tool having suction, thereby providing matrix material 601 to areas of the fiber having less matrix material 601, including the areas at or near the first endplate 101. The siphon tubes 113 allow a uniform distribution of the matrix material 601 across the fiber fabric preform 301.

The tool 100 is then covered with matrix material 601, preferably in bulk form. The matrix material 601 is loaded onto the fiber fabric preform 301 by coating matrix material 601 directly onto the surface of the fiber fabric preform 301. The placement of the matrix material 601 onto the reinforcing fiber fabric preform 301 includes placing a preselected amount of matrix material 601 onto the surface of the fiber fabric preform 301. The preselected amount of matrix material 601 is an amount sufficient to impregnate the preform. The matrix material 601 is stacked or laid up on the surface in discrete portions. Once the matrix material 601 is placed onto the surface of the fiber fabric preform a barrier caul 603 is placed over the matrix material 601 to hold it in place until the tool is loaded into the autoclave. During the heating phase, the stacked or laid up matrix material layers (i.e., lay-up) will melt and infiltrate into the fiber fabric preform 301. Force applied to the matrix material 601 from the autoclave pressure on the caul 603 will assist the matrix material 601 in penetrating the fiber fabric preform 301 and in spreading outward across the fiber fabric preform 301. The molten matrix material mass forms a wavefront as it flows across the fiber fabric preform 301 that forces the gaseous pockets out of the preform before the resin begins to set up and cure. In particular, the wavefront pushes out air, volatile material from the bulk matrix material 601, such as solvent vapor, and other gases that are capable of forming voids, such as impurity gas pockets remaining in the matrix material or in the fiber fabric preform 301. The placement of the matrix material 601 also permits the impregnation of preforms having complex shapes. Complex shapes include preforms having more complex geometric features than a flanged cylinder. Features may be present in preforms having more than one pathway for matrix material flow prior to curing. For example, reinforced matrix composite parts may include planar wall portions having attached stiffener or insert features.

In an example embodiment, the matrix material 601 is resin separated into rectangular block sections, positioned onto the surface, and conformed to the surface of the fiber fabric preform. The resin may include, but is not limited to, epoxy, polyimide, or a combination thereof. The matrix material 601 is coated onto the surface of the fiber fabric preform 301 so that a greater amount of matrix material 601 is coated onto the center 607 of the fiber fabric preform 301 (i.e., the midpoint between the first and second endplates 101 and 103, as illustrated in FIG. 12) and less is coated on the edges 609 of the fiber fabric preform 301 (i.e., the area adjacent the first and second endplates 101 and 103, as illustrated in FIG. 12).

Once the fiber fabric preform 301 is coated with the matrix material 601, the matrix material coated fiber fabric preform 301 is coated with an elastomeric sheet (i.e., caul 603). The caul 603 acts as a barrier to isolate and control the flow of matrix material into the fiber fabric preform 301. After the caul 603 is positioned, the caul 603 is sealed against the tool 100 to form a barrier and prevent flow of matrix through the caul 603, but allow flow along the fiber fabric preform 301.

Once the caul 603 has been placed around the fabric-matrix material and sealed, the tool 100, including caul 603 and matrix material 601 coated fiber fabric preform 301, is placed inside a vacuum envelope or bag 605. A vacuum source 117 is connected to the vacuum bag 605 and the tool 100 to provide reduced pressure (i.e., vacuum). The vacuum source 605 preferably draws a vacuum of up to about 28 inches of mercury and more preferably up to about 30 inches of mercury. The vacuum provides a driving force for distribution of the matrix material 601 during the heat up and curing phases of the process. The vacuum is drawn on the tool 100 through the vacuum bag 605. The loaded tool 100 is then heated. While the tool 100 is being heated, a positive pressure of gas external to the vacuum bag 605 is provided. The positive pressure is preferably provided with an inert gas, such as nitrogen. During the heating and holding cycle the positive pressure is preferably increased to pressures of up to about 200 lb/in$^2$ or more, and preferably up to about 220 lb/in$^2$ or more. When loaded into the autoclave, the tool 100 is preferably oriented with the plane of the first and second endplates 101 and 103 aligned horizontally with respect to the autoclave.

In order to form the composite, the caul-covered fiber fabric preform 301 loaded with matrix material 601 is heated. The matrix material 601 becomes viscous at higher temperatures and flows into (i.e., impregnates) the fiber fabric preform 301. Simultaneously, the tool 100 on which the fiber fabric perform 301 is loaded expands due to thermal expansion. Since the fiber fabric preform 301 experiences little or no thermal expansion, the fiber fabric preform 301 is pulled taut, providing at least some tension and alignment of fibers in the fiber fabric preform 301. The tool 100 and the matrix coated fiber fabric preform 301 is then heated to a temperature to permit the matrix material to fully impregnate the fiber fabric preform 301. After the fiber fabric preform 301 is substantially impregnated, the tool 100 and fiber fabric preform 301 are heated to a curing temperature, and is held at the curing temperature until the fiber reinforced matrix composite is cured. The method includes at least the following steps: a first heating step, a first holding step, second heating step, a second holding step and a cooling step. The temperature is slowly increased to the first holding temperature. A suitable rate of temperature increase includes but is not limited to range of from about ½ ° F./min to about 1° F./min. The temperature and time for the first holding step is sufficient to allow the matrix material to infiltrate the reinforcing fibers. A suitable temperature for the first holding step includes, but is not limited to the range of from about 300° F. to about 325° F. Suitable temperatures for the first holding step include, but are not limited to about 310° F. The temperature and time for the second holding step is sufficient to cure the matrix material. A suitable temperature for the second holding step includes, but is not limited to the range from about 350° F. to about 375° F. Suitable temperatures for the second holding step include, but are not limited to about 360° F. Once cured, the reinforced matrix composite is slowly cooled to room temperature.

During the heating steps, the heating gases of the autoclave are distributed across the tool 100 to provide uniform heating of the matrix impregnated fiber fabric. Preferably, the body 105 is hollow and/or has an interior surface, opposite the surface on which the fiber fabric preform 301 is positioned. In this embodiment, the interior surface is exposed to the heating atmosphere to heat the fiber fabric preform 301 and matrix material 601 through the body 105. In a preferred embodiment as shown in FIG. 7, the tool body is hollow and substantially cylindrical in shape. The exterior (i.e., the surface on which the fiber fabric preform 301 is positioned) and the interior of the cylinder are exposed to the heating atmosphere through the vacuum bag 605. The inlet to the hollow portion of the cylinder may include a diffuser to uniformly distribute the heating atmosphere. The heating atmosphere distributes the heat uniformly across the matrix impregnated fiber fabric 701 to uniformly cure of the reinforced composite matrix.

During the heating and vacuum cycle, the caul 603 permits the matrix material 601 to travel either in the direction toward the vacuum or in the direction of gravity. More matrix material 601 travels in the direction of gravity than in the direction of the vacuum. The openings in the flange shoes 107 permit excess matrix material to exit the portion of the tool 100 holding the fiber. When the tool 100 is positioned with the first and second endplates 101 and 103 aligned horizontally, the endplate at the bottom (i.e., second endplate 103) includes one or more channels 201 that are fluidly connected to the area of the tool 100 providing the vacuum at or near the reservoirs 109. The area of the tool 100 providing the vacuum is preferably at or near the top endplate (i.e., first endplate 101) of the tool 100. In one embodiment, the tool 100 includes reservoirs 109 positioned on the top of the first endplate 101 when the first and second endplates 101 and 103 are aligned horizontally. In this embodiment, the vacuum source 117 is connected to the reservoirs 109, as well as the fluid connection to the openings in the flange shoes 107. The fluid connections act as a siphon allowing excess matrix material that pools because of gravity to travel to the area of the tool 100 having suction and providing matrix material to the area of the fiber having less matrix material 601.

As the tool 100 is heated, it thermally expands. The tool 100 is made of a material that expands at a rate in excess of the rate of expansion of the fiber fabric preform 301 and matrix material 601. Therefore, as the tool 100 expands, the fiber fabric preform 301 expands at a significantly lesser rate and is pulled taut by the expanding tool 100, creating pre-stressed fiber reinforcement. Once the matrix material 601 has been substantially distributed and cured at the larger tool surface area 903, the tool 100 is then permitted to cool down to ambient temperatures. The tool 100 material thermally contracts with the falling temperature. However, the fiber consolidated with matrix material, which was pulled taut and cured at the size of the tool 100 surface at the higher temperature, thermally contracts at a significantly lesser rate. As the tool 100 material cools, the fiber consolidated with matrix material 601 exerts a force on at least one of the first and second endplates 101 and 103 because the surface of the cured reinforced matrix material 601 at lower temperatures is larger than the tool surface at lower temperatures. The at least one first and second endplate 101 and 103 is allowed to move and the fasteners holding the at least one of the endplates (i.e., first endplate 101) yield, allowing the endplate to be moved as the body of the tool 100 expands. Thus, the yielding of the fasteners 111 does not allow the flange assembly to restrain the body of the tool 100. Once the cycle is complete and reinforced bulk matrix material 601 having the prestressed reinforcing fibers are cured and cooled, the reinforced bulk matrix material 601 is removed from the tool 100 and trimmed, if necessary. Also, if necessary due to the geometry of the finished part, the body 105 may be disassembled to facilitate removal of the cured, reinforced matrix composite part. The fasteners 111 are disposable and are not reused.

The various surfaces of the tool 100 that come in contact with the matrix material 601 may optionally be coated with a release film, such as polytetrafluoroethylene. The release does not stick to the tool components and facilitate easy removal of the finished part. For example, the body 105, the first and second endplates 101 and 103, the flange shoes 107, and/or the caul 603 may be coated with polytetrafluoroethylene.

In an alternative example embodiment, a pre-impregnated fiber fabric preform 301 is loaded onto the tool 100. Pre-impregnated fiber fabric preform 301 is fabric that is loaded with uncured matrix material 601 prior to being loaded onto the tool 100. Flange shoes 107 are positioned on the tool 100 and adjacent to the pre-impregnated fiber fabric preform 301. Flange shoes 107 for use with pre-impregnated fiber fabric preform 301 additionally have rails, guides or a similar mechanism, to guide flange shoes 107 displacement when autoclave pressure is applied. As in the embodiment having the fiber fabric preform 301 that is not pre-impregnated with matrix material 601, flange shoes 107 are greater in surface area than the fiber fabric preform 301 in the flange portion 305 to add substantial position holding force from autoclave pressure. As the tool 100 expands during cure cycle heat up, it pulls the fibers of the fiber fabric preform 301 taut over the flange shoes 107 radius. The rails, guides, or similar mechanism, are positioned to permit the flange shoes 107 to only allow force on the fabric once the tool 100 has expanded to an extent corresponding to heat sufficient to make the matrix material 601 in the pre-impregnated fiber fabric viscous. Once the matrix material 601 is viscous, the flange shoes 107 are permitted to exert force on the fiber fabric preform 301 and pull the fiber fabric taut. As in the embodiment with the dry fiber fabric, pulling the fiber fabric taut creates a pre-stressed fiber reinforced matrix composite. The tool 100 and finished product cool down and the tool 100 thermally contracts but the finished reinforced matrix composite does not contract as much. Flange shoes 107 and the first endplate 101 are fastened with stress relief fasteners 111. Relief comes when the stress relief fasteners 111 holding the flange shoes 107 give under appropriate radial stress and the stress relief fasteners 111 holding the first endplate 101 gives to relieve the axial stress.

In at least one example embodiment, a composite containment duct 1100 has less than or equal to 2.5% void space. The composite containment duct 1100 preferably has less than 2.0% void space and most preferably less than 1% void space.

The composite containment duct 1100 may have improved containment properties. In one example embodiment, the composite containment duct 1100 includes a graphite fiber-epoxy matrix composite containment duct. The graphite-fiber epoxy matrix composite has the properties of having high strength, including strong flanges, being lightweight and successfully passing a blade-out test. A blade-out test is a test wherein a gas turbine engine is mounted with a full set of fan blades and a containment duct around the periphery of the blade path. The fan blades are subjected to rotational speeds equivalent to the rotational speeds achieved during aircraft takeoff. One or more blades are ejected from the mounting and are allowed to impact the containment duct. A successful blade-out test holds the blade inside the containment duct. The method discussed herein is particularly suitable for fabrication of turbine airfoil components for gas turbine engines. In particular, the method discussed herein is suitable for the fabrication of containment ducts, such as fan casings, which withstand a blade-out test.

The method and tool 100 is capable of fabricating large parts. The size of the part is slightly less than the size of the surface of the tool 100. The tool 100 and method are particularly suitable for fabrication of parts having large wall-structures, including cylindrical parts having a diameters of about 5 feet or greater, including cylindrical parts having a diameter of about 10 feet. In an example embodiment, the tool 100 may create a cylindrical part having a diameter of about ten feet or greater that maintain substantially uniform matrix distribution and the low void content.

The flanges 1101 of the containment duct 1100 may have high strength. One contributing factor for high strength is the fact that the flanges 1101 are formed as an integral part of the containment duct 1100. Additionally, the fibers within the flange 1101 are pulled taut, providing substantial alignment and increased strength. Additionally, the matrix distribution within the containment duct is substantially uniform across the duct body 1103 and across the flanges 1101. The substantially uniform distribution within the flanges 1101 contribute the high strength of the flanges 1101. The flanges 1101, like the wall-portions, have pre-stressed reinforcing fibers and uniform matrix distribution.

The method and tool 100 described herein provides composites of near-net-shape after impregnation and curing of the fiber fabric preform 301. The tool 100 provides the fiber fabric preform 301 with the shape of the desired product, while impregnating it with matrix material 601. Once cured, the matrix material 601 impregnated fiber fabric preform 301 is of near-net-shape, requiring little or no trimming. The method for manufacturing fiber reinforced matrix composites according to the present disclosure provides composite parts substantially having the shape of the finished product, requiring little or no trimming prior to installation.

Removal of the finished part from the tool 100 of the present disclosure is relatively simple and inexpensive. In addition to the optional release film, the first endplate 101 detaches from the body allowing removal of the part from the body 105. The tool 100 does not require disassembly beyond the components of the tool 100 that detach during the curing cycle. Therefore, the removal of the finished part requires very little labor and is inexpensive.

Figure 18:
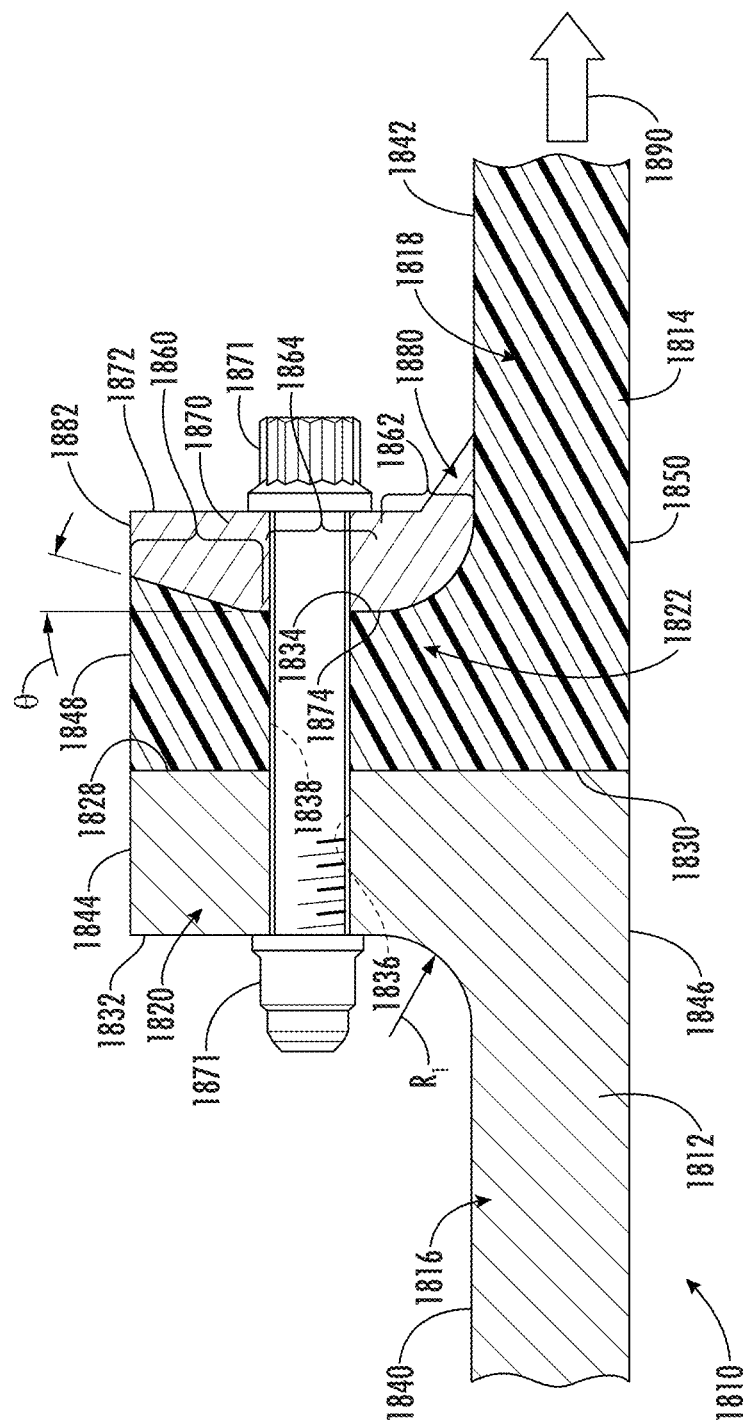
FIG. 18 is a side view of an exemplary coupling assembly that may be used to couple a pair of components together.

FIG. 18 is a side view of an exemplary embodiment of a coupling assembly 1810 that may be used to fasten a pair of components 1812 and 1814 together. In the exemplary embodiment, components 1812 and 1814 are casing sections coupled together for use with a turbine engine assembly (not shown). Coupling assembly 1810 is not limited to being used with turbine casing components 1812 and 1814, but rather coupling assembly 1810 may be used to couple any adjacent components together as described herein. Accordingly, the specific size, shape, and configuration of coupling assembly 1810, as described and/or illustrated herein, is exemplary only. Accordingly, the specific size, shape, and/or configuration of coupling assembly 1810 generally, as well as portions thereof, may be selected to accommodate other components than engine casing sections 1812 and 1814. In the exemplary embodiment, component 1814 is fabricated from a composite material.

In at least one example embodiment, each component 1812 and 1814 includes a respective casing body 1816 and 1818, and a respective flange 1820 and 1822. Each flange 1820 and 1822 extends substantially perpendicularly outward from each respective casing body 1816 and 1818. Alternatively, depending on the application of coupling assembly 1810, each flange 1820 and 1822 may be oriented at any angle relative to each respective casing body 1816 and 1818, or may extend from any other component, that enables coupling assembly 1810 to function as described herein.

In the exemplary embodiment, component 1812 and 1814 are annular structures and accordingly, each flange 1820 and 1822 extends circumferentially around each respective component 1812 and 1814. More specifically, flanges 1820 and 1822 may be generally mirror images of each other, with the differences being described herein. As such, each flange 1820 and 1822 includes a respective mating surface 1828 and 1830 and an oppositely disposed load bearing surface 1832 and 1834, respectively. In the exemplary embodiment, at least a portion of mating surface 1828 and 1830 is substantially parallel to at least a portion of each respective loading surface 1832 and 1834, as described herein. Each flange also includes an opening 1836 and 1838, respectively, extending therethrough between each respective mating surface 1828 and 1830 and each load bearing surface 1832 and 34.

Each flange 1820 and 1822 extends from an end of each component 1812 and 1814 such that each mating surface 1828 and 1830 defines an end surface of each component 1812 and 1814. Moreover, in the exemplary embodiment, the intersection between each load bearing surface 1832 and 34 and the outer surface 1840 and 1842 of each respective component 1812 and 1814 is formed with the same radius of curvature R1.

In the exemplary embodiment, flange 1820 has a generally rectangular cross-sectional profile and is formed such that mating surface 1828 extends from an end surface 1844 of flange 1820 to an inner surface 1846 of component 1812. Moreover, the mating surface 1828 is substantially parallel to load bearing surface 1832, and opening 1836 is oriented substantially perpendicularly to surfaces 1828 and 1832. Similarly, mating surface 1830 extends from an end surface 1848 of flange 1822 to an inner surface 1850 of component 1814, and is substantially perpendicular to component inner surface 1850.

Flange 1822 is formed with an outer end portion 1860, an inner end portion 1862, and a body portion 1864 extending integrally therebetween. Accordingly, inner end portion 1862 is formed integrally between flange body portion 1864 and casing body 1818. In the exemplary embodiment, flange body portion 1864 has a substantially rectangular cross-sectional profile, and as such, within flange body portion 1864, load bearing surface 1834 is substantially parallel to mating surface 1830.

In the exemplary embodiment, flange outer end portion 1860 has a partial frusto-conical or partial dovetailed cross-sectional profile. As such, that portion of load bearing surface 1834 extending over end portion 1860 is aligned obliquely at an angle θ (measured with respect to mating surface 1830) with respect to those portions of load bearing surface 1834 extending over flange body portion 1864 and flange inner end portion 1862. Specifically, in the exemplary embodiment, angle θ is equal to approximately 8°.

Coupling assembly 1810 also includes a load-spreader or backer plate, such as load-spreader 1870, and a fastener 1871. In the exemplary embodiment, load-spreader 1870 is a separate component that is coupled within coupling assembly 1810. Alternatively, the load-spreader 1870 may be formed integrally with component 1814. The load-spreader 1870 includes a load bearing surface 1872 and an oppositely-disposed mating surface 1874. In the exemplary embodiment, mating surface 1874 is contoured with a shape that substantially mirrors that of flange load bearing surface 1834. Accordingly, when load-spreader 1870 is positioned adjacent coupling flange 1822, mating surface 1874 is positioned substantially flush against flange load bearing surface 1834.

To facilitate enhanced structural support and load distribution qualities, as described in more detail below, an inner end portion 1880 of load-spreader 1870 is also formed with a partial frusto-conical or partial dovetailed profile. Accordingly, within inner end portion 1880, load bearing surface 1872 is oriented obliquely with respect to the remainder of load bearing surface extending from inner end portion 1880 to an end surface 1882 of load-spreader 1870. More specifically, with the exception of within inner end portion 1880, load-spreader load bearing surface 1872 is substantially parallel to flange mating surfaces 1828 and 1830, as well as that portion of load bearing surface 1834 defined by flange body portion 1864.

In the exemplary embodiment, fastener 1871 is a threaded bolt and nut assembly that is sized to be inserted through an opening 86 defined in load-spreader 1870 as well as flange openings 1836 and 1838. More specifically, during use, initially, component 1812 is positioned adjacent to component 1814 such that flange 1820 is adjacent to flange 1822. Mating surfaces 1828 and 1830 are pressed into contact and load-spreader 1870 is positioned adjacent flange 1822. As fastener 1871 is tightened, component 1812 is securely coupled to component 1814, such that load-spreader load bearing surface 1872 load-spreader load bearing surface 1872 is substantially parallel to flange mating surfaces 1828 and 1830. More specifically, the partial dovetail shape of flange outer end portion 1860 in combination with the complimentary shape of load-spreader 1870 facilitates distributing loading induced by fastener 1871 substantially evenly across load-spreader 1870. Thus, loading induced to flange 1822 is also facilitated to be distributed substantially evenly across flange 1822.

The combination of the complimentary shapes of flange outer end portion 1860 and of load-spreader 1870 also facilitate preventing fastener pull out. For example, when subjected to loading (indicated as an arrow 1890) the complimentary shapes of flange outer end portion 1860 in combination with the complimentary shape of load-spreader 1870 prevent flange 1822 from being pulled or straightened without compressing the composite flange 1822 between flange 1820 and load-spreader 1870. Because the compression capability of the composite flange 1822 is greater than the frictional resistance between mating surfaces 1828 and 1830, the forces required to fail the coupling between flanges 1820 and 1822 is facilitated to be increased. As a result, the combination of the shape of flange outer end portion 1860 and load-spreader 1870 facilitate increasing a useful life of components 1812 and 1814. Moreover, the combination of the shape of flange outer end portion 1860 and load-spreader 1870 facilitates increasing the overall strength of flange 1822 such that less material may be used to provide the same strength, and as such, weight savings may be realized.

Figure 19:
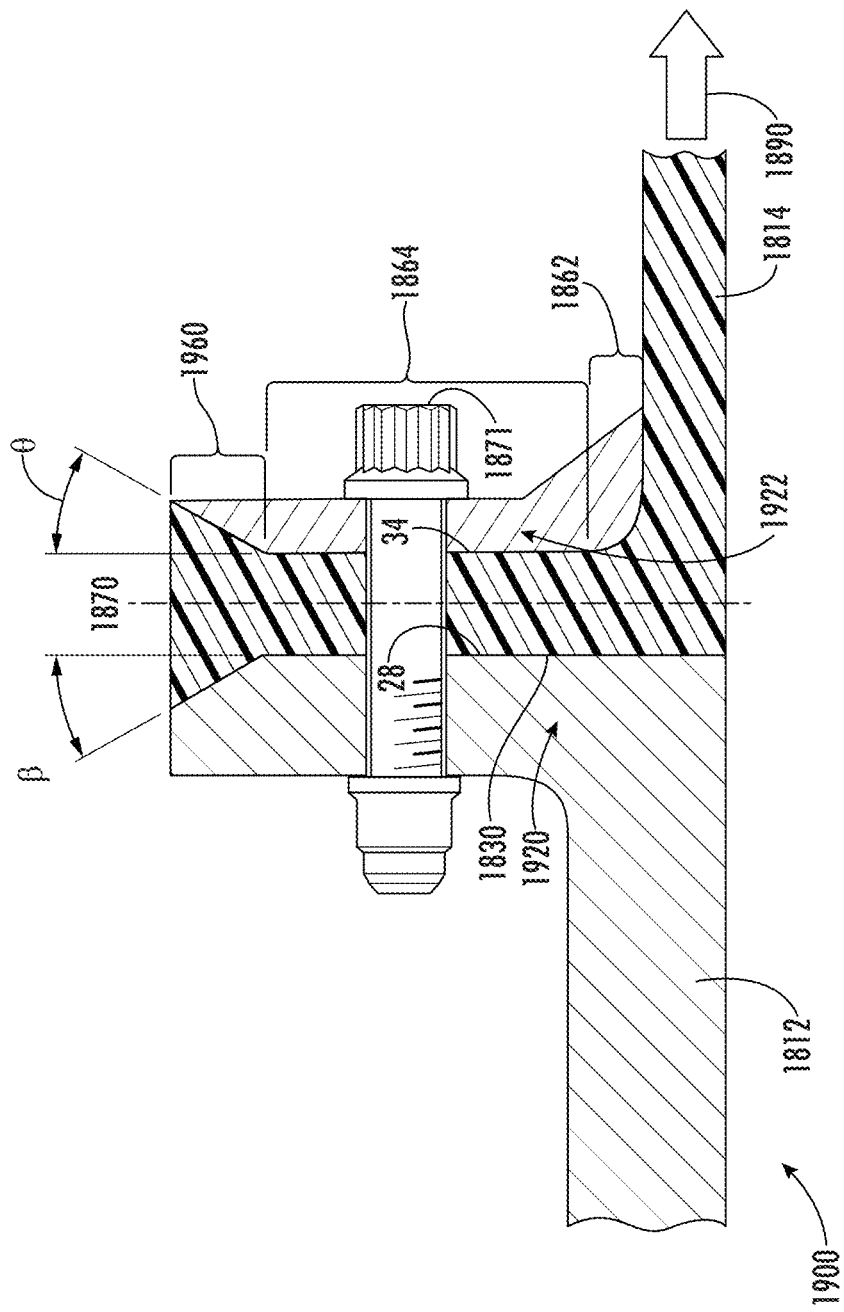
FIG. 19 is a side view of alternative embodiment of a coupling assembly that may be used to couple a pair of components together.

FIG. 19 is a side view of alternative embodiment of a coupling assembly 1900 that may be used to couple components 1812 and 1814 together. Coupling assembly 1900 is substantially similar to coupling assembly 1810, shown in FIG. 18, and components in coupling assembly 1900 that are identical to components of coupling assembly 1810 are identified in FIG. 19 using the same reference numerals used in FIG. 18. Accordingly, coupling assembly 1900 is used to couple a pair of components together, such as components 1812 and 1814.

Within coupling assembly 1900, component 1812 includes a flange 1920 and component 1814 includes a flange 1922. Flange 1922 extends from an end of component 1814 and includes an outer end portion 1960 that is formed integrally with inner end portion 1862 and body portion 1864. Outer end portion 1960 has a frusto-conical or dovetailed cross-sectional profile that is at least partially defined by flange mating surface 1830 and by flange load-bearing surface 1834. Specifically, similarly, to flange outer end portion 1860 (shown in FIG. 18), the portion of flange load-bearing surface 1834 extending over outer end portion 1960 is aligned obliquely at angle θ, with respect to mating surface 1830.

Similarly, the portion of flange mating surface 1830 extending over outer end portion 1960 is aligned obliquely at an angle β measured with respect to mating surface 1830. In the exemplary embodiment, outer end portion 1960 is symmetric about a center line axis of symmetry CL such that angle β and angle θ each extend for the same number of degrees but in opposite orientations with respect to each other.

Accordingly, to enable flange 1920 to mate substantially flush against flange 1922, within coupling assembly 1900 flange 1920 includes an outer end portion 164 that is tapered with a contoured shape that substantially mirrors that of flange outer end portion 1960.

The complimentary shapes of flanges 1920 and 1922, in combination with the complimentary shapes of flange 1922 and load-spreader 1870 facilitate preventing fastener 1871 pull out. Specifically, when subjected to loading 90, the complimentary shapes of flanges 1920 and 1922, in combination with the complimentary shapes of flange 1922 and load-spreader 1870 facilitate preventing flange 1922 from being pulled or straightened without compressing the composite flange 1922 between flange 1920 and load-spreader 1870. Because the compression capability of composite flange 1922 is greater than the frictional resistance between mating surfaces 1828 and 1830, the forces required to fail the coupling between flanges 1920 and 1922 is facilitated to be increased. As a result, the combination of the shape of flange outer end portion 1960 and flange 1920 facilitates increasing the overall strength of flange 1922 such that less material may be used to provide the same strength, and as such, weight savings may be realized.

Figure 20:
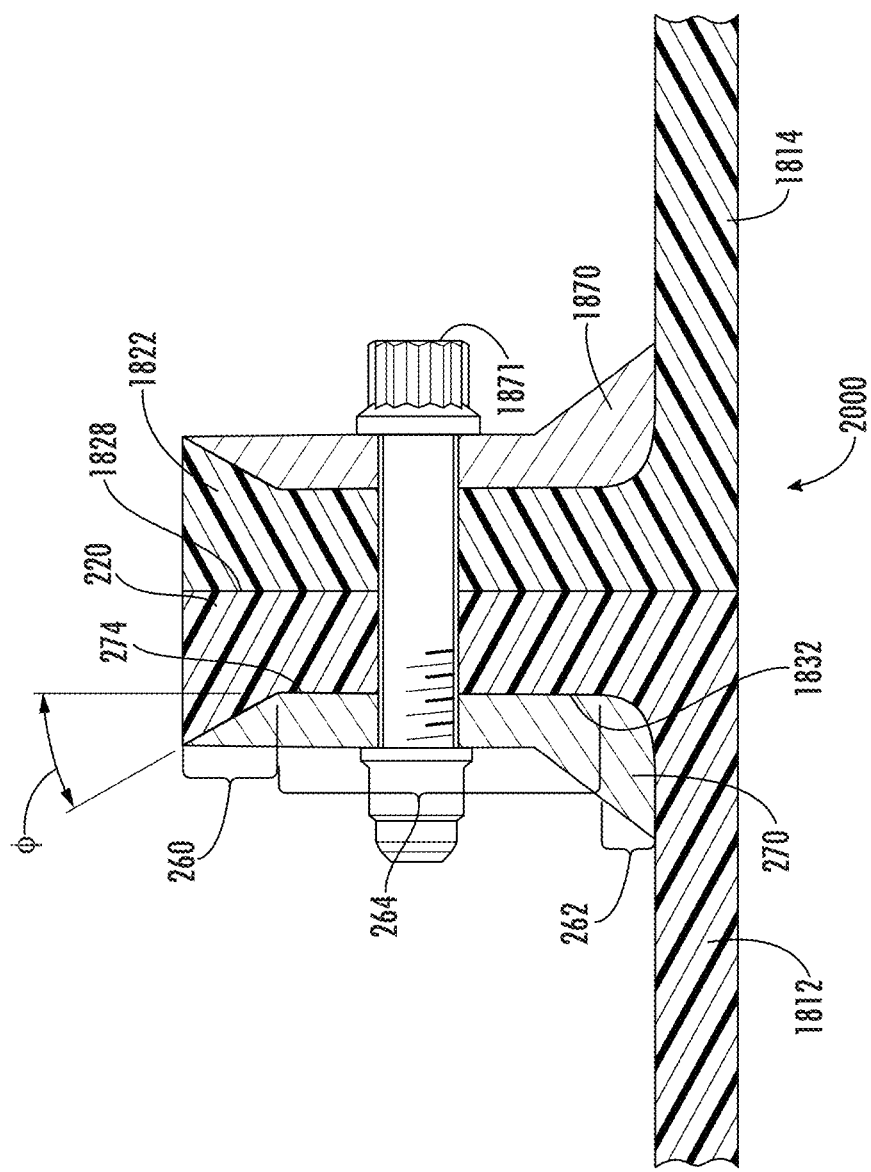
FIG. 20 is a side view of a further alternative embodiment of a coupling assembly that may be used to couple a pair of components together.

FIG. 20 is a side view of an alternative embodiment of a coupling assembly 2000 that may be used to couple a pair of components, such as components 1812 and 1814, together. Coupling assembly 2000 is substantially similar to coupling assembly 1810, shown in FIG. 18, and components in coupling assembly 2000 that are identical to components of coupling assembly 1810 are identified in FIG. 20 using the same reference numerals used in FIG. 18. Accordingly, component 1814 includes flange 1822 and coupling assembly 2000 also includes fastener 1871 and load-spreader 1870.

Within coupling assembly 1900, component 1812 includes a flange 220 that extends from an end of component 1812. Flange 220 is substantially similar to flange 1822 and in the exemplary embodiment, is a mirror image of flange 1822. Accordingly, flange 220 includes an outer end portion 260 that is formed integrally with an inner end portion 262 and a body portion 264 that extends between outer end portion 260 and inner end portion 262. Flange outer end portion 260 has a partial frusto-conical or partial dovetailed cross-sectional profile. As such, that portion of load bearing surface 1832 extending over end portion 260 is aligned obliquely at an angle Φ (measured with respect to mating surface 1828) with respect to those portions of load bearing surface 1832 extending over flange body portion 264 and flange inner end portion 262.

In addition, coupling assembly 2000 includes a second load-spreader 270 that is substantially similar to, and in a mirrored relationship with, load-spreader 1870. Accordingly, a load-bearing surface 274 of load-spreader 270 is contoured with a shape that substantially mirrors that of flange load-bearing surface 1832. Accordingly, when flange 220 is positioned adjacent load-spreader 270, load-bearing surface 274 is positioned substantially flush against load bearing surface 1832.

Figure 21:
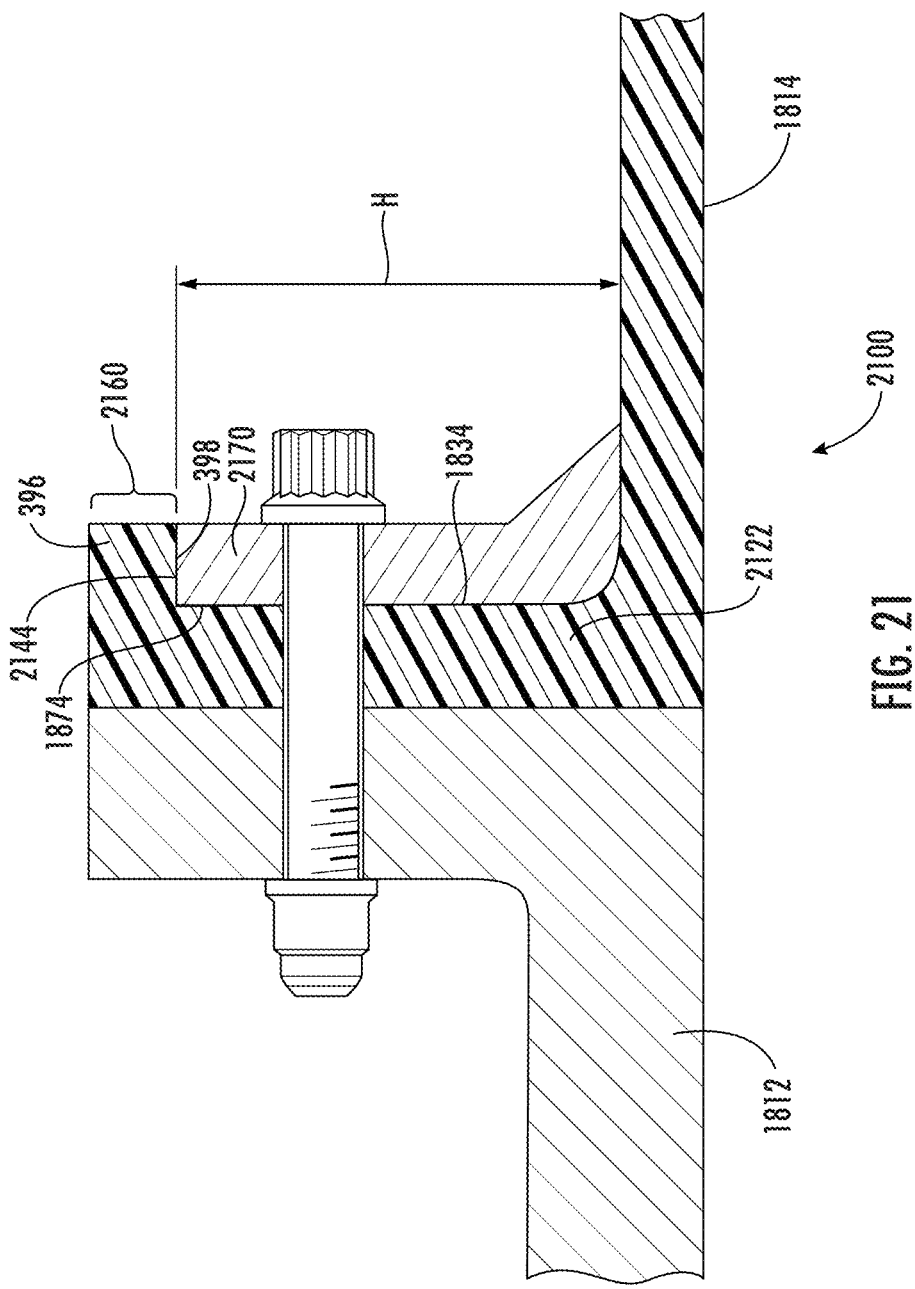
FIG. 21 is a side view of another embodiment of a coupling assembly that may be used to couple a pair of components together.

FIG. 21 is a side view of alternative embodiment of a coupling assembly 2100 that may be used to that may be used to couple components' 1812 and 1814 together. Coupling assembly 2100 is substantially similar to coupling assembly 1810, shown in FIG. 18, and components in coupling assembly 2100 that are identical to components of coupling assembly 1810 are identified in FIG. 21 using the same reference numerals used in FIG. 18. Accordingly, coupling assembly 2100 is used to couple components 1812 and 1814 together.

In the exemplary embodiment, flange 2122 outer end portion 2160 includes a rabbitted surface 396 that extends substantially perpendicularly outward from flange load bearing surface 1834. Mating surface 74 has a height H that is sized to enable surface 396 to extend above load-spreader 2170. Accordingly, when flange 2122 is positioned adjacent load-spreader 2170, a lower surface 398 of surface 396 is positioned substantially flush against an upper surface 2199 of load-spreader 2170.

Figure 22:
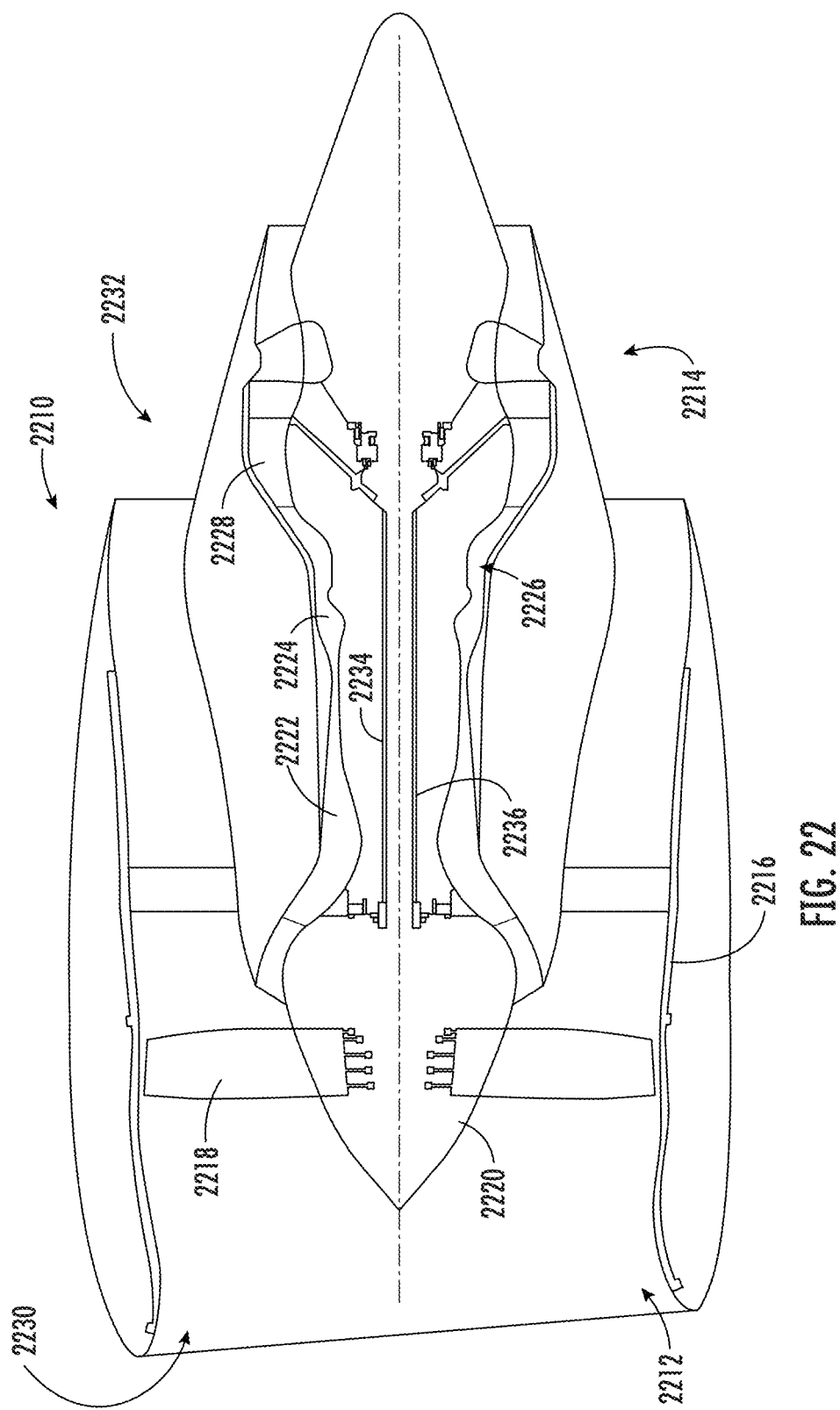
FIG. 22 is a schematic cross-sectional view of one embodiment of a gas turbine engine.

FIG. 22 is a schematic representation of an example embodiment of a gas turbine engine 2210 that generally includes a fan assembly 2212 and a core engine 2214. Fan assembly 2212 may include a fan casing 2216 and an array of fan blades 2218 extending radially outwardly from a rotor disc 2220. Core engine 2214 may include a high-pressure compressor 2222, a combustor 2224, a high-pressure turbine 2226 and a low-pressure turbine 2228. Engine 2210 has an intake side 2230 and an exhaust side 2232. Fan assembly 2212 and low-pressure turbine 2228 may be coupled by a first rotor shaft 2234 while high-pressure compressor 2222 and high-pressure turbine 2226 may be coupled by a second rotor shaft 2236.

Figure 23:
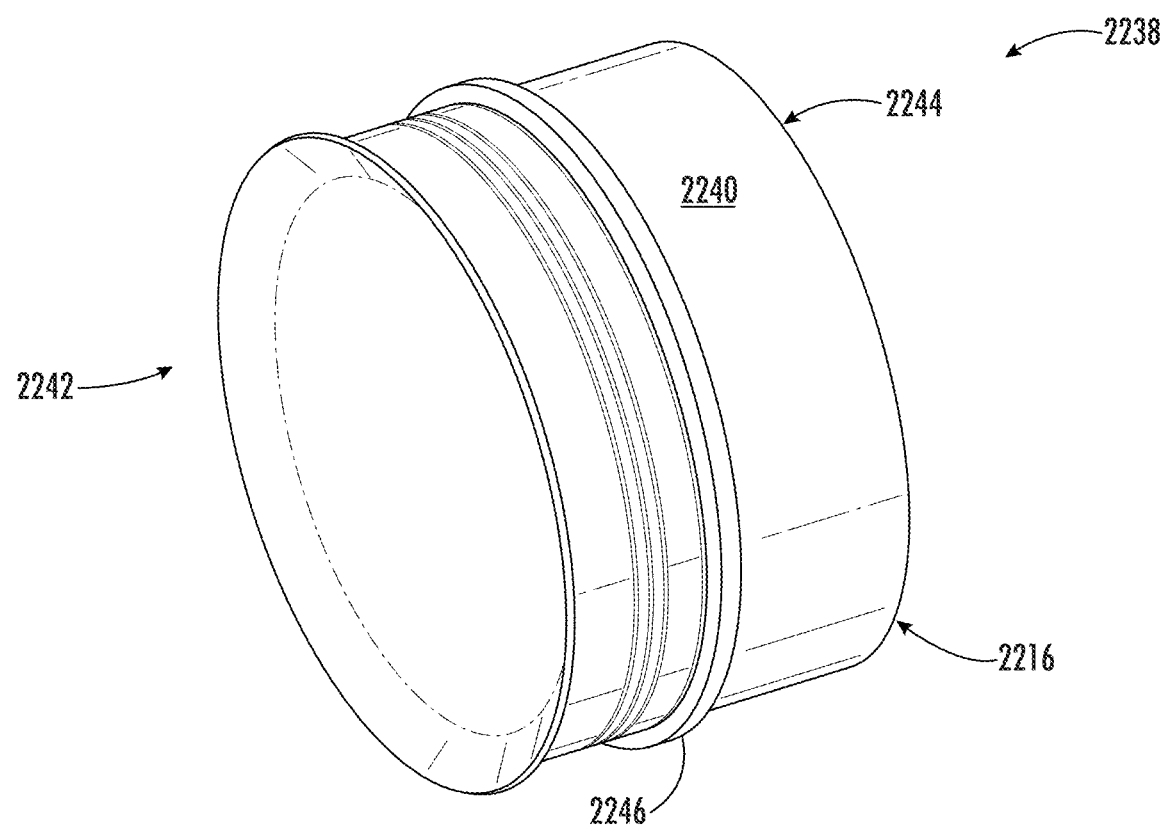
FIG. 23 is a schematic view of one embodiment of a fan casing having a mounting flange.

FIG. 23. illustrates one embodiment of an acceptable primary composite structure 2238. As used herein, "composite structure (preform)" refers to any component, or preform thereof, fabricated from composite materials. Composite structure 2238 may comprise a generally cylindrical member, such as fan casing 2216. Henceforth, the cylindrical member will be referred to as fan casing 2216, though it should not be limited to such. Fan casing 2216 may be generally cylindrical in shape and may be fabricated from any acceptable material. In one embodiment, however, fan casing 2216 may be fabricated from a composite material, such as, but not limited to, glass fibers, graphite fibers, carbon fibers, ceramic fibers, aromatic polyamide fibers such as poly(p-phenylenetherephtalamide) fibers (i.e. KEVLAR®), and combinations thereof. In one embodiment, the composite material may comprise carbon fibers. Additionally, fan casing 2216 may be fabricated using any acceptable fabrication method known to those skilled in the art. See, for example, U.S. Patent Application No. 2006/0201135 to Xie et al.

Fan casing 2216 may generally comprise a body 2240 having a forward end 2242 and an aft end 2244. As used herein, "fan casing" is used to refer to both pre- and post-cure composite fan casings. Those skilled in the art will understand which stage is being referenced from the present description. Fan casing 2216 may also comprise at least one integral composite mounting flange 2246. As used herein, "mounting flange" refers to any flange interposed circumferentially about body 2240 of fan casing 2216, or other primary composite structure, that may be used to operably connect a secondary structure to the primary structure, as described herein below. By "interposed" it is meant that mounting flange 2246 may be located circumferentially about body 2240 of fan casing 2216, as opposed to about either of forward end 2242 or aft end 2244.

Figure 24:
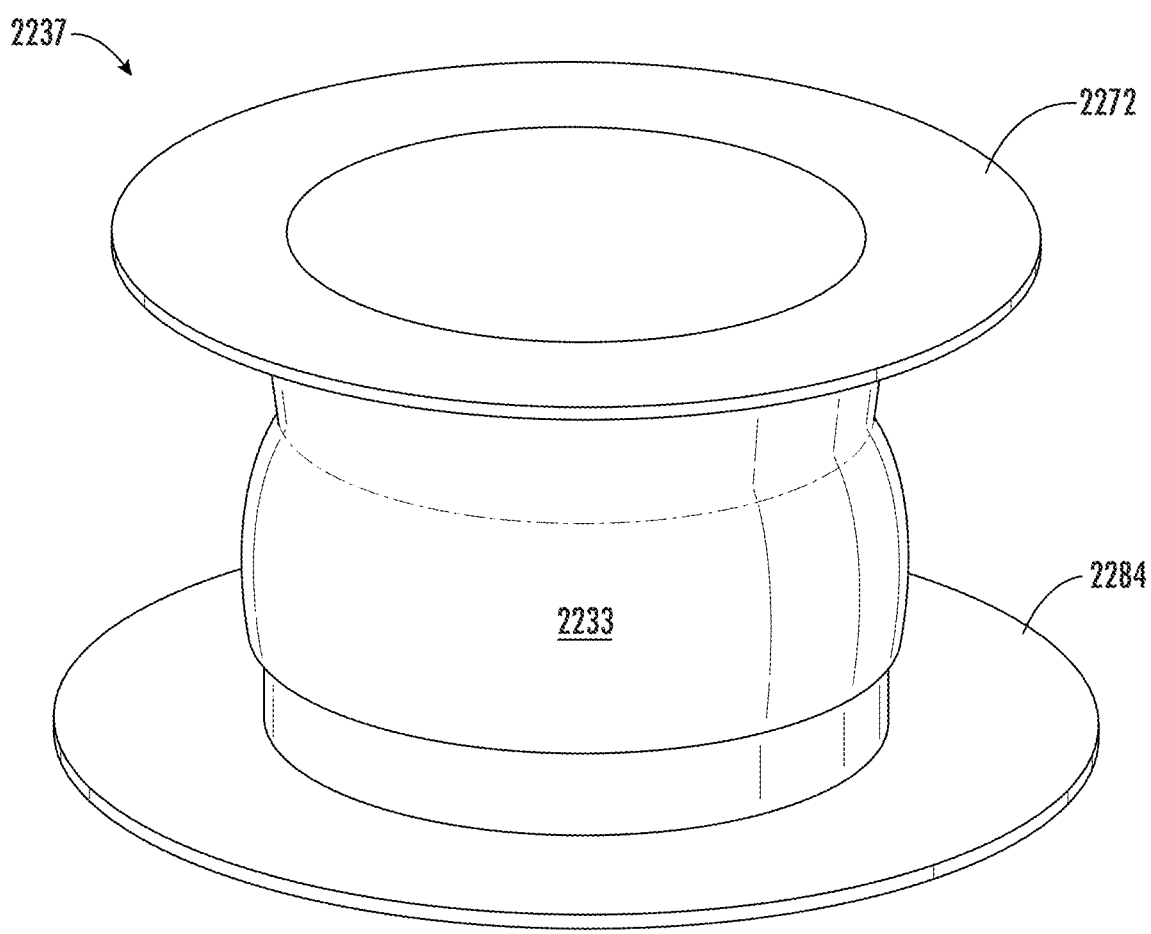
FIG. 24 is a schematic perspective view of one embodiment of a composite structure forming tool.

Fan casing 2216 may also be fabricated using any tool known to those skilled in the art. See, for example, U.S. Patent Application No. 2006/0134251 to Blanton et al. In one embodiment, as shown in FIG. 24, composite structure forming tool 2237 may have a circumference, a generally cylindrically shaped core 2233, and comprise a first endplate 2272 and a second endplate 2284 that may be removably attached to core 2233 of tool 2237.

Figure 25:
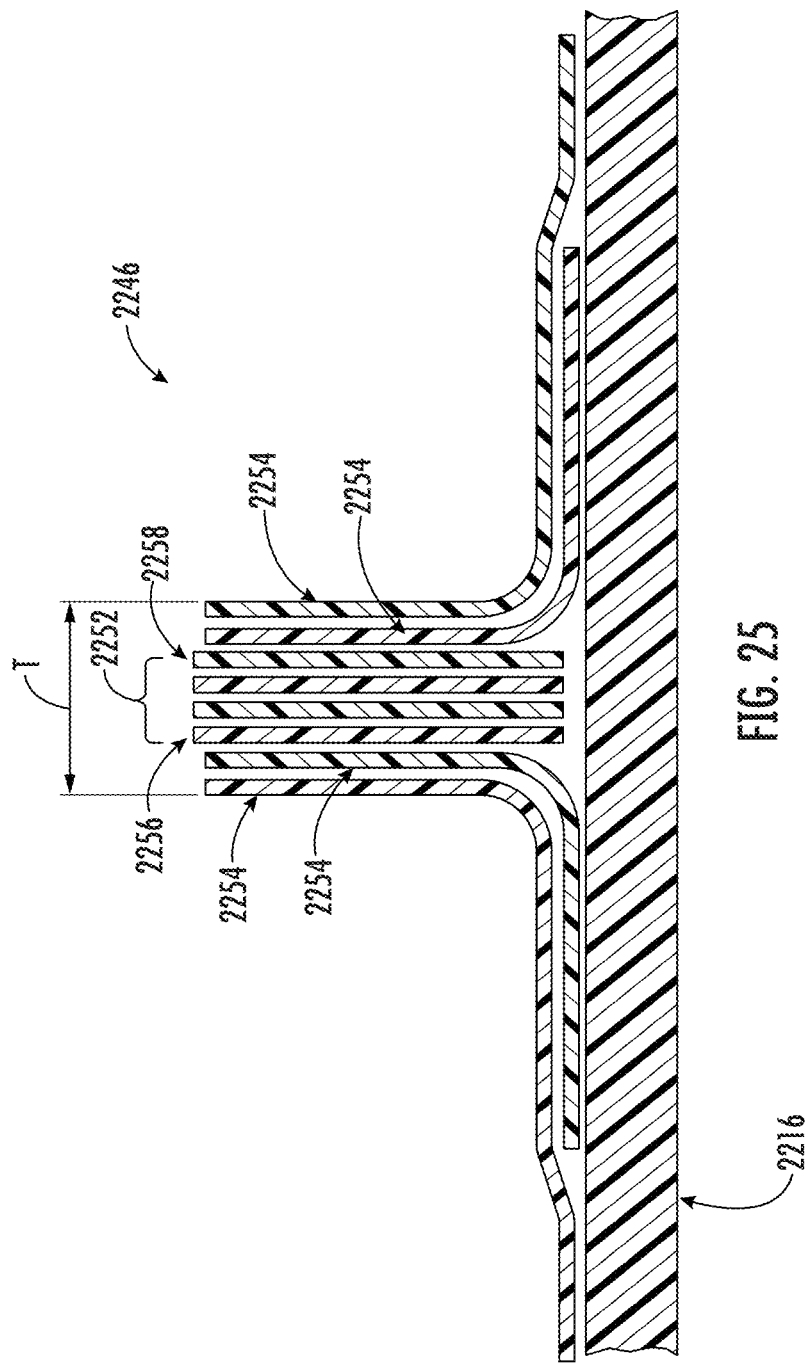
FIG. 25 is a schematic cross-sectional view of one embodiment of a mounting flange operably connected to a fan casing.

Turning to FIG. 25, integral composite mounting flange 2246 may generally include at least one core fiber 2252, though in one embodiment mounting flange 2246 may comprise a plurality of core fibers 2252. Core fibers 2252 may be circumferentially oriented about fan casing 2216. By "circumferentially oriented" it is meant that core fibers 2252, whether fiber tows, textile preforms or a combination thereof, generally circumscribe fan casing 2216 and are continuous in the circumferential direction. Mounting flange 2246 may also generally comprise at least one layer of multidirectional attachment fibers 2254 that may operably connect core fibers 2252 to fan casing 2216 as described herein below. As used herein, "multidirectional" refers to textile preforms comprising the attachment fibers that have fiber tows oriented in more than one direction.

As will be understood by those skilled in the art, core fibers 2252 may be fabricated in different ways. In one example embodiment, core fibers 2252 may be fabricated from a plurality of continuous, unidirectional fiber tows bundled and bonded together. In another embodiment, core fibers 2252 may comprise textile preforms, such as a flattened biaxial braid sleeve, having a majority of fiber tows that are continuous in the circumferential direction, and the remaining fibers either continuous or non-continuous in the non-circumferential direction. It is this general circumferential orientation of core fibers 2252 that can provide added strength to the flange in the circumferential direction as explained herein below. Regardless of the particular assembly utilized, core fibers 2252 may comprise a first core side 2256 and a second core side 2258.

Fiber tows of core fibers 2252 may be comprised of any suitable reinforcing fiber known to those skilled in the art, including, but not limited to, glass fibers, graphite fibers, carbon fibers, ceramic fibers, aromatic polyamide fibers such as poly(p-phenylenetherephtalamide) fibers (i.e. KEVLAR®), and combinations thereof. Additionally, while any number of fiber tows may be used to construct core fibers 2252, in one embodiment there may be from about 2700 to about 5000 fiber tows used to construct core fibers 2252. Moreover, each fiber tow may comprise from about 3000 to about 2224,000 fiber filaments. In general, when assembled, core fibers 2252 may constitute about half of the overall thickness T of mounting flange 2246. While the thickness of mounting flange 2246 may vary according to application, in one embodiment, mounting flange 2246 may have a thickness of from about 0.5 inches (1.27 cm) to about 1 inch (2.54 cm).

As described above, in addition to circumferential core fibers 2252, each mounting flange 2246 may also include at least one layer of attachment fibers 2254 operably connecting each of first core side 2256 and second core side 2258 of core fibers 2252 to fan casing 2216. Unlike core fibers 2252, attachment fibers 2254 may be constructed of multi-directional textile preforms, such as weaves or braids, that need not have a majority of fiber tows oriented circumferentially. In this way, attachment fibers 2254 can display a generally uniform strength distribution throughout. As with the core fibers, each fiber tow of attachment fibers 2254 may comprise from about 3000 to about 2224,000 fiber filaments. Generally, when assembled, attachment fibers 2254 may constitute the remaining half of the overall thickness of flange 2246.

Figure 26:
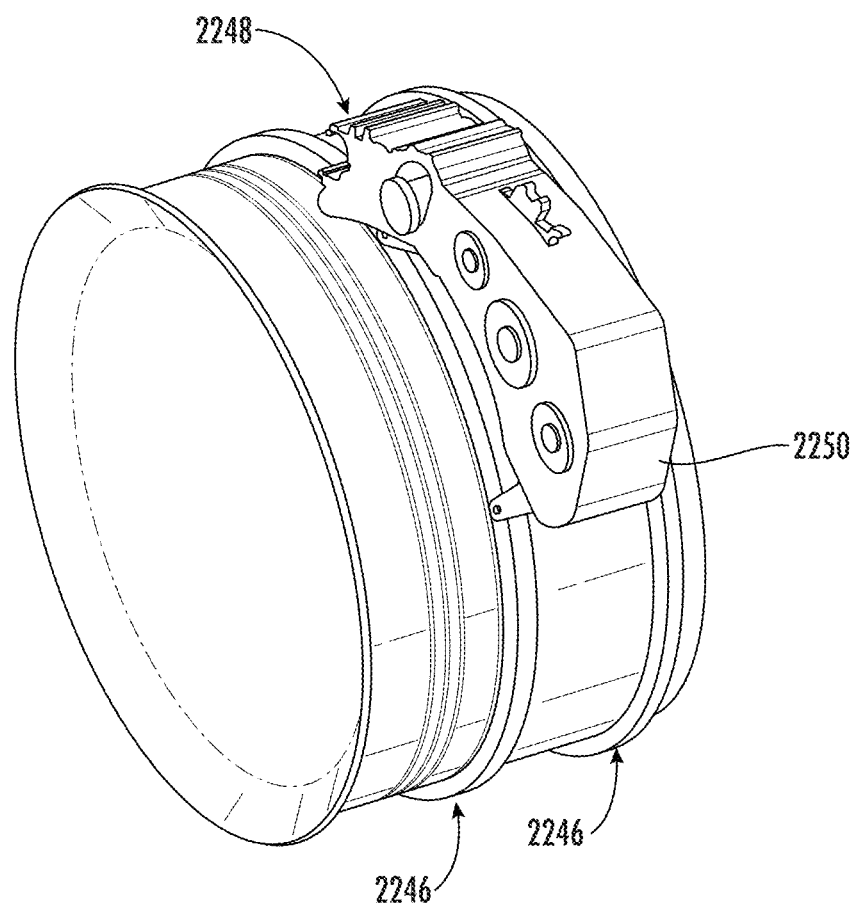
FIG. 26 is a schematic view of one embodiment of a fan casing having mounting flanges and attached secondary structure.

As illustrated in FIG. 26, mounting flange 2246, once cured, may be used to operably connect at least one secondary structure 2248 to fan casing 2216 and thus, flange 2246 may be located in a variety of locations along the length of body 2240 of fan casing 2216. In some example embodiments, it may be desirable to include more than one mounting flange 2246. As shown in FIG. 26, in an example embodiment, secondary structure 2248 may be, for example, an accessory gear box 2250 that can be mounted to fan casing 2216 using the mounting flanges 2246 and any attachment method known to those skilled in the art, such as bolts. Other possible secondary structures may include, but are not limited to, an oil tank, oil and fuel monitoring modules, other engine externals and combinations thereof. It will be understood that "engine externals" refers to any accessory, module or component that may be connected to the outside of the engine. Such secondary structures may be constructed of any acceptable material known to those skilled in art such as, for example, aluminum, and as described previously may weigh significantly more than the corresponding fan casing to which they are attached. For example, in one embodiment, fan casing 2216 may weight about 200 pounds while accessory gear box 2250 may weigh about 300 pounds.

Embodiments of the mounting flange described herein can provide several benefits over existing attachment mechanisms. For example, the integral mounting flange can reduce the occurrence of severe part damage to both the primary composite structure, as well as the attached secondary structure, while concurrently helping to eliminate catastrophic part failure. Without intending to be limited by theory, it is believed that, in general, fiber-reinforced composite structures, such as the mounting flanges herein, can have relatively weak interfaces between fiber layers and, therefore, have relatively weak through-thickness strength compared to their in-plane strength. If stresses on the composite structure exceed a defined maximum capacity level, these fiber layers can have a tendency to delaminate, or separate, prior to actual fiber breakage occurring. This delamination or separation can reduce the load and stress on the attachment joint where the mounting flange connects to the primary structure. As will be understood by those skilled in the art the maximum stress capacity level of the primary composite structure can vary depending on such factors as materials of fabrication, method of fabrication and the like.

Example embodiments set forth herein are designed to take advantage of the previously described phenomenon. More specifically, the integral mounting flange may be fabricated to permit delamination, or even separation, of the flange from the primary composite structure at the joint under excessive stresses, such as those caused by a fan blade out or by the weight of an attached secondary structure. However, because the core fibers of the flange can be constructed from continuous, circumferentially oriented fibers, even after delaminating or separating, the flange can remain a movable yet intact ring about the primary structure. Thus, even if the integral mounting flange delaminates or separates from the primary composite structure, it generally remains in place with all secondary structures attached. This can allow stresses on both the primary composite structure and the mounting flange to be reduced while maintaining the attached secondary structure in the same general placement as originally intended. Because of this, the delamination or separation can reduce damage to both the primary and secondary structures, as well as help to prevent catastrophic part failure.

Figure 27:
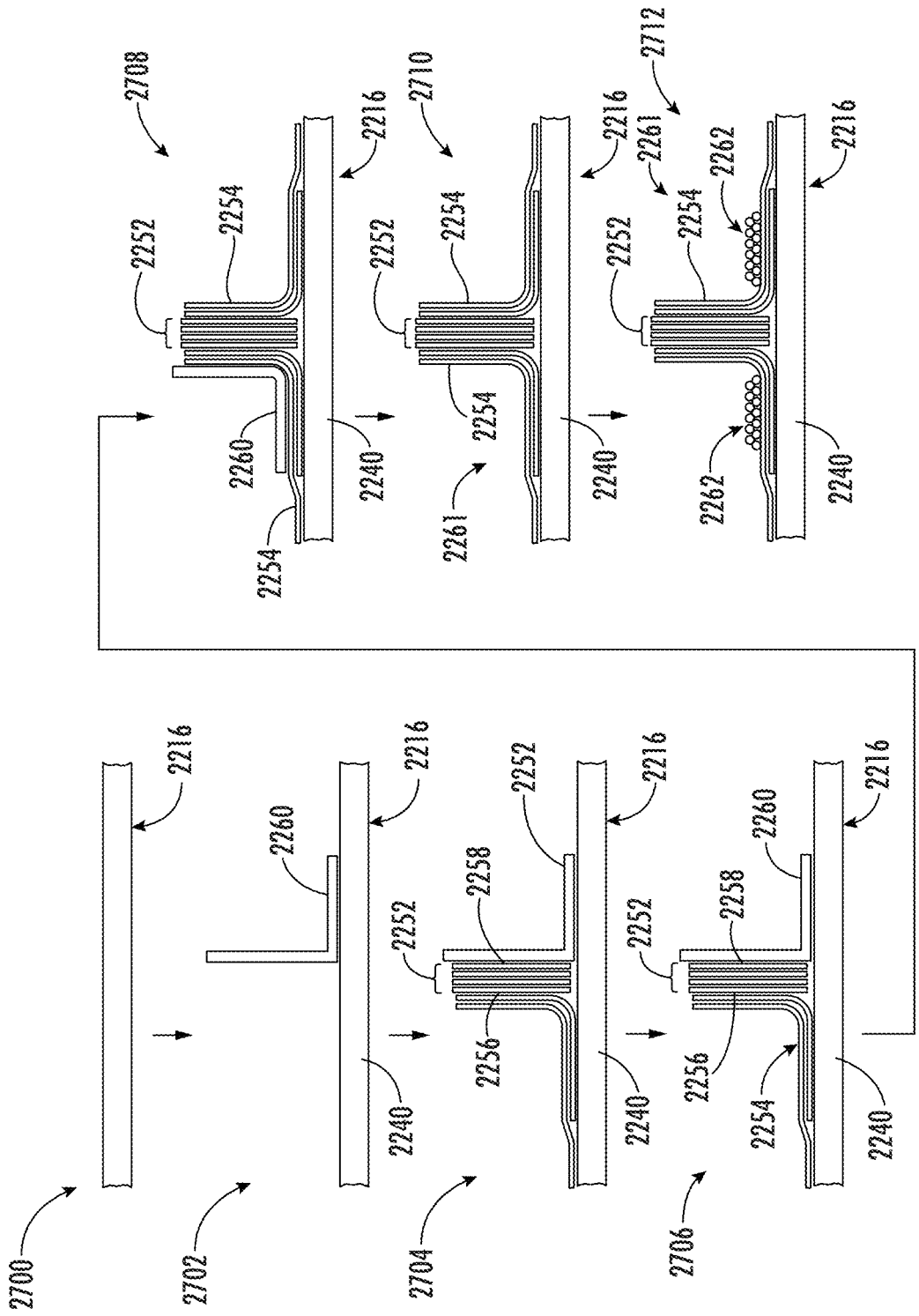
FIG. 27 is a schematic representation of one embodiment of a process for fabricating a mounting flange.

Methods of fabricating an integral composite mounting flange will now be described. Fabricating a mounting flange as set forth herein may generally comprise applying core fibers about the primary composite structure, followed by applying attachment fibers to operably connect the core fibers to the fan casing, or other primary composite structure. More specifically, as shown in FIG. 27, step 2700, the fabrication of a mounting flange may begin with providing a primary composite structure having a circumference, such as fan casing 2216. In at least one example embodiment, the primary composite structure may be complete except for final cure. In step 2702, a correspondingly shaped guide 2260 may then be placed about body 2240 of fan casing 2216 in each location where a mounting flange is desired. Guide 2260 may be removably held in place by shrink tape, for example. In an example embodiment, guide 2260 may be comprised of discrete arcuate members, each spanning about 180 degrees of body 2240 of fan casing 2216. The arcs of guide 2260 may be releasably connected together for easy placement and adjustment about fan casing 2216. It will be understood, however, that guide 2260 may be comprised of any number of pieces and have any shape that corresponds to the shape of the primary composite structure. Guide 2260 can serve as a support for the later application of both the core fibers and the attachment fibers, as explained herein below. As previously discussed, guide 2260 may be circumferential and have an L-shaped cross-section as shown, and may be constructed from any rigid, lightweight material such as, for example, aluminum or composite.

In step 2704, once all guides 2260 have been placed in the desired locations about body 2240 of fan casing 2216, the application of core fibers 2252 may be initiated. As previously discussed, core fibers 2252 may comprise either unidirectional, circumferentially oriented fiber tows bundled and bonded together or textile preforms, such as a flattened biaxial braid sleeve, having a majority of continuous, circumferentially oriented fiber tows.

If unidirectional fiber tows are used to construct core fibers 2252, the tows may comprise fiber filaments that can be wound about the fan casing 2216. In general, a single tackified fiber tow can be precisely placed in the desired position about the fan casing and this process can be repeated until core fibers 2252 have the desired size and shape. A debulking step may then be carried out to consolidate core fibers 2252, as described herein below. Alternately, if textile preforms are used to construct core fibers 2252, the textile layers can be layed-up and tackified on a flat, non-porous surface, such as a table or a tool. More specifically, the tackified textile layers can be stacked to form the core fibers' 2252 desired thickness and height, while still being long enough to circumscribe the fan casing. After debulking, as set forth below, the consolidated textile layers remain flexible enough to allow the layers to be manually or mechanically shaped into the proper radius to fit the fan casing, or other primary composite structure. Regardless of which type of fibers are used, finished core fibers 2252 may have first core side 2256 and second core side 2258.

Having positioned core fibers 2252 in the desired location about fan casing 2216, attachment fibers 2254 may be applied to each of first core side 2256 and second core side 2258 of core fibers 2252, as well as to fan casing 2216 to operably connect core fibers 2252 to fan casing 2216. In step 2706, guide 2260 can be left in place while attachment fibers 2254 are applied to, for example, first core side 2256 of core fibers 2252. As previously described, attachment fibers 2254 may comprise multidirectional textile preform layers, such as weaves or braids. Layers of attachment fibers 2254 may be wrapped against both first core side 2256 of core fibers 2252 and fan casing 2216 until the desired thickness is obtained. More specifically, a liquid resin, such as an epoxy, may be applied to core fibers 2252 and fan casing 2216 to provide a tacky layer to which attachment fibers 2254 may be applied. Next, a layer of attachment fibers 2254 may be applied over the liquid resin. This process can be repeated until the desired thickness of attachment fibers 2254 is achieved. Though attachment fibers 2254 may have any thickness, in one embodiment, the thickness of attachment fibers may be from about 0.125 inches (about 0.3 cm) to about 0.25 inches (about 0.6 cm).

Once attachment fibers 2254 have been applied to first core side 2256 of core fibers 2252 a debulk may again be performed to consolidate the construction thus far. In particular, reinforcing fibers, such as core fibers 2252 and attachment fibers 2254, may inherently have a substantial amount of bulk. In order to help prevent wrinkles and/or voids during the final cure of the composite, and to utilize near net shape tooling during the final cure, the fibers of the composite can be consolidated, or compressed, into a dimension that is closer to the desired final cured thickness. This consolidation occurs during debulk.

Debulk can be carried out using any common method known to those skilled in the art, such as, for example, by applying pressure to the composite fibers with either a vacuum bag, shrink tape, or other mechanical means. Resin applied to the fibers before debulk can help "tack," or lock, the fibers in place once the pressure is applied. If the tackified fibers cannot be consolidated as desired at room temperature, then heat may be applied to lower the viscosity of the resin. The resin may then better infiltrate the composite fibers and allowing the consolidation to be carried out to the desired degree. In one embodiment, the guide may be left in place during the debulk process to provide support during fabrication.

After debulk, guide 2260 may be repositioned adjacent to the completed side of the flange for the application of attachment fibers 2254 to the opposing side of the flange as shown in step 2708. The previously described application and debulk of attachment fibers 2254 may then be repeated on, for example, second core side 2258 of core fibers 2252, to obtain an integral composite mounting flange perform 2261 in step 2710.

Optionally, in one example embodiment shown in step 2712, additional individual fiber tows 2262 may be applied to attachment fibers 2254 of mounting flange preform 2261 prior to final cure to provide additional hoop strength. Such fiber tows will not affect the final cure of the composite structure. However, to avoid limiting the weight-saving benefits provided by using composite materials, it may be desirable to minimize the use of additional individual fiber tows 2262.

Once core fibers 2252, attachment fibers 2254, and optionally individual fiber tows 2262, have been layed-up and debulked, each guide 2260 can be removed and the final cure tooling can be placed about fan casing 2216, including any flange performs, to serve as a mold during the curing process. As will be understood by those skilled in the art, the final cure tooling and process may vary according to such factors as resin used, part geometry, and equipment capability. However, in one embodiment, the tooling may comprise near net shape tooling, which not only helps prevent waste of raw material and machining time, but also eliminates having to machine into the attachment fibers, which could result in breaking the fibers and introducing weak points in the flange.

Figure 28:
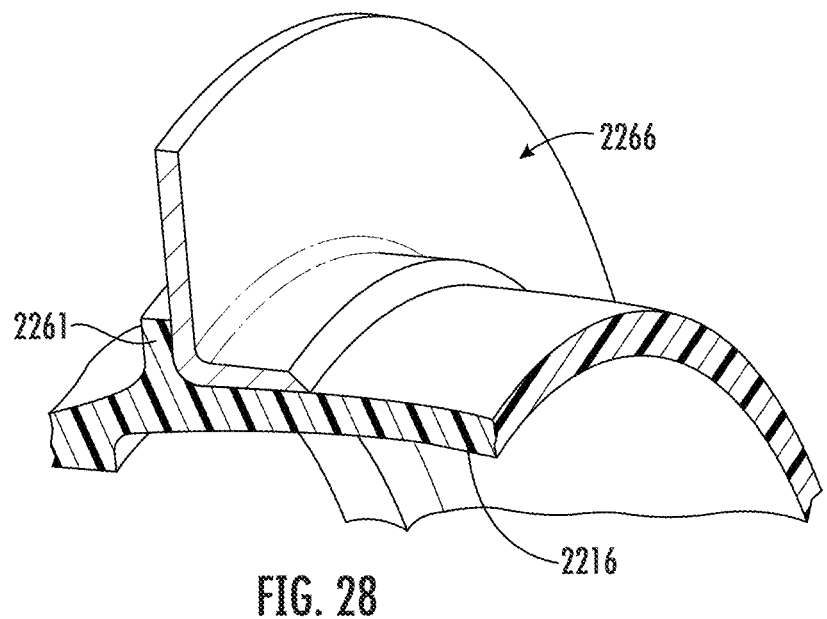
FIG. 28 is a schematic cross-sectional view of one embodiment of a flange shoe.
Figure 29:
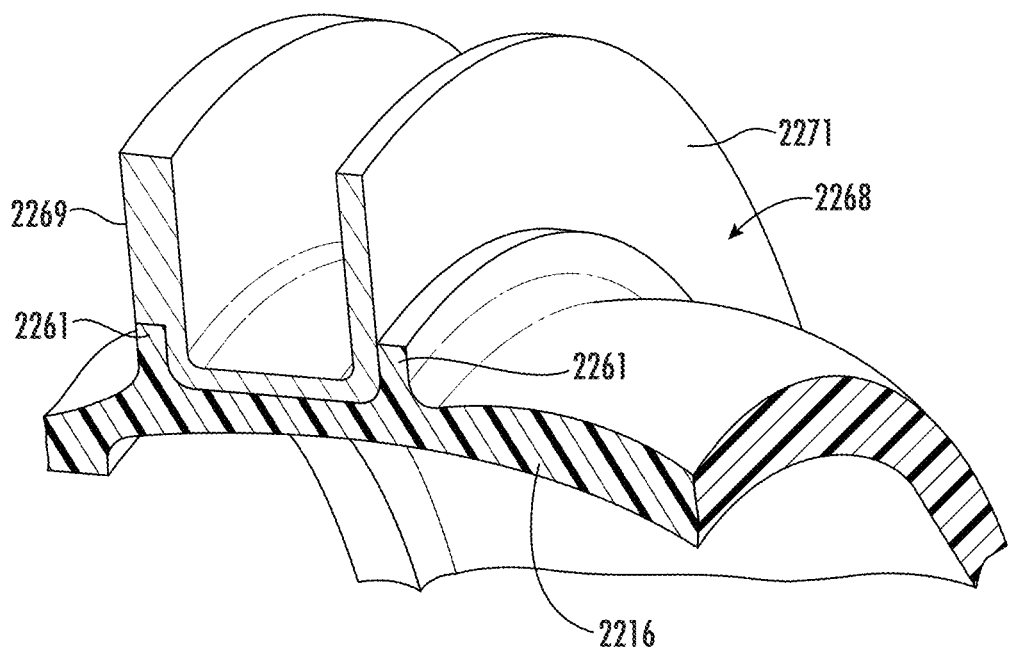
FIG. 29 is a schematic cross-sectional view of one embodiment of an extended flange shoe.

In general, the final cure tooling 2264 may comprise various combinations of flange shoes and extended flange shoes. Flange shoes 2266 may comprise any number of pieces that when coupled together may be positioned circumferentially about fan casing 2216, and optionally mounting flange performs 2261, and may comprise a substantially L-shaped cross-section, as shown in FIG. 28. Extended flange shoes 2268, shown in FIG. 29, may have a first side 2269 and a second side 2271 and may also comprise any number of pieces that when coupled together may be positioned circumferentially about fan casing 2216, and optionally mounting flange performs 2261. Extended flange shoes 2268 may comprise a substantially U-shaped cross-section, as shown in FIG. 29. Both flange shoes 2266 and extended flange shoes 2268 may be constructed of any material having a greater thermal coefficient of expansion than the fan casing preform. In one embodiment, flange shoes 2266 and extended flange shoes 2268 may be constructed from metals, alloys or combinations thereof, such as aluminum or steel. Additionally, as explained herein below, either or both of flange shoes 2266 and extended flange shoes 2268 may comprise a flange cavity to accommodate an end flange preform or a mounting flange preform.

Figure 30:
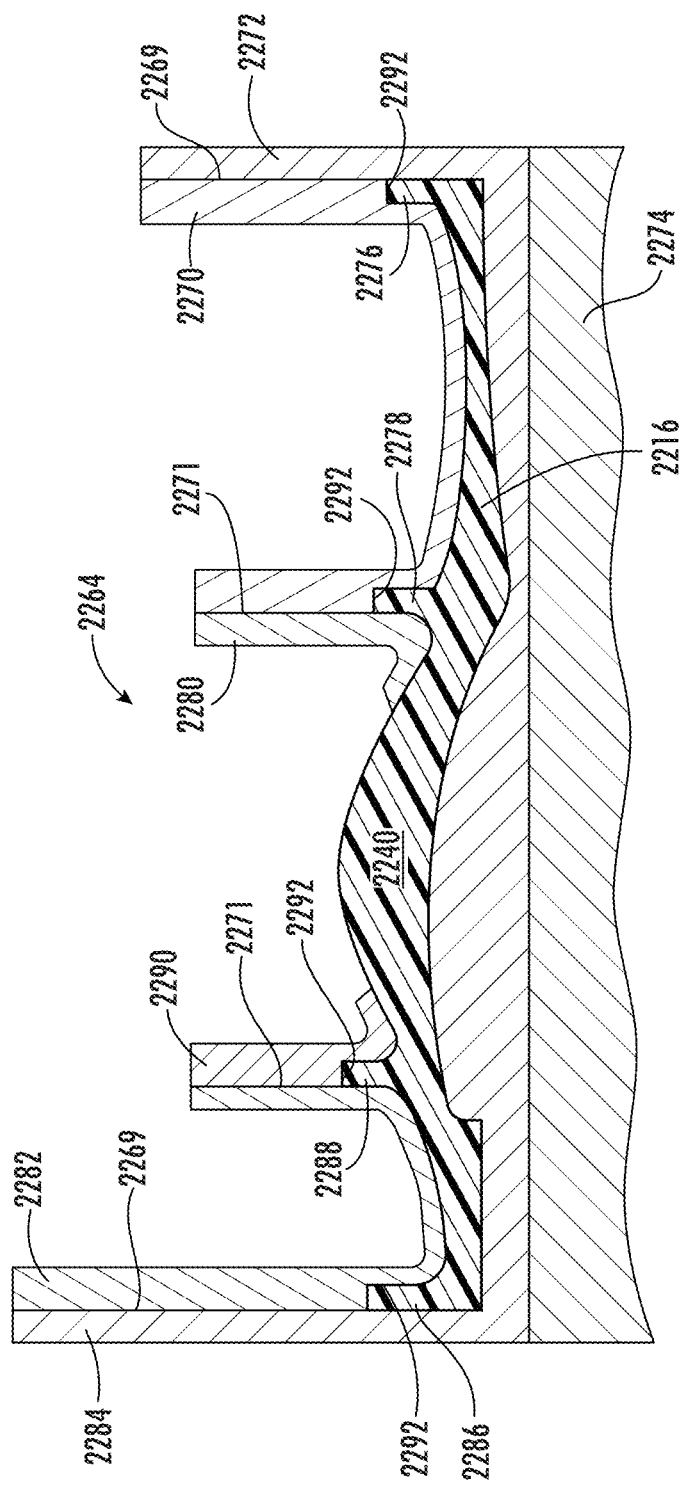
FIG. 30 is a schematic cross-sectional view of one embodiment of tooling used during final cure of a composite fan casing having two mounting flanges.

As shown in FIG. 30, a first extended flange shoe 2270 may be placed about fan casing 2216 such that first side 2269 of first extended flange shoe 2270 is adjacent to a first endplate 2272 of the composite structure-forming tool 2274 upon which fan casing 2216 is fabricated. First extended flange shoe 2270 may be removably coupled to the first endplate 2272 using any attachment method known to those skilled in the art, such as, for example, bolts. Once positioned, first extended flange shoe 2270 may overlay any first end flange preform 2276 present, and continue along body 2240 of fan casing 2216 to a first mounting flange preform 2278, as shown in FIG. 30. A first flange shoe 2280 may then be positioned about fan casing 2216, adjacent to second side 2271 of first extended flange shoe 2270 and the two may be removably coupled together about first mounting flange preform 2278. In this way, first extended flange shoe 2270 can serve as an endplate to first flange shoe 2280 and provide the support necessary to help ensure first flange shoe 2280 remains in position such that first mounting flange preform 2278 retains its desired shape and orientation about fan casing 2216 during final cure.

As also shown in FIG. 30, a second extended flange shoe 2282 may be placed about fan casing 2216 such that a first side 2269 of second extended flange shoe 2282 is adjacent to a second endplate 2284 of composite structure-forming tool 2274. Second extended flange shoe 2282 may be removably coupled to the second endplate 2284 in the same manner provided above for first extended flange shoe 2270. Again, second extended flange shoe 2282 may overlay any second end flange preform 2286 present, and continue along body 2240 of fan casing 2216 to a second mounting flange preform 2288, as shown in FIG. 2230. A second flange shoe 2290 may then be positioned about fan casing 2216 adjacent to second side 2271 of second extended flange shoe 2282 and the two may be removably coupled together about second mounting flange preform 2288. As before, second extended flange shoe 2282 can provide support to second flange shoe 2290 and help ensure second flange shoe 2290 remains in position such that second mounting flange preform 2288 retains its desired shape and orientation about fan casing 2216 during final cure.

For each coupling of an extended flange shoe and a flange shoe, there may also be a flange-shaped cavity formed to accommodate any mounting flange preform. It will be understood by those skilled in the art that cavity may be formed in a flange shoe, an extended flange shoe, or a combination thereof. For example, in FIG. 30, first extended flange shoe 2270 contains a cavity 2292 to accommodate first mounting flange preform 2278 while second flange shoe 2290 contains a cavity 2292 to accommodate second mounting flange preform 2288. Additional cavities 2292 may be included to account for end flanges if present.

Figure 31:
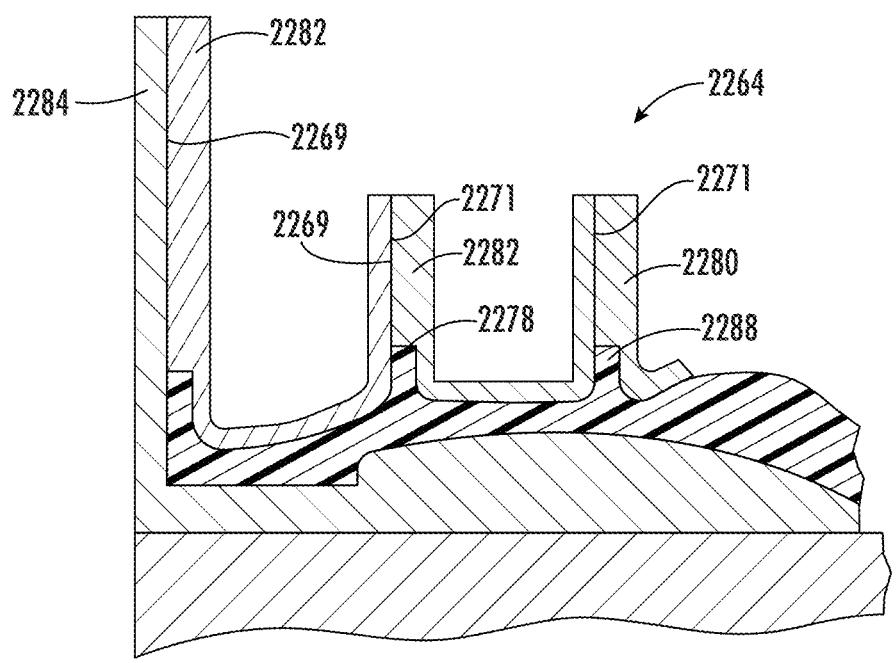
FIG. 31 is a portion of a schematic cross-sectional view of one embodiment of tooling used during final cure of a composite fan casing having two adjacent mounting flanges.

As shown in FIG. 31, if adjacent mounting flange performs are present, a first extended flange shoe 2270, having a first side 2269 and second side 2271, may be removably coupled to a second extended flange shoe 2282, having a first side 2269 and second side 2271, to form a cavity 2292 therebetween about a first mounting flange preform 2278. A first flange shoe 2280 may then be removably coupled to second side 2271 of second extended flange shoe 2282 in the manner described above to form another cavity 2292 about a second mounting flange preform 2288. Indeed, any number of extended flange shoes may be coupled together in this manner to accommodate a fan casing having multiple adjacent mounting flange performs to help ensure the flange performs have the support needed to remain properly positioned and proportioned.

Once all flange shoes and extended flange shoes have been coupled together about the fan casing and the mounting flange performs, the final cure of the fan casing may commence. Those skilled in the art will understand how to determine the proper final cure parameters based on such factors as part size and resin utilized. At the end of the final cure, the tooling may be removed and an article including a composite structure having at least one mounting flange is obtained and any desired secondary structure may then be attached thereto.

Figure 32:
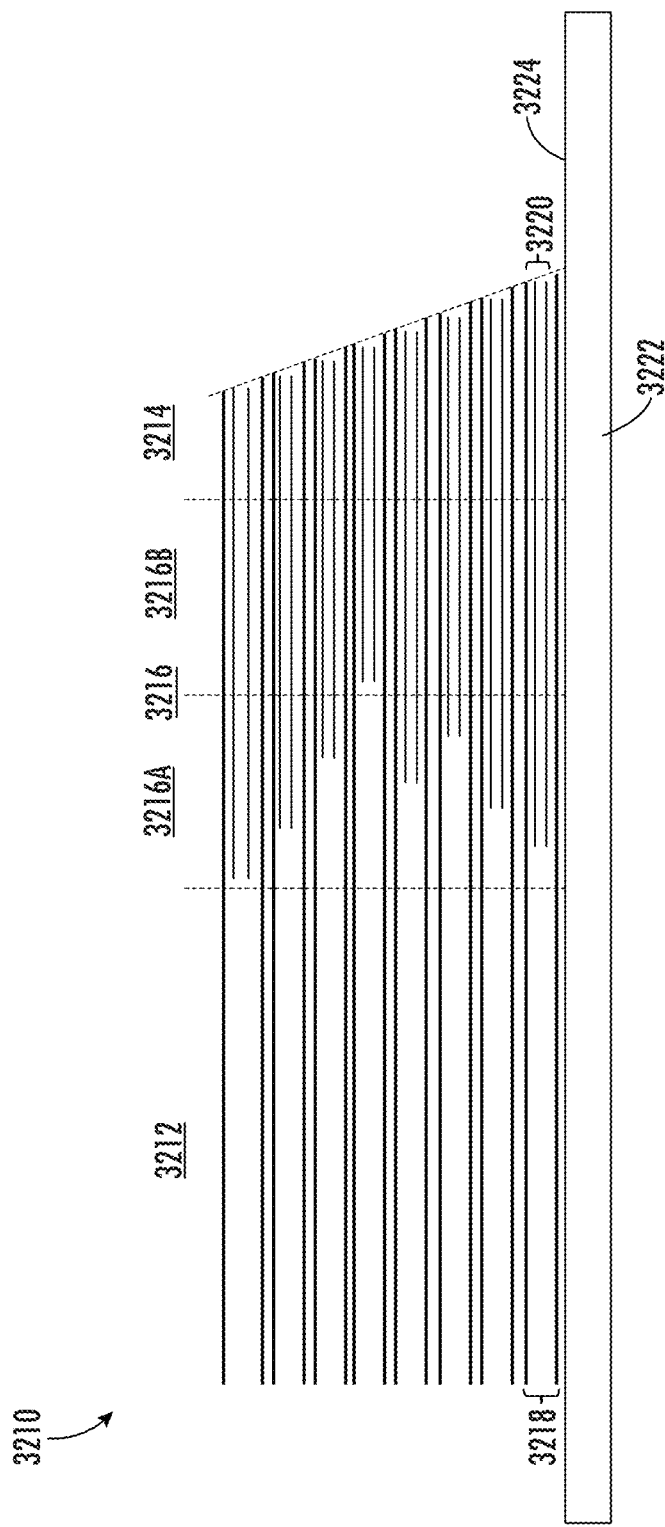
FIG. 32 is a schematic cross sectional view representing the individual plies of a composite article in accordance with an aspect of the present disclosure.

FIG. 32 schematically represents a preliminary composite structure 3210, in which shell plies 3218 denote a first group of plies within a shell zone 3212 that will define at least a portion of a primary composite structure, and portions of the shell plies 3218 within a flange zone 3214 will be formed out of the plane of the shell plies 3218 to define a secondary composite structure, for example, a flange. A build-up zone 3216 is defined between the shell and flange zones 3212 and 3214, within which the shell plies 3218 will be deformed (not shown) to result in portions of the shell plies 3218 within the flange zone 3214 being oriented out of the plane, for example, perpendicular to, the shell zone 3212 (and, therefore, the primary composite structure within the shell zone 3212). FIG. 32 represents the plies 3218 as laid-up on a surface 3224 of a tool 3222.

As evident from FIG. 32, the build-up zone 3216 comprises a tapered zone 3216A and a uniform thickness zone 3216B. The flange and build-up zones 3214 and 3216 may contain additional build-up plies (layers) 3220 that are interleaved with shell plies 3218, which can be seen in FIG. 32 to be continuous throughout the entire extent of the shell and flange zones 3212 and 3214. Unlike conventional techniques, one or more build-up plies 3220 are represented as preferably interleaved within each individual shell ply 3218 rather than between two adjacent shell plies 3218. The build-up plies 3220 are represented in FIG. 32 as originating at different locations within the tapered zone 3216A of the build-up zone 3216, preferably for the purpose of achieving a substantially uniform thickness within the uniform thickness zone 3216B of the build-up zone 3216, as well as within the flange zone 3214. The ends of the continuous shell plies 3218 and the interleaved build-up plies 3220 within the Flange Zone 3214 are preferably chamfered or otherwise terminate in a manner as represented in FIG. 32 so that, after forming the secondary composite structure from the plies 3218 and 3220 within the flange zone 3214, the ends of the plies 3218 and 3220 forming the secondary composite structure will define an end surface that is substantially parallel to the surface 3224 of a tool 3222 on which the preliminary composite structure 3210 is fabricated. Chamfering the plies 3218 and 3220 within the flange zone 3214 allows the continuous reinforcement material (fibers or fiber tows) closer to the tool surface 3224, whether shell plies 3218 or build-up plies 3220, to have a greater radius of curvature when bent and yet be flush with the ends of plies 3218 and 3220 farther from the tool surface 3224.

Figure 33:
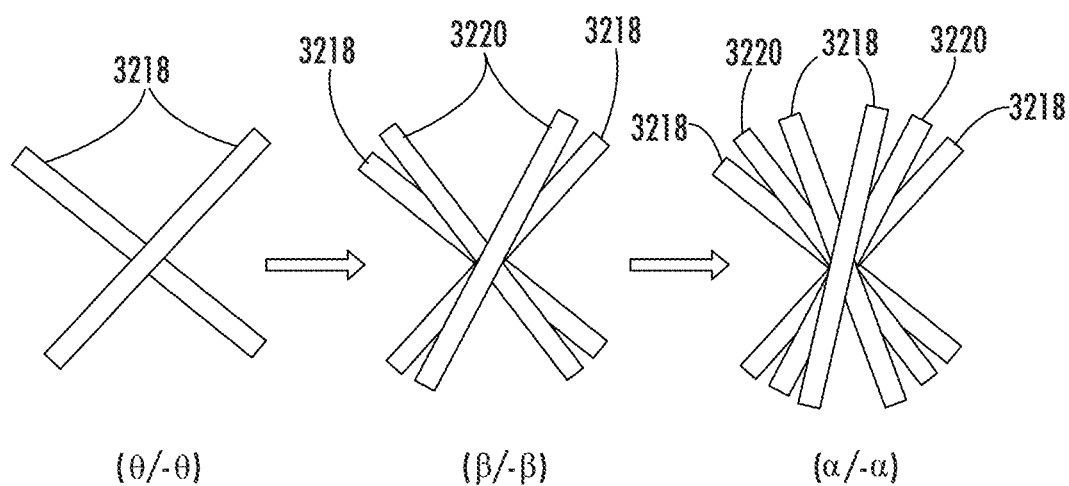
FIG. 33 a schematic view representing different ply orientations that may be incorporated into build-up and flange zones of the preliminary composite article of FIG. 1.

FIG. 33 schematically represents a manner in which different ply orientations may be incorporated into the flange and build-up zones 3214 and 3216 by interleaving shell plies 3218 and build-up plies 3220 to promote the strength of the secondary composite structure (defined by the flange zone 3214) and its attachment (defined by the build-up zone 3216) to the primary composite structure (defined by the shell zone 3212). In the example embodiment depicted, a build-up ply 3220 having a β-β fiber orientation is interleaved within a shell ply 3218 between fibers having θ-θ and α-α fiber orientations to result in the combination of fiber orientations represented at the right-hand end of FIG. 33.

Suitable fiber diameters, tow diameters, and center to center fiber/tow spacings within the continuous reinforcement materials of the shell and build up plies 3218 and 3220 will depend on the particular application, the thicknesses of the plies 3218 and 3220, and other factors. In particular example embodiments, about one to about eight fiber tows per inch (about 2.5 to 20 cm) are used in the shell and build up plies 3218 and 3220 to construct the preliminary composite structure 3210, and each fiber tow may comprise from about 6000 to about 48000 fiber filaments. Though these fiber filaments may have any thickness, in particular embodiments the thickness of the fiber filaments may be from about 0.003 to about 0.010 inches (about 0.075 to about 0.25 mm).

Once the plies 3218 and 3220 are laid-up on the tool surface 3224, the secondary composite structure can be formed by deforming the build-up zone 3216 and portions of the plies 3218 and 3220 therein to orient the flange zone 3214 out of the plane of the shell zone 3212 and the plies 3218 therein, after which the preliminary composite structure 3210 may be debulked and cured. Those skilled in the art will understand how to determine the proper debulk and final cure parameters based on such factors as part size and resin utilized. At the end of the final cure, the tooling 3222 may be removed to yield the resulting PMC article, including the primary and secondary composite structures discussed above.

From the above, it should be appreciated that an integral flange (or other secondary structure) fabricated in the manner described above is capable of being lighter in weight than a flange that is separately formed and then bolted or bonded to a composite casing (or other primary structure). A majority of the fiber tows within the flange can be continuous fibers that originate within the casing, providing a higher load-carrying capability than a construction containing discontinuous fibers. Furthermore, a flange constructed of individual fiber tows with various fiber orientations and various degrees of interleaving is capable of providing much greater design flexibility than would be possible if textile preform sheets (e.g., weave and braid) were used. An additional advantage is that the individual fiber tows can be deposited with automated machines, thereby reducing fabrication costs as compared to processes relying on hand lay-up.

Figure 34:
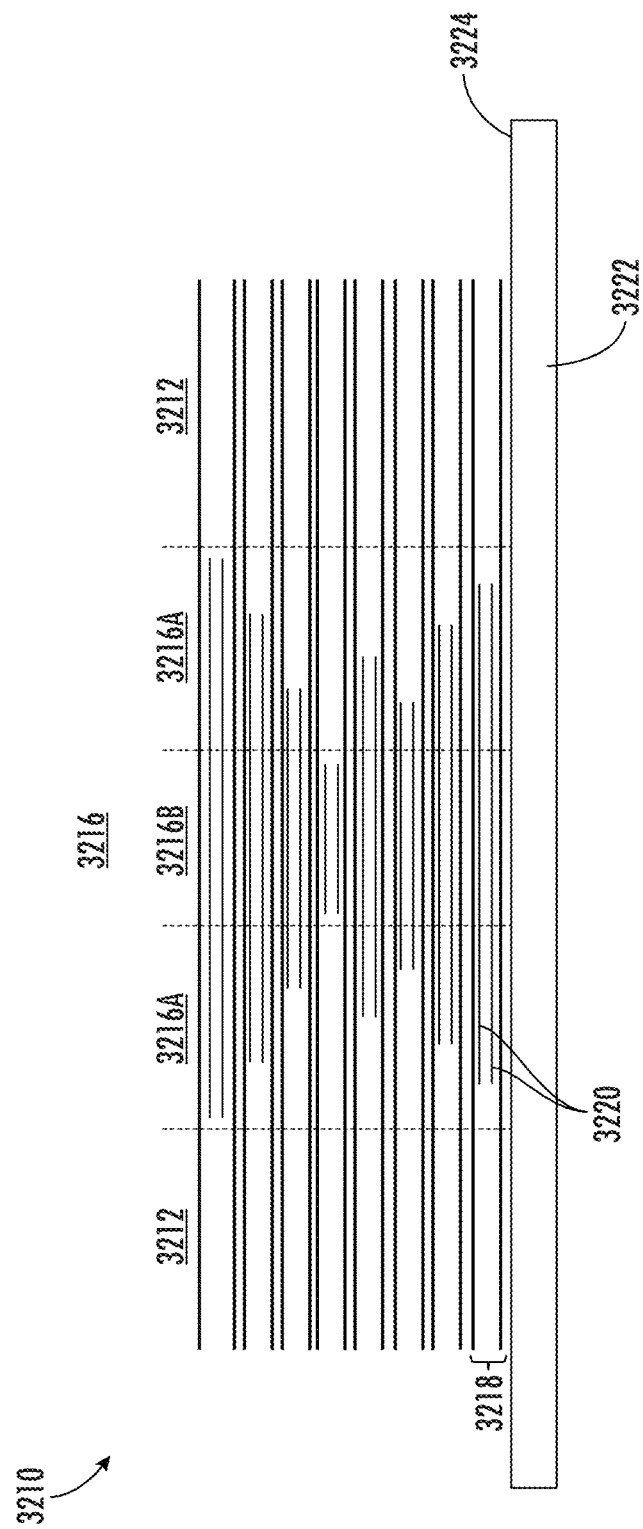
FIG. 34 is a schematic cross sectional view representing the individual plies of a composite article in accordance with an aspect of the present disclosure.

According to an alternative example embodiment, the composite structure 3210 having shell plies 3218 may be formed by the above process to include a local build-up (thickening) zone 3216, represented in FIG. 34. Although the structure 3210 does not form a secondary structure as in the previous embodiment, it is foreseeable that having the build-up zone 3216 may still be desirable in some applications, such as when the structure requires a cut-out or needs improved stiffness. The local build-up zone 3216 comprises two tapered zones 3216A and a uniform thickness zone 3216B.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbine engine, comprising: an engine core defining an engine centerline and comprising a rotor and a stator, a first stage of composite airfoils circumferentially arranged about the engine centerline and defining at least a portion of the rotor, a first airfoil of the first stage of composite airfoils comprising: a first composite portion extending chordwise between a first composite leading edge and a first trailing edge, a first leading edge protector comprising a first sheath receiving the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector comprising a second sheath receiving the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: $((FLL/FCL))/((SLL/SCL))$ to define a stage protection factor (SPF), and wherein the SPF is greater than or equal to 0.7 and less than or equal to 4 ($0.7 \leq SPF \leq 4$).

The turbine engine of any proceeding clause, wherein the first stage of composite airfoils and the second stage of composite airfoils include a polymer matrix composite (PMC).

The turbine engine of any proceeding clause, wherein at least one of the first leading edge protector or the second leading edge protector is a metallic leading edge protector.

The turbine engine of any proceeding clause, wherein the first stage of composite airfoils are fan blades.

The turbine engine of any proceeding clause, wherein the second stage of composite airfoils are outlet guide vanes.

The turbine engine of any proceeding clause, wherein the first airfoil extends spanwise between a first root and a first tip to define a first span length and wherein the second airfoil extends spanwise between a second root and a second tip to define a second span length.

The turbine engine of any proceeding clause, wherein the SPF is determined between 20% and 80% of the first span length and the second span length, inclusive of endpoints.

The turbine engine of any proceeding clause, wherein the first stage of composite airfoils has a first number of airfoils and the second stage of composite airfoils has a second number of airfoils and the first number is different than the second number.

The turbine engine of any proceeding clause, wherein the first stage of composite airfoils and the second stage of composite airfoils are configured to rotate.

The turbine engine of any proceeding clause, wherein the SPF is greater than or equal to 0.95 and less than or equal to 2.5 ($0.95 \leq SPF \leq 2.5$).

The turbine engine of any proceeding clause, wherein the first sheath and the second sheath each have a first wall, a second wall, and a third wall interconnecting the first wall and the second wall.

The turbine engine of any proceeding clause, wherein the first wall, second wall, and third wall of the leading edge protector are oriented and shaped such that they define a U-shaped or C-shaped channel therebetween.

The turbine engine of any proceeding clause, wherein the channel is sized and shaped to receive the composite leading edge of the composite portion.

The turbine engine of any proceeding clause, wherein any of the first leading edge protector or the second leading edge protector are coupled to their corresponding composite portion at the corresponding composite leading edge to define at least one seam.

The turbine engine of any proceeding clause wherein the at least one seam is two seams on either side of the airfoil, and the corresponding first leading length or second leading length is measured from the corresponding leading edge to the seam furthest from the leading edge.

The turbine engine of any proceeding clause wherein the first leading length and the second leading length are measured from their corresponding leading edge to their corresponding seam.

The turbine engine of any proceeding clause wherein an amount of overlap between the first sheath or the second sheath and their corresponding.

A turbine engine comprising: an engine core defining an engine centerline and comprising a rotor and a stator; a set of composite airfoils circumferentially arranged about the engine centerline and defining at least a portion of the rotor, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) and the chord length (CL) relate to each other by an expression: $((LL))/((CL))$ to define an airfoil protection factor (APF); and wherein the APF is greater than or equal to 0.1 and less than or equal to 0.3 ($0.1 \leq APF \leq 0.3$).

The turbine engine of any proceeding clause, wherein the set of composite airfoils includes a first stage of composite airfoils and a second stage of composite airfoils downstream from the first stage of composite airfoils.

The turbine engine of any proceeding clause, wherein the first stage of composite airfoils is a set of fan blades and the second stage of composite airfoils is a set of outlet guide vanes.

The turbine engine of any proceeding clause, wherein the first stage of composite airfoils has a first airfoil protection factor (APF1) and the second stage of composite airfoils has a second airfoil protection factor (APF2).

The turbine engine of any proceeding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 ($0.7 \leq SPF \leq 4$).

The turbine engine of any proceeding clause, wherein the SPF is greater than or equal to 0.95 and less than or equal to 2.5 ($0.95 \leq SPF \leq 2.5$).

The turbine engine of any proceeding clause, wherein the set of composite airfoils extend spanwise between a root and a tip to define a span length and the APF is determined between 20% and 80% of the first span length and the second span length.

The turbine engine of any proceeding clause, wherein the leading edge protector overlaps with the composite leading edge to define a sheath.

The turbine engine of any proceeding clause, wherein the composite portion is formed from a polymer matrix composite (PMC).

The turbine engine of any proceeding clause, wherein the leading edge protector is a metallic leading edge protector.

An indirect drive turbine engine, comprising: an engine core defining an engine centerline and comprising a rotor defined by a fan including a plurality of fan blades rotatable about the engine centerline, a stator, a compressor section, a combustor in fluid communication with the compressor section, a turbine section in fluid communication with the combustor, a speed reduction device driven by the turbine section for rotating the fan about the engine centerline, a first stage of composite airfoils circumferentially arranged about the engine centerline and defining at least a portion of the rotor, a first airfoil of the first stage of composite airfoils comprising: a first composite portion extending chordwise between a first composite leading edge and a first trailing edge, a first leading edge protector comprising a first sheath receiving the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector comprising a second sheath receiving the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: ((FLL/FCL))/((SLL/SCL)) to define a stage protection factor (SPF), and wherein the SPF is greater than or equal to 0.7 and less than or equal to 4 (0.7≤SPF≤4).

The indirect drive turbine engine of any proceeding clause, wherein the speed reduction device is a power gearbox.

The indirect drive turbine engine of any proceeding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

The indirect drive turbine engine of any proceeding clause, further comprising a fan casing or nacelle.

The indirect drive turbine engine of any proceeding clause, wherein the fan drive turbine has between 3 and 5 stages.

The indirect drive turbine engine of any proceeding clause, wherein the speed reduction device is a power gearbox having a power gearbox reduction ratio between 2:1 and 5:1.

The indirect drive turbine engine of any proceeding clause, wherein a bypass ratio is between 10:1 and 22:1.

The indirect drive turbine engine of any proceeding clause, wherein a fan blade tip speed of the fan is less than 1400 feet per second.

The indirect drive turbine engine of any proceeding clause, wherein the core is an open rotor engine.

The indirect drive turbine engine of any proceeding clause, wherein the speed reduction device is a power gearbox having a power gearbox reduction ratio between 6:1 and 12:1.

The indirect drive turbine engine of any proceeding clause, wherein a bypass ratio is between 25:1 and 125:1.

The indirect drive turbine engine of any proceeding clause, wherein the first stage of composite airfoils and the second stage of composite airfoils include a polymer matrix composite (PMC).

The indirect drive turbine engine of any proceeding clause, wherein at least one of the first leading edge protector or the second leading edge protector is a metallic leading edge protector.

The indirect drive turbine engine of any proceeding clause, wherein the first stage of composite airfoils include the plurality of fan blades.

The indirect drive turbine engine of any proceeding clause, wherein the second stage of composite airfoils are outlet guide vanes or fan guide vanes.

The indirect drive turbine engine of any proceeding clause, wherein the first airfoil extends spanwise between a first root and a first tip to define a first span length and wherein the second airfoil extends spanwise between a second root and a second tip to define a second span length.

The indirect drive turbine engine of any proceeding clause, wherein the SPF is determined between 20% and 80% of the first span length and the second span length, inclusive of endpoints.

The indirect drive turbine engine of any proceeding clause, wherein the first stage of composite airfoils has a first number of airfoils and the second stage of composite airfoils has a second number of airfoils and the first number is different than the second number.

The indirect drive turbine engine of any proceeding clause, wherein the first stage of composite airfoils and the second stage of composite airfoils are configured to rotate.

The indirect drive turbine engine of any proceeding clause, wherein the SPF is greater than or equal to 0.95 and less than or equal to 2.5 (0.95≤SPF≤2.5).

The indirect drive turbine engine of any proceeding clause, wherein the first sheath and the second sheath each have a first wall, a second wall, and a third wall interconnecting the first wall and the second wall.

The indirect drive turbine engine of any proceeding clause, wherein the first wall, second wall, and third wall of the leading edge protector are oriented and shaped such that they define a U-shaped or C-shaped channel therebetween.

The indirect drive turbine engine of any proceeding clause, wherein the channel is sized and shaped to receive the composite leading edge of the composite portion.

The indirect drive turbine engine of any proceeding clause, wherein any of the first leading edge protector or the second leading edge protector are coupled to their corresponding composite portion at the corresponding composite leading edge to define at least one seam.

The indirect drive turbine engine of any proceeding clause wherein the at least one seam is two seams on either side of the airfoil, and the corresponding first leading length or second leading length is measured from the corresponding leading edge to the seam furthest from the leading edge.

The indirect drive turbine engine of any proceeding clause wherein the first leading length and the second leading length are measured from their corresponding leading edge to their corresponding seam.

The indirect drive turbine engine of any proceeding clause wherein an amount of overlap between the first sheath or the second sheath and their corresponding.

An indirect drive turbine engine comprising: an engine core defining an engine centerline and comprising a rotor defined by a fan including a plurality of fan blades rotatable about the engine centerline, a stator, a compressor section, a combustor in fluid communication with the compressor section, a turbine section in fluid communication with the combustor, a speed reduction device driven by the turbine section for rotating the fan about the engine centerline; a set of composite airfoils circumferentially arranged about the engine centerline and defining at least a portion of the rotor, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) and the chord length (CL) relate to each other by an expression: ((LL))/((CL)) to define an airfoil protection factor (APF); and wherein the APF is greater than or equal to 0.1 and less than or equal to 0.3 (0.1≤APF≤0.3).

The indirect drive turbine engine of any proceeding clause, wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

The indirect drive turbine engine of any proceeding clause, further comprising a fan casing or nacelle.

The indirect drive turbine engine of any proceeding clause, wherein the fan drive turbine has between 3 and 5 stages.

The indirect drive turbine engine of any proceeding clause, wherein the speed reduction device is a power gearbox having a power gearbox reduction ratio between 2:1 and 5:1.

The indirect drive turbine engine of any proceeding clause, wherein a bypass ratio is between 10:1 and 22:1.

The indirect drive turbine engine of any proceeding clause, wherein a fan blade tip speed of the fan is less than 1400 feet per second.

The indirect drive turbine engine of any proceeding clause, wherein the core is an open rotor engine.

The indirect drive turbine engine of any proceeding clause, wherein the speed reduction device is a power gearbox having a power gearbox reduction ratio between 6:1 and 12:1.

The indirect drive turbine engine of any proceeding clause, wherein a bypass ratio is between 25:1 and 125:1.

The indirect drive turbine engine of any proceeding clause, wherein the set of composite airfoils includes a first stage of composite airfoils and a second stage of composite airfoils downstream from the first stage of composite airfoils.

The indirect drive turbine engine of any proceeding clause, wherein the first stage of composite airfoils is the plurality of fan blades and the second stage of composite airfoils is a set of outlet guide vanes or a set of fan guide vanes.

The indirect drive turbine engine of any proceeding clause, wherein the first stage of composite airfoils has a first airfoil protection factor (APF1) and the second stage of composite airfoils has a second airfoil protection factor (APF2).

The indirect drive turbine engine of any proceeding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 ($0.7 \leq SPF \leq 4$).

The indirect drive turbine engine of any proceeding clause, wherein the SPF is greater than or equal to 0.95 and less than or equal to 2.5 ($0.95 \leq SPF \leq 2.5$).

The indirect drive turbine engine of any proceeding clause, wherein the set of composite airfoils extend spanwise between a root and a tip to define a span length and the APF is determined between 20% and 80% of the first span length and the second span length.

The indirect drive turbine engine of any proceeding clause, wherein the leading edge protector overlaps with the composite leading edge to define a sheath.

The indirect drive turbine engine of any proceeding clause, wherein the composite portion is formed from a polymer matrix composite (PMC).

The indirect drive turbine engine of any proceeding clause, wherein the leading edge protector is a metallic leading edge protector.

A turbine engine, comprising: an engine core defining an engine centerline and comprising a rotor and a stator, a first stage of composite airfoils circumferentially arranged about the engine centerline and defining at least a portion of the rotor, a first airfoil of the first stage of composite airfoils comprising: a first composite portion extending chordwise between a first composite leading edge and a first trailing edge, a first leading edge protector receiving at least a portion of the first composite leading edge of the first composite portion, the first leading edge protector extending chordwise from a first leading edge towards the first composite portion for a first leading length (FLL), and the first composite portion and the first leading edge protector together defining an exterior surface of the first airfoil and extending chordwise between the first leading edge and the first trailing edge to define a first chord length (FCL), a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge, a second leading edge protector receiving at least a portion of the second composite leading edge of the second composite portion, the second leading edge protector extending chordwise from a second leading edge towards the second composite portion for a second leading length (SLL), and the second composite portion and the second leading edge protector together defining an exterior surface of the second airfoil and extending chordwise between the second leading edge and the second trailing edge to define a second chord length (SCL), wherein the first leading length (FLL) and the first chord length (FCL) relate to the second leading length (SLL) and the second chord length (SCL) by an expression: ((FLL/FCL)/((SLL/SCL)) to define a stage protection factor (SPF), and wherein the SPF is greater than or equal to 0.7 and less than or equal to 4 ($0.7 \leq SPF \leq 4$).

The turbine engine of any proceeding clause, wherein the first stage of composite airfoils and the second stage of composite airfoils include a polymer matrix composite (PMC).

The turbine engine of any proceeding clause, wherein at least one of the first leading edge protector or the second leading edge protector is a metallic leading edge protector.

The turbine engine of any proceeding clause, wherein the composite airfoils of the first stage of composite airfoils are fan blades.

The turbine engine of any proceeding clause, wherein the composite airfoils of the second stage of composite airfoils are outlet guide vanes.

The turbine engine of any proceeding clause, wherein the first airfoil extends spanwise from a first root to a first tip to define a first span length and wherein the second airfoil extends spanwise from a second root to a second tip to define a second span length, wherein the SPF is determined between 20% and 80% of the first span length and the second span length, inclusive of endpoints.

The turbine engine of any proceeding clause, wherein the first leading edge protector and the second leading edge protector each comprise a sheath.

The turbine engine of any proceeding clause, wherein the first stage of composite airfoils has a first number of airfoils and the second stage of composite airfoils has a second number of airfoils and the first number is different than the second number.

The turbine engine of any proceeding clause, wherein the first stage of composite airfoils and the second stage of composite airfoils are configured to rotate.

The turbine engine of any proceeding clause, wherein the SPF is greater than or equal to 0.95 and less than or equal to 2.5 ($0.95 \leq SPF \leq 2.5$).

The turbine engine of any proceeding clause, wherein the first sheath and the second sheath each have a first wall, a second wall, and a third wall interconnecting the first wall and the second wall.

The turbine engine of any proceeding clause, wherein the first wall, second wall, and third wall of the leading edge protector are oriented and shaped such that they define a U-shaped or C-shaped channel therebetween.

The turbine engine of any proceeding clause, wherein the channel is sized and shaped to receive the composite leading edge of the composite portion.

The turbine engine of any proceeding clause, wherein any of the first leading edge protector or the second leading edge protector are coupled to their corresponding composite portion at the corresponding composite leading edge to define at least one seam.

The turbine engine of any proceeding clause wherein the at least one seam is two seams on either side of the airfoil, and the corresponding first leading length or second leading length is measured from the corresponding leading edge to the seam furthest from the leading edge.

The turbine engine of any proceeding clause wherein the first leading length and the second leading length are measured from their corresponding leading edge to their corresponding seam.

The turbine engine of any proceeding clause wherein an amount of overlap between the first sheath or the second sheath and their corresponding.

A turbine engine comprising: an engine core defining an engine centerline and comprising a rotor and a stator; a set of composite airfoils circumferentially arranged about the engine centerline and defining at least a portion of the rotor, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) and the chord length (CL) relate to each other by an expression: (LL)(CL) to define an airfoil protection factor (APF); and wherein the APF is greater than or equal to 0.1 and less than or equal to 0.3 ($0.1 \leq APF \leq 0.3$).

The turbine engine of any proceeding clause, wherein the set of composite airfoils includes a first stage of composite airfoils and a second stage of composite airfoils downstream from the first stage of composite airfoils.

The turbine engine of any proceeding clause, wherein the first stage of composite airfoils is a set of fan blades and the second stage of composite airfoils is a set of outlet guide vanes.

The turbine engine of any proceeding clause, wherein the composite airfoils in the first stage of composite airfoils have a first airfoil protection factor (APF1) and the second stage of composite airfoils have a second airfoil protection factor (APF2).

The turbine engine of any proceeding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 ($0.7 \leq SPF \leq 4$).

The turbine engine of any proceeding clause, wherein the SPF is greater than or equal to 0.95 and less than or equal to 2.5 ($0.95 \leq SPF \leq 2.5$).

The turbine engine of any proceeding clause, wherein the composite airfoils in the set of composite airfoils extend spanwise between a root and a tip to define a span length and the APF is determined between 20% and 80% of the first span length and the second span length.

The turbine engine of any proceeding clause, wherein the leading edge protector overlaps with the composite leading edge to define a sheath.

The turbine engine of any proceeding clause, wherein the composite portion is formed from a polymer matrix composite (PMC).

The turbine engine of any proceeding clause, wherein the leading edge protector is a metallic leading edge protector.

A reinforced matrix composite containment duct for gas turbine engines comprising: a reinforced matrix composite containment duct comprising high strength integral flanges and pre-stressed reinforcing fibers; said reinforced matrix composite having substantially uniform distribution of matrix material; and said reinforced matrix composite duct having less than or equal to about 2.5% voids.

The reinforced matrix composite containment duct of any preceding clause, wherein the reinforced matrix composite comprises graphite reinforcing fibers.

The reinforced matrix composite containment duct of any preceding clause, wherein the reinforced matrix composite comprises an epoxy matrix.

The reinforced matrix composite containment duct of any preceding clause, wherein the matrix composite has up to about 2.0% void space.

The reinforced matrix composite containment duct of any preceding clause, wherein the matrix composite has up to about 1.0% void space.

A reinforced matrix composite containment duct of any preceding clause, wherein the containment duct has an inner diameter of greater than about 5 feet.

A reinforced matrix composite containment duct of any preceding clause, wherein the containment duct has an inner diameter of about 10 feet.

A composite matrix containment duct for a gas turbine engine made by the method comprising the following steps: providing a composite preform having a fibrous structure; applying a preselected amount of matrix material onto the preform at preselected locations along the preform to produce a coated preform, the matrix material having a preselected curing temperature; applying a layer of barrier material to at least a portion of the coated preform to direct the flow of matrix material into the preform, then heating the composite preform to a preselected temperature, the preselected temperature being sufficient to render the matrix material viscous, but below the curing temperature of the matrix material; reducing pressure to an interior of the composite preform, while increasing the pressure to the barrier material, thereby creating a pressure differential; holding the temperature at the preselected temperature while flowing the matrix material from the predetermined locations into the composite preform to force gases from the fibrous structure as a result of the pressure differential and substantially uniformly distributing the matrix material though the fibrous structure; heating the composite preform to the preselected curing temperature; and curing the matrix material at the preselected curing temperature for a predetermined amount of time and cooling to ambient temperature to form a reinforced matrix composite having a void space content up to about 2.5% void space.

The reinforced matrix composite containment duct of any preceding clause, wherein the reinforced matrix composite comprises graphite reinforcing fibers.

The reinforced matrix composite containment duct of any preceding clause, wherein the reinforced matrix composite comprises an epoxy matrix.

The reinforced matrix composite containment duct of any preceding clause, wherein the matrix composite has up to about 2.0% void space.

The reinforced matrix composite containment duct of any preceding clause, wherein the matrix composite has up to about 1.0% void space.

A reinforced matrix composite containment duct of any preceding clause, wherein the containment duct has a diameter of greater than about 5 feet.

A reinforced matrix composite containment duct of any preceding clause, wherein the containment duct has a diameter of about 10 feet.

A composite matrix containment duct for a gas turbine engine made by the method comprising the following steps: providing a fibrous composite preform comprising at least one surface having a midpoint, a first edge and a second edge along a centerline; applying a preselected amount of matrix material having a preselected curing temperature onto the preform at preselected locations along the preform; orienting the preform vertically along the axis with the first edge above the midpoint and the second edge below the midpoint; reducing pressure to the first edge; providing fluid communication from the first edge to the second edge; heating the composite preform to a preselected temperature, the preselected temperature being sufficient to render the matrix material viscous and insufficient to cure the matrix material; collecting matrix material flowing from the second edge; circulating matrix material collected from the second edge to the first edge through the fluid communication; maintaining the reduced pressure and the first temperature until the matrix material has been distributed across the preform substantially uniformly; heating the preform to a second preselected temperature, the second temperature being sufficient to cure the matrix material; and thereafter cooling the preform to form a reinforced matrix composite duct having up to about 2.5% void space.

The reinforced matrix composite containment duct of any preceding clause, wherein the reinforced matrix composite comprises graphite reinforcing fibers.

The reinforced matrix composite containment duct of any preceding clause, wherein the reinforced matrix composite comprises an epoxy matrix.

The reinforced matrix composite containment duct of any preceding clause, wherein the matrix composite has up to about 2.0% void space.

The reinforced matrix composite containment duct of any preceding clause, wherein the matrix composite has up to about 1.0% void space.

A reinforced matrix composite containment duct of any preceding clause, wherein the containment duct has a diameter of greater than about 5 feet.

A reinforced matrix composite containment duct of any preceding clause, wherein the containment duct has a diameter of about 10 feet.

A composite matrix containment duct for a gas turbine engine made by the method comprising the following steps: providing a tool having a tool surface; positioning a composite preform on at least a portion of the tool surface, the preform comprising a center, a first edge and a second edge; attaching a plurality of plates to the tool surface, each plate comprising a first and second surface; positioning the plates with each second surface adjacent to at least a preselected portion of the composite preform; the plates being comprising a material having a thermal coefficient of expansion greater than the thermal coefficient of expansion of the composite preform; the tool being comprising a material having a thermal coefficient of expansion greater than the thermal coefficient of expansion of the composite preform; providing a matrix material having a preselected curing temperature; applying the matrix material onto predetermined locations on the preform to form a coated preform, wherein a greater amount of matrix material is placed on the center of the preform than on each of the first and second edges; applying a layer of barrier material to at least a portion of the coated preform that isolates the matrix material from an external environment and enables flow of matrix material from the center to the first and second edges; providing a vacuum membrane; placing the tool and preform into a vacuum membrane; heating the composite preform to a preselected temperature, the preselected temperature being sufficient to render the matrix material viscous, but below the curing temperature of the matrix material; holding the temperature at the preselected temperature to flow the matrix material from the predetermined locations into the composite preform; the first preselected temperature also being sufficient to cause thermal expansion of the tool and the plates that is greater than the thermal expansion of the composite preform; the thermal expansion of the tool and the plate relative to the composite preform being sufficient to cause tensional force across the composite preform; applying reduced pressure to an interior of the vacuum membrane sufficient to draw gas from the edges of the preform; applying increased pressure to the exterior of the vacuum membrane to apply force across the first surface of the plate through the membrane, thereby creating a pressure differential; the reduced pressure to the interior of the vacuum membrane and the increased pressure to the exterior of the vacuum membrane facilitate the flow of the matrix material into the composite preform as a result of the pressure differential, while maintaining the positioning of the preselected portion of the composite preform adjacent to the plurality of plates; collecting matrix material flowing from one of the first edge or the second edge; uniformly distributing the matrix material collected to the one of the first edge or the second edge from which excess material was not drawn; heating the preform to a preselected second temperature; the second temperature being sufficient to cure the matrix material; and thereafter cooling the preform to form a reinforced matrix composite containment duct having up to about 2.5% void space.

The reinforced matrix composite containment duct of any preceding clause, wherein the reinforced matrix composite comprises graphite reinforcing fibers.

The reinforced matrix composite containment duct of any preceding clause, wherein the reinforced matrix composite comprises an epoxy matrix.

The reinforced matrix composite containment duct of any preceding clause, wherein the matrix composite has up to about 2.0% void space.

The reinforced matrix composite containment duct of any preceding clause, wherein the matrix composite has up to about 1.0% void space.

A reinforced matrix composite containment duct of any preceding clause, wherein the containment duct has a diameter of greater than about 5 feet.

A reinforced matrix composite containment duct of any preceding clause, wherein the containment duct has a diameter of about 10 feet.

An article comprising: a primary composite structure having a circumference; and at least one mounting flange operably connected to the primary composite structure about the circumference wherein the mounting flange comprises at least one circumferentially oriented core fiber.

The article of any proceeding clause, further comprising a secondary structure operably connected to the primary composite structure at the mounting flange.

The article of any proceeding clause, wherein the primary composite structure comprises a material selected from the group consisting of glass fibers, graphite fibers, carbon fibers, ceramic fibers, aromatic polyamide fibers such as poly(p-phenylenetherephtalamide) fibers, and combinations thereof.

The article of any proceeding clause, wherein the mounting flange comprises a material selected from the group consisting of glass fibers, graphite fibers, carbon fibers, ceramic fibers, aromatic polyamide fibers such as poly(p-phenylenetherephtalamide) fibers, and combinations thereof.

The article of any proceeding clause, wherein the primary composite structure comprises a gas turbine engine fan casing.

The article of any proceeding clause, wherein the mounting flange comprises a plurality of core fibers selected from the group consisting of unidirectional fiber tows, textile preforms, and combinations thereof.

The article of any proceeding clause, wherein the mounting flange further comprises at least one layer of attachment fibers that operably connect the core fiber to the primary composite structure.

The article of any proceeding clause, wherein the core fiber comprises a plurality of unidirectional fiber tows.

The article of any proceeding clause, wherein the attachment fibers comprise multidirectional textile preforms.

An article comprising: a primary composite structure having a circumference; at least one mounting flange comprising: at least one circumferentially oriented core fiber; and at least one layer of attachment fibers operably connecting the core fiber to the primary composite structure about the circumference.

The article of any proceeding clause, wherein the mounting flange comprises a material selected from the group consisting of glass fibers, graphite fibers, carbon fibers, ceramic fibers, aromatic polyamide fibers such as poly(p-phenylenetherephtalamide) fibers, and combinations thereof.

The article of any proceeding clause, further comprising a secondary structure operably connected to the primary composite structure at the mounting flange.

The article of any proceeding clause, wherein the core fiber further comprise a first core side and a second core side and wherein at least one layer of attachment fibers operably connects each of the first core side and the second core side of the core fiber to the primary composite structure about the circumference of the primary composite structure.

The article of any proceeding clause, wherein the mounting flange comprises a plurality of core fibers comprising unidirectional fiber tows.

The article of any proceeding clause, wherein the core fiber comprises textile performs.

An article comprising: an engine comprising: a primary composite structure having a circumference; at least one mounting flange operably connected to the primary composite structure about the circumference, the mounting flange comprising: a plurality of circumferentially oriented core fibers, the core fibers having a first core side and a second core side; at least one layer of attachment fibers operably connecting each of the first core side and the second core side of the core fibers to the primary composite structure about the circumference; and a secondary structure operably connected to the primary composite structure at the mounting flange.

The article of any proceeding clause, wherein the core fibers comprise unidirectional fiber tows.

The article of any proceeding clause, wherein the secondary structure is a structure selected from the group consisting of an accessory gear box, an oil tank, an oil monitoring module, a fuel monitoring module, other engine externals and combinations thereof.

A method for making a structure having a mounting flange comprising: providing a primary composite structure having a circumference; applying at least one circumferentially oriented core fiber about the circumference of the primary composite structure; applying at least one layer of attachment fibers to operably connect the core fiber to the primary composite structure about the circumference to obtain an integral mounting flange preform; and curing the mounting flange preform to obtain an integral mounting flange.

The method of any proceeding clause, wherein the primary composite structure comprises a material selected from the group consisting of glass fibers, graphite fibers, carbon fibers, ceramic fibers, aromatic polyamide fibers such as poly(p-phenylenetherephtalamide) fibers, and combinations thereof.

The method of any proceeding clause, wherein the at least one core fiber is selected from the group consisting of unidirectional fiber tows, textile preforms, and combinations thereof.

The method of any proceeding clause, wherein the mounting flange comprises a material selected from the group consisting of glass fibers, graphite fibers, carbon fibers, ceramic fibers, aromatic polyamide fibers such as poly(p-phenylenetherephtalamide) fibers, and combinations thereof.

The method of any proceeding clause, wherein the mounting flange comprises a plurality of core fibers comprising unidirectional fiber tows.

The method of any proceeding clause, wherein the attachment fibers comprise multidirectional textile preforms.

The method of any proceeding clause, wherein at least one guide is placed about the circumference of the primary composite structure prior to applying the core fibers about the circumference of the primary composite structure adjacent to the guide.

The method of any proceeding clause, further comprising applying individual fiber tows to the mounting flange preform prior to curing.

A method for making a structure having a mounting flange comprising: providing a primary composite structure having a circumference; placing at least one guide about the circumference of the primary composite structure; applying circumferentially oriented core fibers about the circumference of the primary composite structure adjacent to the guide to obtain core fibers having a first core side and a second core side; applying attachment fibers to the first core side of the core fibers to operably connect the core fibers to the primary composite structure; repositioning the guide adjacent to the first core side of the core fibers; applying attachment fibers to the second core side of the core fibers to operably connect the core fibers to the primary composite structure to obtain a mounting flange preform; and curing the mounting flange preform to obtain an integral mounting flange.

The method of any proceeding clause, wherein the primary composite structure comprises a material selected from the group consisting of glass fibers, graphite fibers, carbon fibers, ceramic fibers, aromatic polyamide fibers such as poly(p-phenylenetherephtalamide) fibers, and combinations thereof.

The method of any proceeding clause, wherein the core fibers are selected from the group consisting of unidirectional fiber tows, textile preforms, and combinations thereof.

The method of any proceeding clause, wherein the mounting flange comprises a material selected from the group consisting of glass fibers, graphite fibers, carbon fibers, ceramic fibers, aromatic polyamide fibers such as poly(p-phenylenetherephtalamide) fibers, and combinations thereof.

The method of any proceeding clause, wherein the core fibers comprise unidirectional fiber tows.

The method of any proceeding clause, wherein the attachment fibers comprise multidirectional textile preforms.

The method of any proceeding clause, further comprising applying individual fiber tows to the mounting flange preform prior to curing.

A method for making a structure having a mounting flange comprising: providing a primary composite structure having a circumference; placing at least one guide about the circumference of the primary composite structure; applying circumferentially oriented core fibers about the circumference of the primary composite structure adjacent to the guide to obtain core fibers having a first core side and a second core side; debulking the core fibers; applying attachment fibers to the first core side of the core fibers to operably connect the core fibers to the primary composite structure; debulking the attachment fibers applied to the first core side of the core fibers; repositioning the guide adjacent to the first core side of the core fibers; applying attachment fibers to the second side of the core fibers to operably connect the core fibers to the primary composite structure; debulking the attachment fibers applied to the second side of the core fibers to obtain a mounting flange preform; and curing the mounting flange preform to obtain an integral mounting flange.

The method of any proceeding clause, further comprising applying individual fiber tows to the mounting flange preform prior to curing.

A method for assembling a turbine engine casing, said method comprises: positioning a first casing section radially outward from a turbine engine, wherein the first casing includes a first flange having an outer end portion, an inner end portion, and a body therebetween, at least a portion of the outer end portion has a partial frusto-conical cross-sectional profile; positioning a second casing section including a second flange adjacent the first casing section such that a mating surface of the second flange is positioned substantially flush against a mating surface of the first flange, wherein each mating surface is positioned opposite a respective load-bearing surface of each flange; and inserting at least one fastener through an opening in the first and second flanges to couple the second casing section to the first casing section such that a portion of a load-bearing surface extending over the first flange outer end portion facilitates distributing loading induced by the at least one fastener substantially equally across the load bearing surface.

A method in accordance with any proceeding clause, wherein positioning a first casing section radially outward from a turbine engine further comprises positioning a first casing section including a first flange having an outer end portion that has a frusto-conical shape defined by a pair of obliquely-oriented opposite surfaces.

A method in accordance with any proceeding clause, wherein positioning a second casing section including a second flange adjacent the first casing section further comprises providing at least one of a first casing section and a second casing section fabricated from a composite material.

A method in accordance with any proceeding clause, further comprising coupling a load-spreader substantially flush against at least one of the first flange load-bearing surface and the second flange load-bearing surface prior to securing the first casing section to the second casing section with the at least one fastener.

A method in accordance with any proceeding clause, wherein coupling a load-spreader substantially flush against at least one of the first flange load-bearing surface and the second flange load-bearing surface further comprises coupling a load-spreader against at least one of the first flange load-bearing surface and the second flange load-bearing surface such that at least a portion of the load-spreader is substantially parallel to the first and second flange mating surfaces.

A method in accordance with any proceeding clause, wherein coupling a load-spreader substantially flush against at least one of the first flange load-bearing surface and the second flange load-bearing surface further comprises coupling a load-spreader against at least one of the first flange load-bearing surface and the second flange load-bearing surface such that at least a portion of the load-spreader is oriented obliquely with respect to the first and second flange mating surfaces.

A method in accordance with any proceeding clause, wherein positioning a first casing section radially outward from a turbine engine further comprises positioning a second casing section including a second flange having an outer end portion that is defined by at least one surface that is obliquely aligned with respect to the first and second flange mating surfaces.

A coupling assembly comprising: a first flange comprising an outer end portion, an inner end portion, and a body portion extending therebetween, said outer end portion extending from an end surface to said body portion, said first flange further comprising a mating surface, an opposite load bearing surface, and an opening extending therebetween, said load bearing surface extending from said end surface over said outer end portion, said body portion, and said inner end portion, at least one of said outer end portion and said inner end portion comprises a partial frusto-conical cross-sectional shape such that a portion of said load bearing surface extending over said end portion extends obliquely from said body portion load bearing surface; a second flange comprising a mating surface, an opposite load bearing surface, and an opening extending therebetween; and a fastener sized for insertion through said first flange opening and said second flange opening, said fastener configured to secure said first flange to said second flange such that said first flange mating surface is substantially flush against said second flange mating surface, said obliquely aligned portion of said load bearing surface is configured to distribute loading induced by said fastener substantially equally across said load bearing surface.

A coupling assembly in accordance with any proceeding clause, wherein said first flange mating surface extends from said end surface over said outer end portion, said body portion, and said inner end portion, said first flange outer end portion comprises a partial frusto-conical shape defined at least partially by a portion of said mating surface.

A coupling assembly in accordance with any proceeding clause, wherein at least one of said first and second flange members comprises a composite material.

A coupling assembly in accordance with any proceeding clause, further comprising a first load-spreader comprising a mating surface, an opposite load bearing surface, and an opening extending therebetween, said first load-spreader coupled to said first flange such that said first flange load bearing surface is substantially flush against said first load-spreader mating surface.

A coupling assembly in accordance with any proceeding clause, wherein said first load-spreader comprises an outer end portion, an inner end portion, and a body portion extending therebetween, said inner end portion comprises a partial frusto-conical cross-sectional shape.

A coupling assembly in accordance with any proceeding clause, wherein said second flange further comprises an outer end portion, an inner end portion, and a body portion extending therebetween, said second flange outer end portion extends from an outer end to said body portion, at least one of said outer end portion and said inner end portion comprises a partial frusto-conical cross-sectional shape.

A coupling assembly in accordance with any proceeding clause, further comprising a second load-spreader comprising a mating surface, an opposite load bearing surface, and an opening extending therebetween, said second load-spreader coupled to said second flange such that said second flange load bearing surface is substantially flush against said second load-spreader mating surface.

A turbine engine assembly comprising: a turbine engine; an engine casing, comprising a first casing section and a second casing section, said first casing section comprising a first flange comprising an outer end portion, an inner end portion, and a body portion extending therebetween, said outer end portion extending from an end surface to said body portion, said first flange further comprising a mating surface, an opposite load bearing surface, and an opening extending therebetween, said load bearing surface extending from said outer end over said outer end portion, said body portion, and said inner end portion, at least one of said outer end portion and said inner end portion comprises a partial frusto-conical cross-sectional shape such that a portion of said load bearing surface extending over said end portion extends obliquely from said body portion load bearing surface, said second casing section comprising a second flange comprising a mating surface, an opposite load bearing surface, and an opening extending therebetween; and at least one fastener sized for insertion through said first flange opening and said second flange opening for coupling said first casing section to said second casing section such that said casing extends substantially circumferentially around said turbine engine, said fastener configured to secure said first flange to said second flange such that said first flange mating surface is substantially flush against said second flange mating surface and such that said obliquely aligned portion facilitates distributing loading induced by said fastener substantially equally across said load bearing surface.

A turbine engine assembly in accordance with any proceeding clause, further comprising a first load-spreader comprising a mating surface, an opposite load bearing surface, and an opening extending therebetween, said first load-spreader coupled against said first casing first flange such that said first flange load bearing surface is substantially flush against said first load-spreader mating surface.

A turbine engine assembly in accordance with any proceeding clause, wherein said first load-spreader load bearing surface extends from said outer end outer surface over said outer end portion, said body portion, and said inner end portion, said inner end portion comprises a partial frusto-conical cross-sectional defined at least partially by said first load-spreader body portion load bearing surface.

A turbine engine assembly in accordance with any proceeding clause, wherein said second flange further comprises an outer end portion, an inner end portion, and a body portion extending therebetween, said second flange outer end portion extending from an outer surface to said body portion, at least one of said second flange outer end portion and said inner end portion comprises a partial frusto-conical cross-sectional shape defined at least partially by said second flange body portion load bearing surface.

A turbine engine assembly in accordance with any proceeding clause, further comprising a second load-spreader comprising a mating surface, an opposite load bearing surface, and an opening extending therebetween, said second load-spreader coupled against said second flange such that said second flange load bearing surface is substantially flush against said second load-spreader mating surface.

A turbine engine assembly in accordance with any proceeding clause, wherein said first flange mating surface extends from said outer end over said outer end portion, said body portion, and said inner end portion, said first flange outer end portion comprises a partial frusto-conical shape defined at least partially by a portion of said mating surface.

A method of forming a composite article to have a primary composite structure and an integral secondary composite structure that extends out of a plane defined by a continuous reinforcement material within the primary composite structure, the method comprising: laying-up first plies to construct the primary composite structure, the first plies containing the continuous reinforcement material and extending from a first zone that will define the primary composite structure into a second zone that will define the secondary composite structure; during laying-up of the first plies, interleaving additional plies with the first plies within the second zone but not the first zone so that the second zone contains both the first and additional plies, the additional plies originating within a build-up zone between the first and second zones and extending therefrom into the second zone; and then deforming the build-up zone and the interleaved first and additional plies therein to orient the second zone and form the secondary composite structure that extends out of the plane defined by the continuous reinforcement material of the first plies.

The method according to any proceeding clause, wherein the continuous reinforcement material comprises unidirectional fibers and the unidirectional fibers within successive individual plies of the first plies have different fiber orientation angles.

The method according to any proceeding clause, wherein the additional plies contain a second continuous reinforcement material.

The method according to any proceeding clause, wherein the second continuous reinforcement material of at least one of the additional plies has a different fiber orientation angle than the continuous reinforcement material of at least one of the first plies with which the at least one additional ply is interleaved.

The method according to any proceeding clause, wherein each of the additional plies is interleaved within an individual ply of the first plies.

The method according to any proceeding clause, wherein the additional plies contain a second continuous reinforcement material, and the second continuous reinforcement material of at least one of the additional plies has a different fiber orientation angle than the continuous reinforcement material of one of the first plies within which the at least one additional ply is interleaved.

The method according to any proceeding clause, wherein the additional plies increase the thickness of the secondary composite structure relative to the primary composite structure.

The method according to any proceeding clause, wherein the additional plies originate at different locations within the build-up zone so that ends of the additional plies are staggered within the build-up zone to minimize stress concentration in a joint region defined by the build-up zone between the primary and secondary composite structures.

The method according to any proceeding clause, wherein the first and additional plies have ends that terminate at different locations within the second zone so that an end defined by the first and additional plies within the second zone is chamfered following the lay-up step.

The method according to any proceeding clause, wherein the end defined by the first and additional plies within the second zone defines an end surface that is substantially parallel to the first plies forming the primary composite structure following the deforming step.

The method according to any proceeding clause, wherein the composite article is a polymer matrix composite article.

The method according to any proceeding clause, wherein the composite article is a fan casing of a gas turbine engine and the integral secondary composite structure is a flange of the fan casing.

The composite article having the primary composite structure and the integral secondary composite structure formed by the method of any proceeding clause.

A composite article comprising: a primary composite structure comprising a continuous reinforcement material; and an integral secondary composite structure that extends out of a plane defined by the continuous reinforcement material within the primary composite structure; wherein the primary composite structure comprises first plies comprising the continuous reinforcement material and the secondary composite structure comprises the first plies and additional plies, the additional plies originating within a build-up zone between the primary composite structure and the secondary composite structure and extending therefrom into the secondary composite structure.

The composite article according to any proceeding clause, wherein the continuous reinforcement material comprises unidirectional fibers and the unidirectional fibers within successive individual plies of the first plies have different fiber orientation angles.

The composite article according to any proceeding clause, wherein each of the additional plies is interleaved within an individual ply of the first plies.

The composite article according to any proceeding clause, wherein the additional plies contain a second continuous reinforcement material, and the second continuous reinforcement material of at least one of the additional plies has a different fiber orientation angle than the continuous reinforcement material of one of the first plies within which the at least one additional ply is interleaved.

The composite article according to any proceeding clause, wherein the additional plies originate at different locations within the build-up zone so that ends of the additional plies are staggered within the build-up zone to minimize stress concentration in a joint region defined by the build-up zone between the primary and secondary composite structures.

The composite article according to any proceeding clause, wherein the composite article is a polymer matrix composite article and a fan casing of a gas turbine engine, and the integral secondary composite structure is a flange of the fan casing.

A method of forming a composite article having a build-up zone, the method comprising: laying-up first plies to construct the composite article; and during laying-up of the first plies, interleaving additional plies with the first plies within the build-up zone but not the first zone so that the build-up zone contains both the first and additional plies.

A turbine engine, comprising: a fan; a turbomachine defining an engine centerline and comprising a compressor section, a combustion section, and a turbine section in serial flow order; a primary composite structure including a fan casing surrounding the fan in a circumferential direction about the engine centerline; and an integral secondary composite structure including at least one mounting flange coupled between axial ends of the fan casing and at least partially extending about the fan casing in the circumferential direction, the at least one mounting flange comprising at least one circumferentially oriented core fiber; the fan comprising a first stage of composite airfoils circumferentially arranged about the engine centerline, a first airfoil of the first stage of composite airfoils comprising: a first composite portion extending chordwise between a first composite leading edge and a first trailing edge; a first leading edge protector receiving at least a portion of the first composite leading edge of the first composite portion, the first leading edge protector extending chordwise from a first leading edge towards the first composite portion for a first leading length (FLL); and the first composite portion and the first leading edge protector together defining an exterior surface of the first airfoil and extending chordwise between the first leading edge and the first trailing edge to define a first chord length (FCL); a second stage of composite airfoils located downstream of the first stage of composite airfoils and circumferentially arranged about the engine centerline, a second airfoil of the second stage of composite airfoils comprising: a second composite portion extending chordwise between a second composite leading edge and a second trailing edge; a second leading edge protector receiving at least a portion of the second composite leading edge of the second composite portion, the second leading edge protector extending chordwise from a second leading edge towards the second composite portion for a second leading length (SLL); and the second composite portion and the second leading edge protector together defining an exterior surface of the second airfoil and extending chordwise between the second leading edge and the second trailing edge to define a second chord length (SCL); wherein the first leading length (FLL) and the first chord length (FCL) are related to the second leading length (SLL) and the second chord length (SCL) by a stage protection factor (SPF), wherein SPF= ((FLL/FCL))/((SLL/SCL)) and SPF is greater than or equal to 0.7 and less than or equal to 4 ($0.7 \leq SPF \leq 4$).

The turbine engine of any proceeding clause, further comprising a third structure operably connected to the primary composite structure at the mounting flange.

The turbine engine of any proceeding clause, wherein the third structure is a structure selected from the group consisting of an accessory gear box, an oil tank, an oil monitoring module, a fuel monitoring module, other engine externals and combinations thereof.

The turbine engine of any proceeding clause, wherein the primary composite structure comprises a material selected from the group consisting of glass fibers, graphite fibers, carbon fibers, ceramic fibers, aromatic polyamide fibers such as poly(p-phenylenetherephtalamide) fibers, and combinations thereof.

The turbine engine of any proceeding clause, wherein the mounting flange comprises a material selected from the group consisting of glass fibers, graphite fibers, carbon fibers, ceramic fibers, aromatic polyamide fibers such as poly(p-phenylenetherephtalamide) fibers, and combinations thereof.

The turbine engine of any proceeding clause, wherein the mounting flange comprises a plurality of core fibers selected from the group consisting of unidirectional fiber tows, textile preforms, and combinations thereof.

The turbine engine of any proceeding clause, wherein the mounting flange further comprises at least one layer of attachment fibers that operably connect the core fiber to the primary composite structure.

The turbine engine of any proceeding clause, wherein the attachment fibers comprise multidirectional textile preforms.

The turbine engine of any proceeding clause, wherein the core fiber comprises a plurality of unidirectional fiber tows.

The turbine engine of any proceeding clause, wherein: the primary composite structure comprises a continuous reinforcement material; the integral secondary composite structure extends out of a plane defined by the continuous reinforcement material within the primary composite structure; and the primary composite structure comprises first plies comprising the continuous reinforcement material and the secondary composite structure comprises the first plies and additional plies, the additional plies originating within a build-up zone between the primary composite structure and the secondary composite structure and extending therefrom into the secondary composite structure.

The turbine engine of any proceeding clause, wherein the continuous reinforcement material comprises unidirectional fibers and the unidirectional fibers within successive individual plies of the first plies have different fiber orientation angles.

The turbine engine of any proceeding clause, wherein each of the additional plies is interleaved within an individual ply of the first plies.

The turbine engine of any proceeding clause, wherein the additional plies contain a second continuous reinforcement material, and the second continuous reinforcement material of at least one of the additional plies has a different fiber orientation angle than the continuous reinforcement material of one of the first plies within which the at least one additional ply is interleaved.

The turbine engine of any proceeding clause, wherein the additional plies originate at different locations within the build-up zone so that ends of the additional plies are staggered within the build-up zone to minimize stress concentration in a joint region defined by the build-up zone between the primary and secondary composite structures.

The turbine engine of any proceeding clause, wherein: the at least one mounting flange comprises high strength integral flanges extending radially outward from a surface of the fan casing and pre-stressed reinforcing fibers; the fan casing comprises a reinforced matrix composite having substantially uniform distribution of matrix material; and the reinforced matrix composite having less than or equal to about 2.5% porosity.

The turbine engine of any proceeding clause, wherein the reinforced matrix composite comprises graphite reinforcing fibers.

The turbine engine of any proceeding clause, wherein the reinforced matrix composite comprises an epoxy matrix.

The turbine engine of any proceeding clause, wherein the matrix composite has up to about 2.0% porosity.

The turbine engine of any proceeding clause, wherein the matrix composite has up to about 1.0% porosity.

The turbine engine of any proceeding clause, wherein the fan casing has an inner diameter of greater than about 5 feet.

The turbine engine of any proceeding clause, wherein the fan casing has an inner diameter of about 10 feet.

The turbine engine of any proceeding clause, wherein: the at least one mounting flange comprises a first flange and a second flange; the first flange comprises a first mating surface, a first load bearing surface opposite the first mating surface, and a first opening extending from the first mating surface to the first load bearing surface, the first load bearing surface comprising an inner end portion, a body portion, and an outer end portion, wherein the outer end portion comprises a partial frusto-conical cross-sectional shape such that the outer end portion extends obliquely from the body portion, the inner end portion comprising an arcuate cross-sectional shape such that the inner end portion extends arcuately from the body portion; the second flange comprises a second mating surface, a second load bearing surface opposite the second mating surface, and a second opening extending from the second mating surface to the second load bearing surface; and the turbine engine further comprises a fastener sized for insertion through the first opening and the second opening, the fastener configured to secure the first flange to the second flange such that said first mating surface is substantially flush against the second mating surface, the outer end portion configured to distribute a load induced by the fastener substantially uniformly across the first load bearing surface.

The turbine engine of any proceeding clause, wherein at least one of the first flange and the second flange comprises a composite material.

The turbine engine of any proceeding clause, further comprising a load-spreader comprising a spreader load bearing surface, a spreader mating surface opposite the spreader load bearing surface, and a spreader opening extending from the spreader load bearing surface to the spreader mating surface, the load-spreader configured to be coupled to the first flange such that the first load bearing surface is substantially flush against the spreader mating surface.

The turbine engine of any proceeding clause, wherein the load-spreader further comprises a spreader outer end portion, a spreader inner end portion, and a spreader body portion extending from the spreader outer end portion to the spreader inner end portion, wherein the spreader inner end portion comprises a frusto-conical cross-sectional shape.

The turbine engine of any proceeding clause, wherein the first stage of composite airfoils and the second stage of composite airfoils include a polymer matrix composite (PMC).

The turbine engine of any proceeding clause, wherein at least one of the first leading edge protector or the second leading edge protector is a metallic leading edge protector.

The turbine engine of claim 1, wherein the composite airfoils of the first stage of composite airfoils are fan blades.

The turbine engine of any proceeding clause, wherein the composite airfoils of the second stage of composite airfoils are outlet guide vanes.

The turbine engine of any proceeding clause, wherein the first airfoil extends spanwise between a first root and a first tip to define a first span length and wherein the second airfoil extends spanwise between a second root and a second tip to define a second span length and wherein the SPF is between 20% and 80% of the first span length and the second span length, inclusive of endpoints.

The turbine engine of any proceeding clause, wherein the first leading edge protector and the second leading edge protector each comprise a sheath.

The turbine engine of any proceeding clause, wherein the first stage of composite airfoils has a first number of airfoils and the second stage of composite airfoils has a second number of airfoils and the first number is different than the second number.

The turbine engine of any proceeding clause, wherein the first stage of composite airfoils and the second stage of composite airfoils are configured to rotate.

The turbine engine of any proceeding clause, wherein the SPF is greater than or equal to 0.95 and less than or equal to 2.5 ($0.95 \leq SPF \leq 2.5$).

The turbine engine of any proceeding clause, further comprising: a speed reduction device driven by the turbine section for rotating the fan about the engine centerline; wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

A turbine engine comprising: a fan; a turbomachine defining an engine centerline and comprising a compressor section, a combustion section, and a turbine section in serial flow order; a primary composite structure including a fan casing surrounding the fan in a circumferential direction about the engine centerline; and an integral secondary composite structure including at least one mounting flange coupled to the fan casing and at least partially extending about the fan casing in the circumferential direction, the at least one mounting flange comprising at least one circumferentially oriented core fiber; the fan comprising a set of composite airfoils circumferentially arranged about the engine centerline, an airfoil of the set of composite airfoils comprising: a composite portion extending chordwise between a composite leading edge and a trailing edge; a leading edge protector coupled to the composite portion at the composite leading edge to define a seam, and extending chordwise between a leading edge and the seam to define a leading length (LL); and the composite portion and the leading edge protector together defining an exterior surface of the airfoil and extending chordwise between the leading edge and the trailing edge to define a chord length (CL); wherein the leading length (LL) is related to the chord length (CL) by an airfoil protection factor (APF)=((LL))/((CL)) and APF is greater than or equal to 0.1 and less than or equal to 0.3 ($0.1 \leq APF \leq 0.3$).

The turbine engine of any proceeding clause, further comprising a third structure operably connected to the primary composite structure at the mounting flange.

The turbine engine of any proceeding clause, wherein the third structure is a structure selected from the group consisting of an accessory gear box, an oil tank, an oil monitoring module, a fuel monitoring module, other engine externals and combinations thereof.

The turbine engine of any proceeding clause, wherein the primary composite structure comprises a material selected from the group consisting of glass fibers, graphite fibers, carbon fibers, ceramic fibers, aromatic polyamide fibers such as poly(p-phenylenetherephtalamide) fibers, and combinations thereof.

The turbine engine of any proceeding clause, wherein the mounting flange comprises a material selected from the group consisting of glass fibers, graphite fibers, carbon fibers, ceramic fibers, aromatic polyamide fibers such as poly(p-phenylenetherephtalamide) fibers, and combinations thereof.

The turbine engine of any proceeding clause, wherein the mounting flange comprises a plurality of core fibers selected from the group consisting of unidirectional fiber tows, textile preforms, and combinations thereof.

The turbine engine of any proceeding clause, wherein the mounting flange further comprises at least one layer of attachment fibers that operably connect the core fiber to the primary composite structure.

The turbine engine of any proceeding clause, wherein the attachment fibers comprise multidirectional textile preforms.

The turbine engine of any proceeding clause, wherein the core fiber comprises a plurality of unidirectional fiber tows.

The turbine engine of any proceeding clause, wherein: the primary composite structure comprises a continuous reinforcement material; the integral secondary composite structure extends out of a plane defined by the continuous reinforcement material within the primary composite structure; and the primary composite structure comprises first plies comprising the continuous reinforcement material and the secondary composite structure comprises the first plies and additional plies, the additional plies originating within a build-up zone between the primary composite structure and the secondary composite structure and extending therefrom into the secondary composite structure.

The turbine engine of any proceeding clause, wherein the continuous reinforcement material comprises unidirectional fibers and the unidirectional fibers within successive individual plies of the first plies have different fiber orientation angles.

The turbine engine of any proceeding clause, wherein each of the additional plies is interleaved within an individual ply of the first plies.

The turbine engine of any proceeding clause, wherein the additional plies contain a second continuous reinforcement material, and the second continuous reinforcement material of at least one of the additional plies has a different fiber orientation angle than the continuous reinforcement material of one of the first plies within which the at least one additional ply is interleaved.

The turbine engine of any proceeding clause, wherein the additional plies originate at different locations within the build-up zone so that ends of the additional plies are staggered within the build-up zone to minimize stress concentration in a joint region defined by the build-up zone between the primary and secondary composite structures.

The turbine engine of any proceeding clause, wherein the fan casing comprises: the at least one mounting flange comprises high strength integral flanges extending radially outward from a surface of the fan casing and pre-stressed reinforcing fibers; the fan casing comprising a reinforced matrix composite having substantially uniform distribution of matrix material; and the reinforced matrix composite having less than or equal to about 2.5% porosity.

The turbine engine of any proceeding clause, wherein the reinforced matrix composite comprises graphite reinforcing fibers.

The turbine engine of any proceeding clause, wherein the reinforced matrix composite comprises an epoxy matrix.

The turbine engine of any proceeding clause, wherein the matrix composite has up to about 2.0% porosity.

The turbine engine of any proceeding clause, wherein the matrix composite has up to about 1.0% porosity.

The turbine engine of any proceeding clause, wherein the fan casing has an inner diameter of greater than about 5 feet.

The turbine engine of any proceeding clause, wherein the fan casing has an inner diameter of about 10 feet.

The turbine engine of any proceeding clause, wherein: the at least one mounting flange comprises a first flange and a second flange; the fan casing comprises a first casing section and a second casing section; the first casing section including the first flange, the first flange comprises a first mating surface, a first load bearing surface opposite the first mating surface, and a first opening extending from the first mating surface to the first load bearing surface, the first load bearing surface comprises an inner end portion, a body portion, and an outer end portion, wherein the outer end portion comprises a partial frusto-conical cross-sectional shape such that the outer end portion extends obliquely from the body portion, the inner end portion comprises an arcuate cross-sectional shape such that the inner end portion extends arcuately from the body portion; and the second casing section comprises the second flange, the second flange comprising a second mating surface, a second load bearing surface opposite the second mating surface, and a second opening extending from the second mating surface to the second load bearing surface.

The turbine engine of any proceeding clause, further comprising at least one fastener sized for insertion through the first opening and the second opening, the fastener configured to secure the first flange to the second flange such that said first mating surface is substantially flush against the second mating surface, the outer end portion configured to distribute a load induced by the fastener substantially uniformly across the first load bearing surface.

The turbine engine of any proceeding clause, further comprising a load-spreader comprising a spreader load bearing surface, a spreader mating surface opposite the spreader load bearing surface, and a spreader opening extending from the spreader load bearing surface to the spreader mating surface, the load-spreader configured to be coupled to the first flange such that the first load bearing surface is substantially flush against the spreader mating surface.

The turbine engine of any proceeding clause, further comprising a second load-spreader comprising a mating surface, an opposite load bearing surface, and an opening extending therebetween, said second load-spreader coupled against said second flange such that said second flange load bearing surface is substantially flush against said second load-spreader mating surface.

The turbine engine of any proceeding clause, wherein the set of composite airfoils includes a first stage of composite airfoils and a second stage of composite airfoils downstream from the first stage of composite airfoils.

The turbine engine of any proceeding clause, wherein the first stage of composite airfoils is a set of fan blades and the second stage of composite airfoils is a set of outlet guide vanes.

The turbine engine of any proceeding clause, wherein the composite airfoils in the first stage of composite airfoils have a first airfoil protection factor (APF1) and the composite airfoils in the second stage of composite airfoils have a second airfoil protection factor (APF2).

The turbine engine of any proceeding clause, wherein the first airfoil protection factor (APF1) relates to the second airfoil protection factor (APF2) by an expression: APF1/APF2 to define a stage protection factor (SPF), wherein the SPF is greater than or equal to 0.7 and less than or equal to 4 ($0.7 \leq SPF \leq 4$).

The turbine engine of any proceeding clause, wherein the SPF is greater than or equal to 0.95 and less than or equal to 2.5 ($0.95 \leq SPF \leq 2.5$).

The turbine engine of any proceeding clause, wherein the composite airfoils in the set of composite airfoils extend spanwise between a root and a tip to define a span length and the APF is determined between 20% and 80% of the span length.

The turbine engine of any proceeding clause, wherein the leading edge protector overlaps with the composite leading edge to define a sheath.

The turbine engine of any proceeding clause, wherein the composite portion is formed from a polymer matrix composite (PMC).

The turbine engine of any proceeding clause, wherein the leading edge protector is a metallic leading edge protector.

The turbine engine of any proceeding clause, further comprising: a speed reduction device driven by the turbine section for rotating the fan about the engine centerline; and wherein the turbine section includes a fan drive turbine and a second turbine and the second turbine is disposed forward of the fan drive turbine and the fan drive turbine includes a plurality of fan drive turbine stages with the speed reduction device driven by the fan drive turbine.

What is claimed is:
1. A turbine engine comprising:
   a fan;
   a turbomachine comprising a compressor section, a combustor in fluid communication with the compressor section, and a turbine section in fluid communication with the combustor;
   a speed reduction device driven by the turbine section and configured for rotating the fan;
   a composite fan casing surrounding the fan in a circumferential direction about an engine centerline and comprising an integral composite flange extending from a surface of the composite fan casing, wherein the integral composite flange defines a first mating surface and a first load bearing surface opposite the first mating surface;
   a load-spreader comprising a spreader load bearing surface and a spreader mating surface opposite the spreader load bearing surface, wherein the load-spreader is coupled to the integral composite flange such that the first load bearing surface is in contact with and parallel to the spreader mating surface;
   an engine component having a second flange defining a second mating surface and a second load bearing surface opposite the second mating surface, wherein the second mating surface is coupled to the first mating surface and the load-spreader is configured to distribute a load across the spreader load bearing surface; and
   composite airfoils comprising at least one composite fan blade and at least one composite outlet guide vane downstream from the at least one composite fan blade;
   wherein an airfoil of the composite airfoils comprises:
      a composite body extending chordwise from a body leading edge to a body trailing edge, and
      a leading edge protector having a protector leading edge different from, and receiving at least a portion of, the body leading edge,
      wherein a leading length (LL) extends chordwise from the protector leading edge to an end of the leading edge protector, and a chord length (CL) extends chordwise from the protector leading edge to the body trailing edge; and wherein the LL is related to the CL by an airfoil protection factor $$(APF) = \frac{(LL)}{(CL)};$$

and a first APF (APF1) for the at least one composite fan blade is greater than or equal to 0.2 and less than or equal to 0.30 (0.2≤APF1≤0.3) and a second APF (APF2) for the at least one composite outlet guide vane is greater than or equal to 0.08 and less than or equal to 0.17 (0.08≤APF2≤0.17).

2. The turbine engine of claim 1, further comprising a fastener securing the integral composite flange to the second flange such that the first mating surface is against the second mating surface.

3. The turbine engine of claim 2, wherein a first opening extends from the first mating surface to the first load bearing surface, a spreader opening extends from the spreader load bearing surface to the spreader mating surface, a second opening extends from the second mating surface to the second load bearing surface, and the fastener extends through the spreader opening, the first opening, and the second opening.

4. The turbine engine of claim 1, wherein the integral composite flange, the load-spreader, and the second flange are coupled together with the first mating surface provided against the second mating surface.

5. The turbine engine of claim 1, wherein the first mating surface is parallel with the second mating surface.

6. The turbine engine of claim 1, wherein the first load bearing surface is parallel with the second load bearing surface.

7. The turbine engine of claim 1, wherein the APF1 relates to the APF2 by an expression:

$$\frac{APF1}{APF2}$$

to define a stage protection factor (SPF), and wherein the SPF is greater than or equal to 0.7 and less than or equal to 4 (0.7≤SPF≤4).

8. The turbine engine of claim 7, wherein the SPF is greater than or equal to 0.95 and less than or equal to 2.5 (0.95≤SPF≤2.5).

9. The turbine engine of claim 1, wherein a bypass ratio is from 10:1 to 22:1.

10. The turbine engine of claim 1, wherein the speed reduction device is a power gearbox.

11. The turbine engine of claim 1, wherein the composite body is a polymer matrix composite.

12. The turbine engine of claim 11, wherein the leading edge protector is a metallic leading edge protector.

* * * * *